(12) United States Patent
Kuno et al.

(10) Patent No.: US 8,031,743 B2
(45) Date of Patent: Oct. 4, 2011

(54) APPARATUSES AND METHOD FOR MULTIPLEXING ELEMENTARY STREAMS BASED ON A MULTIPLEXING PATTERN INDICATING AN ORDER OF TYPES OF DATA TO BE MULTIPLEXED

(75) Inventors: Akitoshi Kuno, Gifu (JP); Nobuhiko Yamada, Aichi (JP)

(73) Assignee: Panasonic Corporation, Osaka (JP)

( * ) Notice: Subject to any disclaimer, the term of this patent is extended or adjusted under 35 U.S.C. 154(b) by 317 days.

(21) Appl. No.: 12/438,705

(22) PCT Filed: Oct. 26, 2007

(86) PCT No.: PCT/JP2007/070923
§ 371 (c)(1),
(2), (4) Date: Feb. 24, 2009

(87) PCT Pub. No.: WO2008/053806
PCT Pub. Date: May 8, 2008

(65) Prior Publication Data
US 2010/0254408 A1    Oct. 7, 2010

(30) Foreign Application Priority Data

Oct. 31, 2006   (JP) .................................. 2006-296212

(51) Int. Cl.
*H04J 3/24* (2006.01)
(52) U.S. Cl. ........ 370/474; 370/392; 370/412; 370/428; 370/476
(58) Field of Classification Search .................. 370/474, 370/351, 389–392, 412, 428, 476
See application file for complete search history.

(56) References Cited

U.S. PATENT DOCUMENTS

| 6,157,674 | A | * | 12/2000 | Oda et al. ................. 375/240 |
| 6,385,212 | B1 | * | 5/2002 | Baba et al. ............... 370/506 |
| 6,542,518 | B1 | | 4/2003 | Miyazawa |
| 2006/0127056 | A1 | * | 6/2006 | Yahata et al. ............. 386/112 |

FOREIGN PATENT DOCUMENTS

| JP | 9-116520 | 5/1997 |
| JP | 2002-158710 | 5/2002 |
| JP | 2003-23601 | 1/2003 |
| JP | 2003-78873 | 3/2003 |
| WO | 98/43423 | 10/1998 |

OTHER PUBLICATIONS

International Search Report issued Jan. 15, 2008 in the International (PCT) Application No. PCT/JP2007/070923.

* cited by examiner

*Primary Examiner* — Luat Phung
(74) *Attorney, Agent, or Firm* — Wenderoth, Lind & Ponack, L.L.P.

(57) ABSTRACT

A multiplexing pattern generator generates a multiplexing pattern signal indicating the order of types of data to be multiplexed. A video remaining size calculator and an audio remaining size calculator calculate, as a remaining size, the size of multiplexable data of an elementary stream. A video packet generator and an audio packet generator generate a multiplex packet containing transmission data of a predetermined size, based on the multiplexing pattern signal and the remaining size. A multiplexer generates a multiplexed stream. The video remaining size calculator and the audio remaining size calculator calculate the remaining size, based on the data size per access unit and the transmission size of transmission data. The video packet generator and the audio packet generator generate a multiplex packet, if the data type indicated by the multiplexing pattern signal shows matching, and the remaining size is equal to or larger than the transmission size.

28 Claims, 24 Drawing Sheets

APPARATUSES AND METHOD FOR MULTIPLEXING ELEMENTARY STREAMS BASED ON A MULTIPLEXING PATTERN INDICATING AN ORDER OF TYPES OF DATA TO BE MULTIPLEXED

TECHNICAL FIELD

The present invention relates to a multiplexing device, an integrated circuit, a multiplexing method, and a multiplexing program for multiplexing multiple elementary streams, as well as a computer-readable recording medium recorded with a multiplexing program, and a computer-readable recording medium recorded with a multiplexed stream.

BACKGROUND ART

In recent years, digitization has been rapidly carried out in the technical field of broadcasting. For instance, a digital broadcast system has been put into practice. In the digital broadcast system, contents data such as video data and audio data, service information, and program information are multiplexed in a digital format for broadcast. Generally, contents data such as video data and audio data is subjected to compression encoding, based on the specifications such as an MPEG (Moving Picture Experts Group) system; fragments of encoded data i.e. compression-encoded contents data are packetized; and the packets are transmitted as a stream of signals.

A receiver, upon receiving the signal stream, is operable to restore the contents data by extracting the encoded data from the signal stream, and decoding the extracted encoded data. In the digital broadcast system, the digital broadcast is performed by using a technique of transmitting a stream of signals i.e. transmitting a signal stream called a transport stream.

In particular, for instance, in the MPEG system, in generating a transport stream obtained by multiplexing multiple encoded data such as video encoded data and audio encoded data, a system target decoder (hereinafter, called as "STD" according to needs) is used as a standard decoder model for performing a decoding operation. Specifically, in the MPEG system, a transport stream is generated based on the STD so that a multiplexing device does not cause breakdown of the STD, thereby enabling the decoder to properly perform a decoding operation. In view of this, for instance, in a multiplexing device for use in the digital broadcast system, a transport stream is generated by virtually and sequentially monitoring storage statuses of various buffers provided in the STD, and controlling the STD in such a manner as to avoid buffer breakdown such as a buffer overflow or a buffer underflow.

In the technical field of consumer video devices, for instance, a technique of increasing the capacity of a recording medium such as a hard disk or an optical disc for recording information in a digital format has rapidly progressed. With use of a recording and reproducing device called a DVD recorder, it is possible to record large-capacity data such as video data in general houses. Miniaturization of a recording medium has also rapidly progressed. For instance, it is possible to record or reproduce contents data such as video data and audio data by mounting a memory card such as an SD (Secure Digital) memory card or an electronic card in a mobile phone device, a digital camera device, or a like device.

In the case where contents data is recorded in a recording medium, basically, a method for recording contents data in conformity with individual formats of recording media in the aforementioned stream format has been generally put into practice. In view of this, a video camera device or a like device utilizing the above method is provided with an encoder for subjecting contents data to compression encoding; packetizing means for packetizing encoded video/audio data, and data for controlling the device; and multiplexing means for multiplexing the packets in order to generate a signal stream. If the encoder or the multiplexing device for use in the digital broadcast system is used in a consumer device such as a video camera device, the cost of the consumer device may be sharply increased. In view of this, there has been proposed a technique relating to a signal stream generating method to be applied to the consumer device.

As an example of the technique, for instance, there is known a multiplexing device for multiplexing multiple encoded data, without the need of virtual control of the STD. Specifically, in the technique of performing a multiplexing operation while virtually and sequentially monitoring storage statuses of the buffers in the STD, a complicated operation is required. Therefore, it is improper to apply the above technique to the consumer device. In view of this, there is proposed a multiplexing device for generating a multiplexed stream by alternately multiplexing packets according to a predetermined order so that the ratio between the number of packets containing encoded video data and the number of packets containing encoded audio data coincides with the ratio of bit rate between the encoded video data and the encoded audio data (see e.g. patent document 1).

FIG. 23 is a block diagram showing an arrangement of a conventional multiplexing device. The conventional multiplexing device 91 shown in FIG. 23 is a device for recording a multiplexed stream in a portable recording medium 92 by subjecting video data and audio data to compression encoding in accordance with the MPEG-1 specifications, respectively, and multiplexing a video stream composed of the encoded video data and an audio stream composed of the encoded audio data, respectively.

In the multiplexing device 91 shown in FIG. 23, a video encoder 911 subjects inputted video data to compression encoding at a fixed bit rate in accordance with a control signal from a CPU 916. Then, the video encoder 911 sequentially transmits a video stream composed of the video encoded data to a video input buffer 912. The video input buffer 912 temporarily stores the video stream, and transmits the temporarily stored video stream to an output buffer 915 in response to a request from the CPU 916.

Similarly to the above, an audio encoder 913 subjects inputted audio data to compression encoding at a fixed bit rate in accordance with a control signal from the CPU 916. Then, the audio encoder 913 sequentially transmits an audio stream composed of the audio encoded data to an audio input buffer 914. The audio input buffer 914 temporarily stores the audio stream, and transmits the temporarily stored audio stream to the output buffer 915 in response to a request from the CPU 916.

The output buffer 915 stores data outputted from the video input buffer 912 and the audio input buffer 914, header information generated in the CPU 916, and the like in a designated address under the control of the CPU 916. In storing the data, the CPU 916 is operable to extract packet data of an identical data length according to a predetermined order from the video stream and the audio stream of a fixed bit rate, which have been temporarily stored in the video input buffer 912 and the audio input buffer 914, respectively; generate header data of a fixed data length with respect to each of the packet data; and control the output buffer 915 to alternately store the header data therein.

As described above, the output buffer 915 is operable to store a multiplexed stream composed of header data, packet data containing partial data of a video stream, and packet data containing partial data of an audio stream alternately according to a predetermined order.

The multiplexing device 91 outputs the multiplexed stream to the portable recording medium 92. In this way, the multiplexing device 91 performs a multiplexing operation to record a multiplexed stream generated by a multiplexing operation into the portable recording medium 92.

As described above, in performing a multiplexing operation, it is necessary to generate a multiplexed stream in such a manner that a decoder buffer does not cause overflow and underflow. In view of this, the multiplexing device 91 performs a multiplexing operation in such a manner that the ratio between the number of packet data of a video stream and the number of packet data of an audio stream coincides with the ratio of bit rate between the video stream and the audio stream. This enables to make the transmission bit rates of a pack and header data constant, and make the data amounts of a video stream and an audio stream to be transmitted per unit time constant, thereby preventing overflow of an STD buffer at the time of decoding a multiplexed stream.

FIG. 24 is a conceptual diagram showing a method for allocating video packets and audio packets in a conventional multiplexing device. A method for allocating video packets and audio packets is described with use of a multiplexed stream 241 shown in FIG. 24, wherein the bit rate (hereinafter, called as a "video rate") of a video stream is 128 kbps, and the bit rate (hereinafter, called as an "audio rate") of an audio stream is 32 kbps, in other words, the ratio between the video rate and the audio rate is 4:1. Referring to FIG. 24, a block with the symbol "V" indicates a video packet i.e. a packet containing a segment of a video stream; and a block with the symbol "A" indicates an audio packet i.e. a packet containing a segment of an audio stream.

Specifically, the multiplexing device 91 is operable to generate a multiplexed stream in such a manner that each of the encoded video stream and the encoded audio stream is divided into a number of packet data of a predetermined amount; and packet groups each composed of four video packets and one audio packet are alternately multiplexed, as shown by the multiplexed stream 241, because the ratio between the number of packet data of the video stream and the number of packet data of the audio stream is set to 4:1, which is a ratio of fixed bit rate between the video stream and the audio stream.

A transfer bit rate Rmux of the entirety of the multiplexed stream is equal to the sum of bit rates of the encoded video stream and the encoded audio stream i.e. Rmux=128 kbps+32 kbps=160 kbps. Specifically, video data and audio data are always contained in a multiplexed stream of 160 kbps at a predetermined ratio so that the ratio of the video rate and the audio rate is set to 4:1. In this arrangement, there is no likelihood that data over a predetermined amount may be inputted to an STD buffer in a decoder per unit time, thereby preventing a buffer overflow.

The multiplexing device 91 is also configured to perform a multiplexing operation in such a manner that after a predetermined amount of inputted data is accumulated in the STD buffer, the decoder sequentially reads out the data to start a decoding operation. Specifically, the data amounts of a video stream and an audio stream per access unit are not constant in an actual operation. Accordingly, the amount of data to be inputted to the STD buffer may not be constant, thereby causing a buffer underflow. The access unit corresponds to a picture or a frame in encoding video data, and corresponds to an audio frame in encoding audio data.

In order to prevent a buffer underflow, a certain time for accumulating data before a decoding operation is started is defined in the multiplexing device 91. The time for accumulating data into a decoder buffer in advance is called a startup delay time. A multiplexed stream 242 shown in FIG. 24 has a startup delay time.

By defining the startup delay time, an operation of decoding a multiplexed stream is started after data is accumulated in the STD buffer by a period corresponding to the startup delay time. Further, a decoding start timing is delayed from a point of time when leading data of a multiplexed stream is transferred to the STD buffer, by the startup delay time.

As described above, the conventional multiplexing device 91 prevents an overflow of an STD buffer at a decoding time by performing a multiplexing operation so that the ratio between the number of video packets and the number of audio packets having an identical data length coincides with the ratio of fixed bit rate between the video packets and the audio packets in generating a multiplexed stream.

Further, in the conventional multiplexing device 91, underflow of the STD buffer at a decoding time is prevented by defining a startup delay time for accumulating video packets and audio packets in the STD buffer before a decoding start timing; and including the startup delay time in time stamp data indicating the decoding start timing or a like timing in performing a multiplexing operation.

The conventional multiplexing device 91 having the above configuration enables to multiplex multiple encoded data, without the need of virtual control of an STD.

As described above, the conventional multiplexing device is capable of avoiding breakdown of a decoder buffer in multiplexing multiple encoded data generated at a fixed bit rate. However, the conventional multiplexing device has a drawback that the buffer may cause breakdown in processing encoded data generated at a variable bit rate.

Specifically, for instance, in the MPEG system, the amount of encoded data generated by subjecting video data to compression encoding greatly differs depending on kinds of format e.g. I-picture format, P-picture format, and B-picture format, and also greatly differs depending on the contents of images. Accordingly, in the case where a sequence of flat or motionless images is processed, the amount of video encoded data per access unit is extremely lessened, with the result that a buffer underflow and a buffer overflow may be unavoidable solely by defining the startup delay time.

In the conventional multiplexing device, a multiplexing operation is performed while simulating the storage status of a decoder buffer to avoid breakdown of the decoder buffer. However, the decoder has multiple buffers, and the operations of the buffers are complicated. Accordingly, the processing amount and the processing time concerning the entirety of a multiplexing operation may be increased.

Patent document 1: JP2003-78873A

DISCLOSURE OF THE INVENTION

In view of the above, it is an object of the invention to provide a multiplexing device, an integrated circuit, a multiplexing method, a multiplexing program, a computer-readable recording medium recorded with a multiplexing program, and a computer-readable recording medium recorded with a multiplexed stream that enable to prevent breakdown of a decoder buffer, and shorten a time required for a multiplexing operation, even if encoded data generated by an encoder is variable length encoded data generated at a variable bit rate.

A multiplexing device according to an aspect of the invention is a multiplexing device for multiplexing elementary streams, which have respective content types and are respectively composed of encoded data generated per access unit, in the unit of multiplex packets to generate a multiplexed stream composed of the multiplex packets. The multiplexing device includes: a multiplexing pattern generating section for generating a multiplexing pattern signal corresponding to a multiplexing pattern indicating an order of types of data to be multiplexed; a buffer section for temporarily storing the elementary stream; a remaining size calculating section for calculating, as a remaining size, a size of multiplexable data of the elementary stream stored in the buffer section to output remaining size information indicating the remaining size; a packet generating section for reading out, as transmission data, data of a predetermined size from the elementary stream stored in the buffer section, based on the multiplexing pattern signal generated by the multiplexing pattern generating section, and the remaining size information outputted from the remaining size calculating section, to generate the multiplex packet containing the readout transmission data; and a multiplexing section for multiplexing the multiplex packets generated by the packet generating section in an order of generation to generate the multiplexed stream, wherein the remaining size calculating section is operable to calculate the remaining size, based on a data size per access unit, and the size of the transmission data contained in the multiplex packet generated by the packet generating section, as a transmission size, and the packet generating section is operable to generate the multiplex packet, if the data type indicated by the multiplexing pattern signal shows matching, and the remaining size is equal to or larger than the transmission size.

In the above arrangement, the multiplexing pattern generating section is operable to generate a multiplexing pattern signal corresponding to a multiplexing pattern indicating an order of types of data to be multiplexed. The buffer section is operable to temporarily store the elementary stream. The remaining size calculating section is operable to calculate, as a remaining size, a size of multiplexable data of the elementary stream stored in the buffer section to output remaining size information indicating the remaining size. The packet generating section is operable to read out, as transmission data, data of a predetermined size from the elementary stream stored in the buffer section, based on the multiplexing pattern signal and the remaining size information, to generate the multiplex packet containing the readout transmission data. Thereafter, the multiplexing section is operable to multiplex the multiplex packets generated by the packet generating section in an order of generation to generate the multiplexed stream. The remaining size calculating section is operable to calculate the remaining size, based on a data size per access unit, and a size of the transmission data contained in the multiplex packet generated by the packet generating section, as a transmission size. The packet generating section is operable to generate the multiplex packet, if the data type indicated by the multiplexing pattern signal shows matching, and the remaining size is equal to or larger than the transmission size.

According to the aspect of the invention, if the data type indicated by the multiplexing pattern signal shows matching, and the remaining size is equal to or larger than the transmission size, a multiplex packet is generated. Accordingly, even if encoded data generated by an encoder is variable length encoded data generated at a variable bit rate, breakdown of a decoder buffer can be prevented. Further, the remaining size is calculated, based on the data size per access unit, and the transmission size of transmission data contained in the multiplex packet, and a multiplexing operation is performed by simulation of an encoder buffer. Accordingly, as compared with a conventional multiplexing operation to be performed by simulation of a decoder buffer, a time required for a multiplexing operation can be shortened.

These and other objects, features and advantages of the present invention will become more apparent upon reading of the following detailed description along with the accompanying drawings.

BEST MODE FOR CARRYING OUT THE INVENTION

Figure 1:
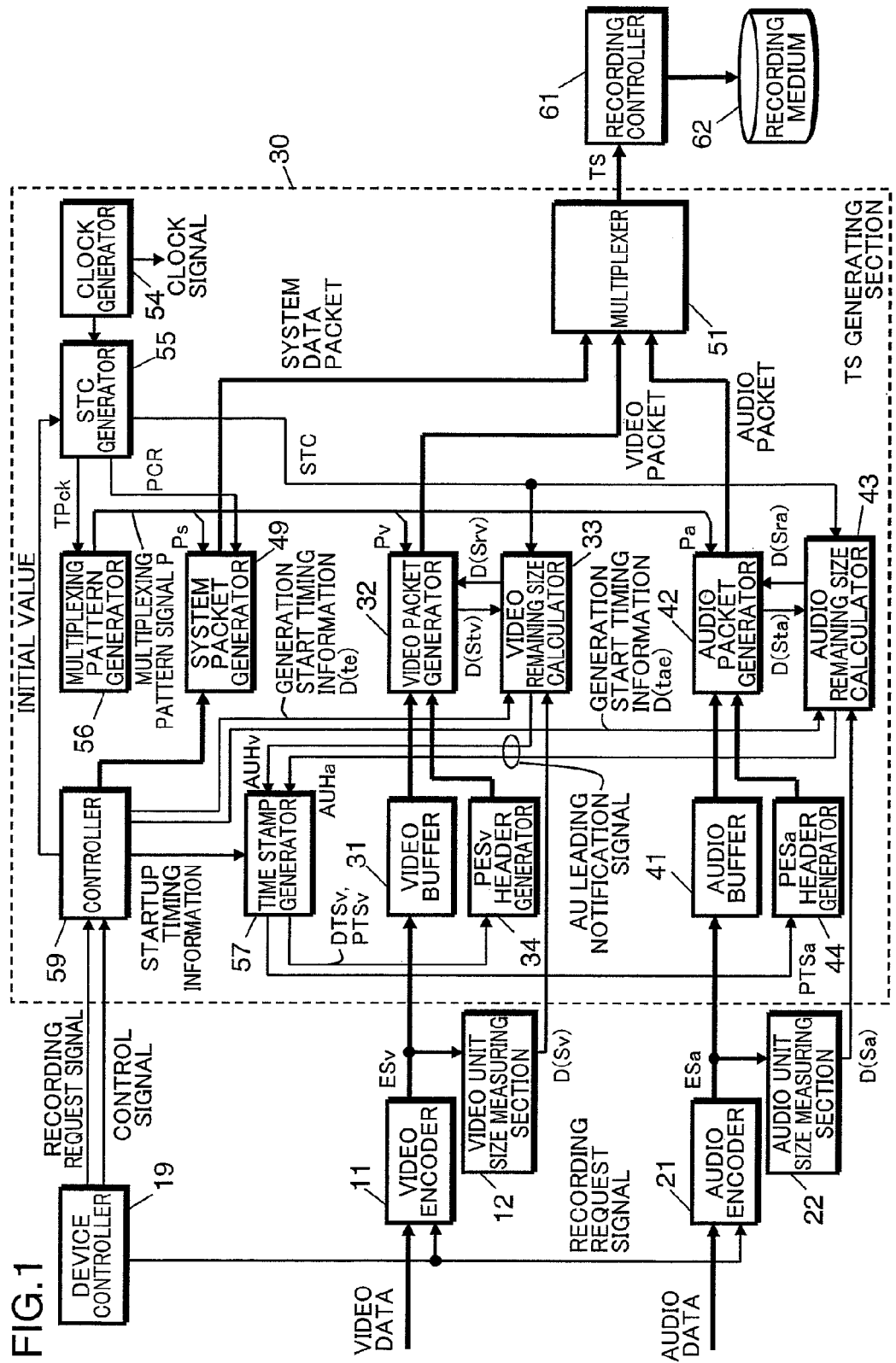
FIG. 1 is a block diagram showing an arrangement of a multiplexing device in accordance with a first embodiment of the invention.

In the following, embodiments of the invention are described referring to the drawings.

First Embodiment

FIG. 1 is a block diagram showing a configuration of a multiplexing device in accordance with the first embodiment of the invention. In this embodiment, there is described an arrangement of a multiplexing device for subjecting contents data of video and audio as contents i.e. video data and audio data to compression encoding, and multiplexing the encoded video data and the encoded audio data into a transport stream, as a multiplexed stream, to record the transport stream in a recording medium. The multiplexing device of this embodiment is applied to encoded data generated based on MPEG-2 or MPEG-4 AVC format, as a known compression encoding format. The compression encoding format to be used in this embodiment is not limited to an MPEG format, but other compression encoding format of outputting encoded data per access unit at a constant rate may be used.

As shown in FIG. 1, video data and audio data to be recorded in a recording medium 62 is supplied to the multiplexing device. A video encoder 11 is operable to subject inputted video data to compression encoding at e.g. a predetermined video frame cycle as a unit time under the control of a device controller 19 to output the video encoded data at an interval of access units of video.

In this embodiment, the video encoder 11 is operable to subject inputted video data to an intra-frame coding process called I-picture, an inter-frame forward predictive coding process called P-picture, and an inter-frame bidirectional predictive coding process called B-picture according to the MPEG-2 format at an interval of a video frame cycle Tfr corresponding to an interval of video access units to output variable length encoded data whose bit length is variable per access unit.

In this embodiment, a video frame cycle, corresponding to a certain number of frames of moving images to be sequentially scanned, is defined as a time unit. Alternatively, a video field cycle, corresponding to a certain number of frames of moving images obtained by skip scanning i.e. interlacing, may be defined as a time unit. Further alternatively, an interval of access units capable of outputting variable length encoded data per access unit may be defined as a time unit.

Video encoded data whose bit length is variable per access unit is supplied to a video unit size measuring section 12 and a transport stream generating section 30 (hereinafter, also called as a "TS generating section 30") to be described later, as a video elementary stream ESv composed of video encoded data. Hereinafter, in this embodiment, the video elementary stream ESv is described as an elementary stream having a variable bit rate, which is composed of variable length encoded data whose maximum bit rate is defined.

The video unit size measuring section 12 is operable to measure an actual video size Sv e.g. a bit amount of video encoded data generated at an interval of the video frame cycle Tfr, out of the video elementary stream ESv; and notify the TS generating section 30 of actual video size information D(Sv) indicating the measured actual video size Sv per access unit.

An audio encoder 21 is operable to subject inputted audio data to compression encoding at an interval of e.g. an audio frame cycle as a time unit under the control of the device controller 19 to output the audio encoded data generated at an interval of access units of audio.

In this embodiment, the audio encoder 21 is operable to encode the inputted audio data to output audio encoded data whose bit length is fixed per access unit, at an interval of an audio frame cycle Tafr corresponding to an interval of audio access units. Audio encoded data whose bit length is fixed per access unit is supplied to an audio unit size measuring section 22 and the TS generating section 30 to be described later, as an audio elementary stream ESa composed of audio encoded data.

The audio unit size measuring section 22 is operable to measure an actual audio size Sa e.g. a bit amount of audio encoded data generated at an interval of the audio frame cycle Tafr, out of the audio elementary stream ESa; and notify the TS generating section 30 of actual audio size information D(Sa) indicating the measured actual audio size Sa per access unit.

The device controller 19 is constituted of e.g. a CPU (Central Processing Unit), and controls overall operations of the multiplexing device. Specifically, for instance, in the case where a user wishes to record contents composed of video and audio, designation information from a user is notified to the device controller 19. The device controller 19 is operable to control the individual parts of the multiplexing device, and perform an operation necessary for controlling the parts, upon receiving the designation information from the user. For instance, in the case where the user designates to record contents, the device controller 19 notifies the video encoder 11, the audio encoder 21, and the TS generating section 30 to be described in the following section of a recording request signal indicating a request to record the contents.

As described above, elementary streams composed of encoded data generated by the encoder per access unit individually depending on the types of contents such as video and audio are supplied to the TS generating section 30.

The TS generating section 30 is operable to temporarily store the elementary streams of video and audio, sequentially read out the encoded data of the stored elementary streams, and convert the encoded data per access unit into a packetized elementary stream (hereinafter, also called as "PES").

The TS generating section 30 is also operable to sequentially generate TS packets, as multiplex packets containing a video PES and an audio PES to multiplex the TS packets. In this way, the TS generating section 30 is operable to multiplex elementary streams of video and audio, in the unit of TS packets, into a transport stream TS, as a multiplexed stream composed of TS packets.

The transport stream TS generated by the TS generating section 30 is supplied to a recording controller 61, and recorded in the recording medium 62 in accordance with the format of the recoding medium 62. In this way, the contents data supplied to the multiplexing device is recorded in the recording medium 62 as a transport stream TS.

Next, an arrangement of the TS generating section 30 is described. The TS generating section 30 in the multiplexing device of the embodiment includes a multiplexing pattern generator 56, a video buffer 31, a video packet generator 32, a video remaining size calculator 33, an audio buffer 41, an audio packet generator 42, an audio remaining size calculator 43, a system packet generator 49, and a multiplexer 51.

The multiplexing pattern generator 56 is operable to generate a multiplexing pattern signal P corresponding to a multiplexing pattern indicating the order or combination of types of data to be multiplexed i.e. video data, audio data, and system data.

The video buffer 31 is operable to temporarily store the video elementary stream ESv. The video remaining size calculator 33 is operable to calculate, as a video remaining size Srv, the size of multiplexable data of the video elementary stream ESv stored in the video buffer 31 to output video remaining size information D(Srv) indicating the calculated video remaining size Srv. The video packet generator 32 is operable to read out, as transmission data, data of a predetermined size from the video elementary stream ESv stored in the video buffer 31, based on the multiplexing pattern signal P and the video remaining size information D(Srv), to generate a TS packet containing the readout transmission data.

The audio buffer 41 is operable to temporarily store the audio elementary stream ESa. The audio remaining size calculator 43 is operable to calculate, as an audio remaining size Sra, the size of multiplexable data of the audio elementary stream ESa stored in the audio buffer 41 to output audio remaining size information D(Sra) indicating the calculated audio remaining size Sra. The audio packet generator 42 is operable to read out, as transmission data, data of a predetermined size from the audio elementary stream ESa stored in the audio buffer 41, based on the multiplexing pattern signal P and the audio remaining size information D(Sra), to generate a TS packet containing the readout transmission data.

The system packet generator 49 is operable to generate a TS packet containing system data including information relating to a transport stream TS to be generated, based on the multiplexing pattern signal P. The multiplexer 51 is operable to multiplex the TS packets generated by the video packet generator 32, the audio packet generator 42, and the system packet generator 49 in the order of generation to generate a transport stream TS.

The TS generating section 30 in this embodiment further includes a controller 59, a clock generator 54, a system time clock generator 55, a time stamp generator 57, a PESv header generator 34, and a PESa header generator 44.

The controller 59 is operable to control the individual parts of the TS generating section 30, and perform an operation necessary for controlling the parts. The clock generator 54 is operable to generate a clock signal in the TS generating section 30. The system time clock generator 55 is operable to generate a reference timing in the TS generating section 30, using a clock signal from the clock generator 54. The time stamp generator 57 is operable to generate time stamp information, using information from the controller 59.

The PESv header generator 34 is operable to receive time stamp information generated by the time stamp generator 57, and generate header data of a video PES including the time stamp information. The PESa header generator 44 is operable to receive time stamp information generated by the time stamp generator 57, and generate header data of an audio PES including the time stamp information.

The video remaining size calculator 33 is operable to calculate the video remaining size Srv, based on the actual video size Sv i.e. the data size per video access unit, and a video transmission size Stv i.e. the size of transmission data contained in a TS packet by the video packet generator 32. The video packet generator 32 is operable to generate a TS packet, if the data type indicated by the multiplexing pattern signal P agrees, and the video remaining size Srv is equal to or larger than the video transmission size Stv.

Similarly to the above, the audio remaining size calculator 43 is operable to calculate the audio remaining size Sra, based on the actual audio size Sa i.e. the data size per audio access unit, and an audio transmission size Sta i.e. the size of transmission data contained in a TS packet by the audio packet generator 42. The audio packet generator 42 is operable to generate a TS packet, if the data type indicated by the multiplexing pattern signal P is identical, and the audio remaining size Sra is equal to or larger than the audio transmission size Sta.

The TS generating section 30 in the multiplexing device of this embodiment has the aforementioned arrangement. Specifically, the video remaining size calculator 33 is operable to notify the video packet generator 32 of the amount of multiplexable data, out of the data stored in the video buffer 31, as the video remaining size information D(Srv); and the audio remaining size calculator 43 is operable to notify the audio packet generator 42 of the amount of multiplexable data, out of the data stored in the audio buffer 41, as the audio remaining size information D(Sra), respectively. In response to a request to generate a TS packet by the multiplexing pattern signal P, the video packet generator 32 is operable to generate a TS packet, referring to the video remaining size information D(Srv), if data of a size sufficient for TS packet generation is stored in the video buffer 31; and the audio packet generator 42 is operable to generate a TS packet, referring to the audio remaining size information D(Sra), if data of a size sufficient for TS packet generation is stored in the audio buffer 41.

The TS generating section 30 in the multiplexing device of this embodiment has the aforementioned basic arrangement. A video elementary stream and an audio elementary stream supplied to the multiplexing device are multiplexed in accordance with a multiplexing pattern generated by the multiplexing pattern generator 56. This arrangement enables to multiplex the video elementary stream and the audio elementary stream at a ratio depending on the multiplexing pattern by properly defining the multiplexing pattern. This arrangement also enables to suspend generation of a TS packet, based on the video remaining size calculated by the video remaining size calculator 33, and the audio remaining size calculated by the audio remaining size calculator 43, if the amount of encoded data per access unit is extremely small, or multiplexable data is not available.

Next, a detailed arrangement of the TS generating section 30 in the multiplexing device of this embodiment is described.

First, in response to issuance of a recording request signal indicating a request to record the contents from the device controller 19 to the video encoder 11, the audio encoder 21, and the TS generating section 30, the video encoder 11 and the audio encoder 21 start a compression encoding operation. Then, the video encoder 11 starts outputting a video elementary stream ESv at a predetermined timing, and the audio encoder 21 starts outputting an audio elementary stream ESa at a predetermined timing.

Thereafter, the video encoder 11 sequentially supplies, to the video buffer 31, the video elementary stream ESv i.e. video encoded data in the format of I-picture, P-picture, or B-picture per access unit at an interval of the video frame cycle Tfr; and the video unit size measuring section 12 notifies the video remaining size calculator 33 of the actual video size information D(Sv).

Likewise, the audio encoder 21 sequentially supplies, to the audio buffer 41, the audio elementary stream ESa i.e. audio encoded data per access unit at an interval of the audio frame cycle Tafr; and the audio unit size measuring section 22 notifies the audio remaining size calculator 43 of the actual audio size information D(Sa).

The video buffer 31 is operable to sequentially store the video encoded data composing the video elementary stream ESv. The video buffer 31 is also operable to define a data area from which data is read out by the video packet generator 32, as an empty area; and define the empty area as a new storage area. In this way, the video buffer 31 is operable to temporarily store video encoded data by storing new data to be supplied from the video encoder 11, and sequentially supplying the data stored in the video buffer 31 to the video packet generator 32 in the order of storage.

The audio buffer 41 is operable to sequentially store the audio encoded data composing the audio elementary stream ESa. The audio buffer 41 is also operable to define a data area from which data is read out by the audio packet generator 42, as an empty area; and define the empty area as a new storage area. In this way, the audio buffer 41 is operable to temporarily store audio encoded data by storing new data to be supplied from the audio encoder 21, and sequentially supplying the data stored in the audio buffer 41 to the audio packet generator 42 in the order of storage.

Upon issuance of the recording request signal from the device controller 19 to the TS generating section 30, the recording request signal is issued to the controller 59 in the TS generating section 30. Upon receiving the recording request signal, the controller 59 notifies the following information to the system time clock generator 55, the time stamp generator 57, the video remaining size calculator 33, and the audio remaining size calculator 43; and controls the individual parts of the TS generating section 30 to start initial operations thereof.

Specifically, the controller 59 is operable to notify the system time clock generator 55 of an initial value of a system time clock. The controller 59 is also operable to notify the time stamp generator 57 of information including startup timing related information such as a startup delay time Tsu and a correction time Tsc to be described later, and time information indicating the video frame cycle Tfr and the audio frame cycle Tafr. The controller 59 is also operable to notify the video remaining size calculator 33 of video generation start timing information D(te) indicating a video generation start timing "te" corresponding to a point of time when a TS packet containing video encoded data is generated. The controller 59 is also operable to notify the audio remaining size calculator 43 of audio generation start timing information D(tae) indicating an audio generation start timing "tae" corresponding to a point of time when a TS packet containing audio encoded data is generated.

As described above, the TS generating section 30 is operable to start an initial operation under the control of the controller 59. The video generation start timing "te" corresponds to a point of time when summation of data size per video access unit is started by the video remaining size calculator 33, and is defined as a reference timing in the multiplexing device. The video generation start timing "te" is described in detail in the following.

The system time clock generator 55 is operable to generate a system time clock (hereinafter, also called as "STC"), as a reference timing in the TS generating section 30 by counting a clock signal from the clock generator 54, with an initial value to be supplied from the controller 59 being defined as an initial timing. The multiplexing device in this embodiment performs a predetermined operation at respective timings by referring to the STC, with the time of the STC to be outputted from the system time clock generator 55 being defined as a reference timing.

The time of the STC generated by the system time clock generator 55 is notified to the video remaining size calculator 33 and the audio remaining size calculator 43 as STC information. The time of the STC generated by the system time clock generator 55 is notified to the system packet generator 49, as program clock reference (hereinafter, also called as "PCR") information. The PCR information is superimposed on a transport stream to establish clock synchronization between a data transmitter and a data receiver, or an encoder and a decoder.

In the case where a transport stream is recorded in the recording medium 62 as described in this embodiment, the PCR information is utilized to establish synchronization between a system time clock provided in e.g. a reproducing device for reproducing data from the recording medium 62, and a transport stream to be reproduced. The system time clock generator 55 is operable to transmit, to the multiplexing pattern generator 56, a clock signal TPck of a TS packet cycle, which has been generated by frequency-dividing a clock signal from the clock generator 54.

The multiplexing pattern generator 56 is operable to generate a multiplexing pattern signal P in the unit of a TS packet length, utilizing the clock signal TPck issued from the system time clock generator 55. As described above, the multiplexing pattern signal P is a signal representing a multiplexing pattern i.e. an allocation pattern indicating the order or combination of types of data i.e. video data, audio data, and system data. Specifically, in the case where video data is represented by "V", audio data is represented by "A", and system data is represented by "S", a multiplexing pattern is a pattern represented by e.g. "VVVAVVVS". The multiplexing pattern is not limited to the one described in the first embodiment, but various modifications may be applicable.

The multiplexing pattern generator 56 is operable to notify the multiplexing pattern signal P to the video packet generator 32, the audio packet generator 42, and the system packet generator 49. The video packet generator 32, the audio packet generator 42, and the system packet generator 49 are operable to determine whether a TS packet is to be generated, referring to the multiplexing pattern signal P.

For instance, in the case where a current time corresponds to "V" in the multiplexing pattern, the video packet generator 32 determines that it is requested to generate a TS packet; and the audio packet generator 42 and the system packet generator 49 determine that they are requested to suspend generating a TS packet.

In this way, in the case where it is judged that multiplexable data is available, a TS packet containing either one of video data, audio data, and system data is supplied to the multiplexer 51 according to a multiplexing pattern. Thereby, the multiplexer 51 transmits a transport stream TS obtained by multiplexing these data according to the order represented by the multiplexing pattern.

The multiplexing device of this embodiment has a feature that with use of a multiplexing pattern, a period for generating a TS packet is cyclically repeated at a predetermined ratio, depending on the type of data to be contained in the TS packet. In this embodiment, the ratio is determined based on a maximum bit rate defined by the type of data to be contained in a TS packet. Specifically, an example of the multiplexing pattern to be used in this embodiment is a pattern, wherein the pattern represented by "VVVAVVVS" is cyclically repeated.

The ratio of data types in the multiplexing pattern is a ratio between a video period having a bit rate equal to or larger than a maximum bit rate of the video elementary stream ESv, and an audio period having a bit rate equal to or larger than a maximum bit rate of the audio elementary stream ESa. The audio period is constituted of a period corresponding to audio encoded data, and a period corresponding to system data at a predetermined ratio. The multiplexing pattern in this embodiment is described in detail in the following.

The time stamp generator 57 is operable to generate decoding time stamp (hereinafter, also called as "DTS") information, and presentation time stamp (hereinafter, also called as "PTS") information, as time stamp information, using startup information relating to a startup timing such as the startup delay time Tsu and the correction time Tsc, and time information indicating the video frame cycle Tfr and the audio frame cycle Tafr, which are notified from the controller 59.

The DTS represents a decoding timing by a decoder, and the PTS represents a reproducing timing for presenting decoded data. The startup information is information relating to a startup delay time corresponding to a time for accumulating data in a decoder buffer in advance. Specifically, defining an offset time corresponding to the startup delay time Tsu to be notified by the startup information in a DTS value with respect to a PCR value to be superimposed on a transport stream TS is advantageous in accumulating data in a decoder buffer prior to start of a decoding operation, and preventing an underflow of the decoder buffer, as described in the foregoing section.

The time stamp generator 57 is operable to notify the PESv header generator 34 of DTSv information as DTS information, and PTSv information as PTS information with respect to a video elementary stream ESv. The time stamp generator 57 is operable to notify the PESa header generator 44 of PTSa information as PTS information with respect to an audio elementary stream ESa.

The time stamp generator 57 is operable to output the DTS information and the PTS information at a timing corresponding to an AU leading notification signal to be notified from the video remaining size calculator 33 and the audio remaining size calculator 43. The AU leading notification signal is a signal indicating that leading data of each of access units is included in transmission data.

Specifically, in response to issuance of a video AU leading notification signal AUHv for the first time from the video remaining size calculator 33 to the time stamp generator 57, the time stamp generator 57 is operable to define a timing delayed from the video generation start timing "te" by the startup delay time Tsu i.e. a point of time (te+Tsu), as a video decoding start timing "td"; and notify the PESv header generator 34 of DTSv information, wherein the video decoding start timing "td" is defined as a leading DTSv.

Upon receiving a succeeding video AU leading notification signal AUHv, the time stamp generator 57 is operable to notify the PESv header generator 34 of a timing delayed from the video decoding start timing "td" by the video frame cycle Tfr corresponding to an interval of video access units i.e. a point of time (td+Tfr), as DTSv information indicating a succeeding DTSv.

Then, upon receiving a succeeding video AU leading notification signal AUHv, the time stamp generator 57 is operable to notify the PESv header generator 34 of a timing delayed from the video decoding start timing "td" by 2Tfr corresponding to two video frames i.e. a point of time (td+2Tfr), as DTSv information indicating a succeeding DTSv.

The time stamp generator 57 is operable to notify the PESv header generator 34 of DTSv information, each time a video AU leading notification signal AUHv is issued from the video remaining size calculator 33. The time stamp generator 57 is also operable to notify the PESv header generator 34 of PTSv information generated based on the DTSv information and the type of video frame.

Similarly to the above, in response to issuance of an audio AU leading notification signal AUHa for the first time from the audio remaining size calculator 43 to the time stamp generator 57, the time stamp generator 57 is operable to define a timing delayed from the audio generation start timing "tae" by the audio frame cycle Tafr i.e. a point of time (tae+Tafr), as an audio reproduction start timing; and notify the PESa header generator 44 of PTSa information, wherein the audio reproduction start timing is defined as a leading PTSa.

Upon receiving a succeeding audio AU leading notification signal AUHa, the time stamp generator 57 is operable to notify the PESa header generator 44 of a timing delayed from the audio generation start timing "tae" by 2Tafr corresponding to two audio frames i.e. a point of time (tae+2Tafr), as PTSa information indicating a succeeding PTSa.

The time stamp generator 57 is operable to notify the PESa header generator 44 of PTSa information, each time an audio AU leading notification signal AUHa is issued from the audio remaining size calculator 43.

In this way, the video remaining size calculator 33 is operable to notify the time stamp generator 57 of the video AU leading notification signal AUHv. The video remaining size calculator 33 is also operable to notify the video packet generator 32 of the video remaining size information D(Srv) indicating the video remaining size Srv, which is calculated based on the actual video size Sv i.e. the data size per video access unit, and the video transmission size Stv i.e. the size of transmission data contained in a TS packet generated by the video packet generator 32.

In order to generate the video AU leading notification signal AUHv and the video remaining size information D(Srv), the video remaining size calculator 33 is notified of the STC information from the system time clock generator 55; is notified of the video generation start timing information D(te) indicating the video generation start timing "te" from the controller 59; is notified of the actual video size information D(Sv) indicating the actual video size Sv per video access unit from the video unit size measuring section 12; and is notified of video transmission size information D(Stv) indicating the video transmission size Stv of transmission data contained in a TS packet from the video packet generator 32.

The video remaining size calculator 33 is operable to perform the following operation to generate the video remaining size information D(Srv). Specifically, the video remaining size calculator 33 sets the video remaining size Srv to 0 when an initial operation is started. The video remaining size calculator 33 monitors the time of the STC to be notified from the system time clock generator 55; and sequentially generates a timing which makes the time of the STC coincident with a timing corresponding to an interval of the video frame cycle Tfr, based on the video generation start timing "te" notified from the controller 59, in other words, generates a cyclic timing of the video frame cycle Tfr satisfying a requirement that an integer "n" in the equation: STC=te+n×Tfr is 0 or larger than 0.

The video remaining size calculator 33 is operable to read out the actual video size information D(Sv) at the video generation start timing "te", and then at an interval of the video frame cycle Tfr corresponding to an interval of video access units to sum up the actual video size Sv and the video remaining size Srv.

Specifically, the video generation start timing "te" corresponds to a point of time when summation of data sizes per video access unit is started. At a timing when the time of the STC coincides with the video generation start timing "te", the video remaining size calculator 33 is operable to read out the actual video size information D(Sv) corresponding to a first access unit. Thereafter, the video remaining size calculator 33 is operable to sequentially read out the actual video size information D(Sv) at an interval of the video frame cycle Tfr to sum up the video remaining size Srv and the actual video size Sv. Concurrently, the video remaining size calculator 33 is operable to subtract the video transmission size Stv from the video remaining size Srv, each time the video transmission size information D(Stv) is notified from the video packet generator 32.

In this way, the video remaining size calculator 33 is operable to calculate the video remaining size Srv by performing a computation of: summing up the actual video size Sv per access unit generated at an interval of the video frame cycle Tfr as a time unit, and the video remaining size Srv, at an interval of the video frame cycle Trf; and subtracting the video transmission size Stv, each time a TS packet containing transmission data is generated by the video packet generator 32. The video remaining size calculator 33 is operable to notify the video packet generator 32 of the calculated video remaining size Srv, as video remaining size information D(Srv).

Alternatively, the video remaining size calculator 33 may calculate the video remaining size Srv per access unit by performing a computation of: summing up the actual video size Sv per access unit generated at an interval of the video frame cycle Tfr as a time unit, at an interval of the video frame cycle Tfr; and subtracting the video transmission size Stv, each time a TS packet containing transmission data is generated by the video packet generator 32.

The video remaining size calculator 33 is operable to perform the aforementioned computation to obtain the video remaining size Srv, and monitor whether data to be read out from the video buffer 31 in a succeeding operation includes leading data, based on the actual video size information D(Sv) and the video transmission size information D(Stv). In the case where it is judged that leading data is included, the video remaining size calculator 33 is operable to notify the time stamp generator 57 of a video AU leading notification signal AUHv.

The PESv header generator 34 is operable to generate header information of a video PES including DTS information and PTS information notified from the time stamp generator 57; and transmit data including the header information of a video PES to the video packet generator 32, as video PES header data.

The video packet generator 32 is operable to generate a TS packet containing video encoded data, referring to the video remaining size information D(Srv) calculated by the video remaining size calculator 33, in accordance with the multiplexing pattern corresponding to the multiplexing pattern signal P to be notified from the multiplexing pattern generator 56, if the data type indicated by the multiplexing pattern signal P indicates video, and the video remaining size Srv indicated by the video remaining size information D(Srv) is equal to or larger than the video transmission size Stv of data to be transmitted in a succeeding operation.

Specifically, when the multiplexing pattern signal P indicates a timing requesting video data, the video packet generator 32 is operable to judge whether the video remaining size Srv is equal to or larger than the video transmission size Stv of data to be transmitted in a succeeding operation. If it is judged that the video remaining size Srv is equal to or larger than the video transmission size Stv of data to be transmitted in the succeeding operation, the video packet generator 32 is operable to read out video encoded data to be transmitted in the succeeding operation from the video buffer 31 to generate a TS packet containing the video encoded data. The video packet generator 32 is operable to supply the TS packet to the multiplexer 51, and notify the video remaining size calculator 33 of video transmission size information D(Stv) indicating the video transmission size Stv of transmission data contained in the TS packet.

The details on the above operation is described in the following. In the case where the video encoded data to be transmitted corresponds to leading data of an access unit, the video packet generator 32 is operable to read out video PES header data to be transmitted in a succeeding operation from the PESv header generator 34 to generate a TS packet containing the video PES header data. The size of the video PES header data is not included in the video transmission size Stv.

In the above example, the data type indicated by the multiplexing pattern signal P indicates video. In the case where the video remaining size Srv indicated by the video remaining size information D(Srv) is smaller than the video transmission size Stv of data to be transmitted in a succeeding operation, the video packet generator 32 is operable to generate a TS packet by filling an empty area with a stuffing byte. In the above example, the data type indicated by the multiplexing pattern signal P indicates video. In the case where the video remaining size Srv indicated by the video remaining size information D(Srv) is 0, in other words, there is no video encoded data to be transmitted, the video packet generator 32 may suspend an operation of generating a TS packet, or generate a TS packet containing padding data and supply the TS packet to the multiplexer 51.

The audio remaining size calculator 43 is operable to notify the time stamp generator 57 of the audio AU leading notification signal AUHa. The audio remaining size calculator 43 is also operable to notify the audio packet generator 42 of the audio remaining size information D(Sra) indicating the audio remaining size Sra, which is calculated based on the actual audio size Sa i.e. the data size per audio access unit, and the audio transmission size Sta i.e. the size of transmission data contained in a TS packet generated by the audio packet generator 42.

In order to generate the audio AU leading notification signal AUHa and the audio remaining size information D(Sra), the audio remaining size calculator 43 is notified of the STC information from the system time clock generator 55; is notified of the audio generation start timing information D(tae) indicating the audio generation start timing "tae" from the controller 59; is notified of the actual audio size information D(Sa) indicating the actual audio size Sa per audio access unit from the audio unit size measuring section 22; and is notified of the audio transmission size information D(Sta) indicating the audio transmission size Sta of transmission data contained in a TS packet from the audio packet generator 42.

The audio remaining size calculator 43 is operable to perform the following operation to generate the audio remaining size information D(Sra). Specifically, the audio remaining size calculator 43 sets the audio remaining size Sra to 0 when an initial operation is started. The audio remaining size calculator 43 monitors the time of the STC to be notified from the system time clock generator 55; and sequentially generates a timing which makes the time of the STC coincident with a timing corresponding to an interval of the audio frame cycle Tafr, based on the audio generation start timing "tae" notified from the controller 59, in other words, generates a cyclic timing of the audio frame cycle Tafr satisfying a requirement that an integer "k" in the equation: STC=tae+k×Tafr is 0 or larger than 0.

In this embodiment, a point of time delayed from the video decoding start timing "td" by the video frame cycle Tfr is defined as the audio presentation start timing; and a point of time advanced from the audio presentation start timing by the audio frame cycle Tafr is defined as the audio generation start timing "tae".

The audio remaining size calculator 43 is operable to read out the actual audio size information D(Sa) at the audio generation start timing "tae", and then at an interval of the audio frame cycle Tafr to sum up the actual audio size Sa and the audio remaining size Sra.

Specifically, at a timing when the time of the STC coincides with the audio generation start timing "tae", the audio remaining size calculator 43 is operable to read out the actual audio size information D(Sa) corresponding to a first access unit. Thereafter, the audio remaining size calculator 43 is operable to sequentially read out the actual audio size information D(Sa) at an interval of the audio frame cycle Tafr to sum up the audio remaining size Sra and the actual audio size Sa. Concurrently, the audio remaining size calculator 43 is operable to subtract the audio transmission size Sta from the audio remaining size Sra, each time the audio transmission size information D(Sta) is notified from the audio packet generator 42.

In this way, the audio remaining size calculator 43 is operable to calculate the audio remaining size Sra by performing a computation of: summing up the actual audio size Sa per access unit generated at an interval of the audio frame cycle Tafr as a time unit, and the audio remaining size Sra, at an interval of the audio frame cycle Tarf; and subtracting the audio transmission size Sta, each time a TS packet containing transmission data is generated by the audio packet generator 42. The audio remaining size calculator 43 is operable to notify the audio packet generator 42 of the calculated audio remaining size Sra, as audio remaining size information D(Sra).

Alternatively, the audio remaining size calculator 43 may calculate the audio remaining size Sra per access unit by performing a computation of: summing up the actual audio size Sa per access unit generated at an interval of the audio frame cycle Tafr as a time unit, at an interval of the audio frame cycle Tafr; and subtracting the audio transmission size Sta, each time a TS packet containing transmission data is generated by the audio packet generator 42.

The audio remaining size calculator 43 is operable to perform the aforementioned computation to obtain the audio remaining size Sra, and monitor whether data to be read out from the audio buffer 41 in a succeeding operation includes leading data, based on the actual audio size information D(Sa) and the audio transmission size information D(Sta). In the case where it is judged that leading data is included, the audio remaining size calculator 43 is operable to notify the time stamp generator 57 of an audio AU leading notification signal AUHa.

The PESa header generator 44 is operable to generate header information of an audio PES including PTS information notified from the time stamp generator 57; and transmit data including the header information of an audio PES to the audio packet generator 42, as audio PES header data.

The audio packet generator 42 is operable to generate a TS packet containing audio encoded data, referring to the audio remaining size information D(Sra) calculated by the audio remaining size calculator 43, in accordance with the multiplexing pattern indicated by the multiplexing pattern signal P to be notified from the multiplexing pattern generator 56, if the data type indicated by the multiplexing pattern signal P indicates audio, and the audio remaining size Sra indicated by the audio remaining size information D(Sra) is equal to or larger than the audio transmission size Sta of data to be transmitted in a succeeding operation.

Specifically, when the multiplexing pattern signal P indicates a timing requesting audio data, the audio packet generator 42 is operable to judge whether the audio remaining size Sra is equal to or larger than the audio transmission size Sta of data to be transmitted in a succeeding operation. If it is judged that the audio remaining size Sra is equal to or larger than the audio transmission size Sta of data to be transmitted in the succeeding operation, the audio packet generator 42 is operable to read out audio encoded data to be transmitted in the succeeding operation from the audio buffer 41 to generate a TS packet containing the audio encoded data. The audio packet generator 42 is operable to supply the TS packet to the multiplexer 51, and notify the audio remaining size calculator 43 of audio transmission size information D(Sta) indicating the audio transmission size Sta of transmission data contained in the TS packet.

The details on the above operation is described in the following. In the case where the audio encoded data to be transmitted corresponds to leading data of an access unit, the audio packet generator 42 is operable to read out audio PES header data to be transmitted in a succeeding operation from the PESa header generator 44 to generate a TS packet containing the audio PES header data. The size of the audio PES header data is not included in the audio transmission size Sta.

In the above example, the data type indicated by the multiplexing pattern signal P indicates audio. In the case where the audio remaining size Sra indicated by the audio remaining size information D(Sra) is smaller than the audio transmission size Sta of data to be transmitted in a succeeding operation, the audio packet generator 42 is operable to generate a TS packet by filling an empty area with a stuffing byte. In the above example, the data type indicated by the multiplexing pattern signal P indicates audio. In the case where the audio remaining size Sra indicated by the audio remaining size information D(Sra) is 0, in other words, there is no audio encoded data to be transmitted, the audio packet generator 42 may suspend an operation of generating a TS packet, or generate a TS packet containing padding data and supply the TS packet to the multiplexer 51.

The system packet generator 49 is operable to generate a TS packet containing system data including information relating to a transport stream TS to be generated, based on the multiplexing pattern signal P to be notified from the multiplexing pattern generator 56. In the case where the data type indicated by the multiplexing pattern signal P indicates system, the system packet generator 49 is operable to generate a TS packet containing either one of PAT (Program Association Table) information, PMT (Program Map Table) information, SIT (Selection Information Table) information and PCR information, as system data, at a predetermined cycle and according to a predetermined order.

The PMT is a table describing a PID (Packet Identifier) for identifying e.g. video data, audio data, and system data. The PAT is a table describing overall program information for use in extracting the PMT. The SIT is a table describing information relating to a program to be transmitted. The PAT information, the PMT information, and the SIT information are supplied from the controller 59 to the system packet generator

49 to generate the aforementioned TS packets. The PCR information for use in establishing synchronism between an encoder and a decoder is notified from the system time clock generator 55 to the system packet generator 49. The system packet generator 49 is operable to generate TS packets containing the above information individually, and supply the TS packets to the multiplexer 51. The cycle and the order of generating these system data is described in detail in the following.

The multiplexer 51 is operable to multiplex a system data TS packet generated by the system packet generator 49, a video TS packet generated by the video packet generator 32, and an audio TS packet generated by the audio packet generator 42 in the order of generation to generate a transport stream TS composed of the TS packets. The transport stream TS generated by the multiplexer 51 is transmitted to the recording controller 61 at a predetermined transmission bit rate, and recorded in the recording medium 62 by the recording controller 61.

In the following, timings in the multiplexing device having the above arrangement in this embodiment are described.

Figure 2:
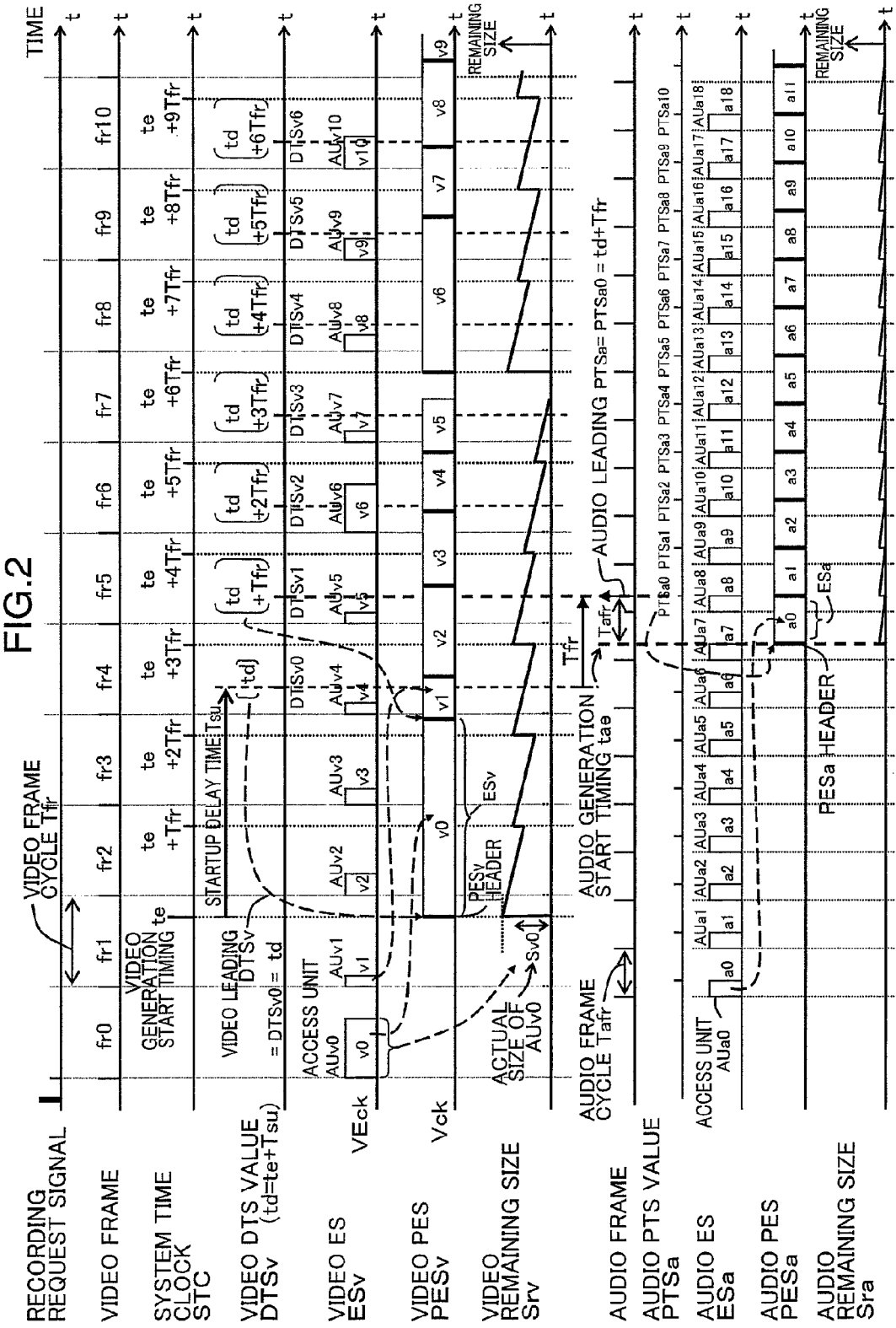
FIG. 2 is a timing chart schematically showing timings in the multiplexing device of the first embodiment.

FIG. 2 is a timing chart showing timings in the multiplexing device of the first embodiment. In the following, overall operations of the multiplexing device are described referring to FIG. 2.

Referring to FIG. 2, in response to a recording request signal to be issued from the device controller 19, the video encoder 11 and the audio encoder 21 are operable to start a compression encoding operation, and the TS generating section 30 is operable to start an initial operation thereof.

The video frame in FIG. 2 corresponds to a time unit to be used in performing an operation relating to video data in the multiplexing device. The operation relating to video data is performed in the unit of video frames e.g. video frames fr0, fr1, and fr2, using the video frame cycle Tfr as shown in FIG. 2.

The TS generating section 30 is operable to start generating a TS packet containing video encoded data at a timing when the time of the STC generated by the system time clock generator 55 i.e. an STC value coincides with a value of the video generation start timing "te".

DTSv information indicates a value of DTS information corresponding to each of access units of video. In response to receiving a first video AU leading notification signal AUHv, as shown in FIG. 2, the time stamp generator 57 is operable to define a timing delayed from the video generation start timing "te" by the startup delay time Tsu i.e. a point of time (te+Tsu), as the video decoding start timing "td"; and notify the PESv header generator 34 of DTSv information, wherein the video decoding start timing "td" is defined as a video leading DTSv. Further, as shown in FIG. 2, the time stamp generator 57 is operable to sequentially notify the PESv header generator 34 of timings delayed from the video decoding start timing "td" with an interval of the video frame cycle Tfr, as DTSv information.

Next, timings of a video elementary stream ESv to be outputted from the video encoder 11 are described. As shown in FIG. 2, the video encoder 11 is operable to output video encoded data whose bit length is variable per video frame. The video elementary stream ESv is composed of video encoded data per access unit. In the example of FIG. 2, the video encoder 11 is operable to output video encoded data "vn" of a video access unit AUvn at the n-th video frame "frn".

Next, timings of a video packetized elementary stream PESv to be generated by the video packet generator 32 are described. As shown in FIG. 2, the video packet generator 32 is operable to generate the video packetized elementary stream PESv by chronologically and sequentially combining video PES header data per access unit generated by the PESv header generator 34, and video encoded data per access unit. As shown in FIG. 2, generation of the video packetized elementary stream PESv is started at a timing when the time of the STC coincides with the video generation start timing "te".

The video encoder 11 is operable to supply, to the video buffer 31, video encoded data at a higher bit rate than the maximum bit rate of video data defined in the multiplexing device. For instance, in the case where the maximum bit rate of video data is 15 Mbps, the video encoder 11 is operable to output video encoded data at a bit rate several times as large as 15 Mpbs, or more. On the other hand, the video packet generator 32 generates the video packetized elementary stream PESv at a processing rate corresponding to the maximum bit rate of video data. Accordingly, a time required for transferring the video packetized elementary stream PESv is longer than a time required for transferring the video elementary stream ESv, even if e.g. video encoded data "v0" of the video elementary stream ESv has the same data size as video encoded data "v0" of the video packetized elementary stream PESv.

PESv header data generated by the PESv header generator 34 includes time stamp information. The DTSv information indicating the video decoding start timing "td", or timings sequentially delayed from the video decoding start timing "td" with an interval of the video frame cycle Tfr is stored in respective PESv headers, as the time stamp information. For instance, referring to FIG. 2, a PESv header to be generated for the first time immediately after the video generation start timing "te" stores DTSv0 i.e. a video leading DTSv value indicating the video decoding start timing "td". A succeeding PESv header stores DTSv1 i.e. a DTSv value indicating a point of time (td+Tfr), which is delayed from the video decoding start timing "td" by the video frame cycle Tfr.

Next, the video remaining size Srv calculated by the video remaining size calculator 33 is described. In the multiplexing device of this embodiment, the video buffer 31 is operable to store video encoded data corresponding to several video frames in advance during a period from the point of time when the recording request signal shown in FIG. 2 is outputted to the video generation start timing "te". Thereafter, at the video generation start timing "te", the video remaining size calculator 33 is operable to start summing up the actual video size Sv per video access unit. Thereby, the video remaining size Srv to be notified from the video remaining size calculator 33 to the video packet generator 33 is incremented by Sv.

Specifically, as exemplified in FIG. 2, assuming that a leading video access unit is a video access unit AUv0 having an actual video size Sv0, the video remaining size calculator 33 is operable to output the actual video size Sv0 of the video access unit AUv0, as the video remaining size Srv, at the video generation start timing "te". Thereby, the video packet generator 32 is operable to start generating a TS packet. The video remaining size calculator 33 is also operable to subtract a video transmission size Stv of transmission data contained in a TS packet generated by the video packet generator 32.

The multiplexing device of this embodiment performs the aforementioned operations. By performing the above operations, as shown in FIG. 2, the video remaining size Srv is incremented by the actual video size Sv at the video presentation start timing "te", and at an interval of the video frame cycle Tfr from the video generation start timing "te"; and is decremented by the video transmission size Stv, each time transmission data is transmitted. The video remaining size calculator 33 is operable to notify the video packet generator 32 of the video remaining size Srv as the video remaining size information D(Srv).

The audio frame in FIG. 2 corresponds to a time unit to be used in performing an operation relating to audio data in the multiplexing device. The operation relating to audio data is performed in the unit of audio frames, using the audio frame cycle Tafr as shown in FIG. 2.

The PTSa information indicates a value of PTS information corresponding to each of access units of audio. In response to receiving a first audio AU leading notification signal AUHa, as shown in FIG. 2, the time stamp generator 57 is operable to define a timing delayed from the video decoding start timing "td" by the video frame cycle Tfr i.e. a point of time (td+Tfr), as the audio decoding start timing; and notify the PESa header generator 44 of PTSa information, wherein an audio presentation start timing corresponding to the audio decoding start timing is defined as an audio leading PTSa.

Since a delay time required for a decoding operation of audio data is significantly short, the actual audio decoding start timing substantially coincides with the audio presentation timing. Accordingly, in the following, PTS indicating a presentation timing of audio data is described as PTSa. Alternatively, PTSa may be DTS indicating a decoding timing of audio data. As shown in FIG. 2, the time stamp generator 57 is also operable to sequentially notify the PESa header generator 44 of timings delayed from the audio presentation start timing with an interval of the audio frame cycle Tafr, as PTSa information.

Next, timings of an audio elementary stream ESa to be outputted from the audio encoder 21 are described. As shown in FIG. 2, the audio encoder 21 is operable to output audio encoded data whose bit length is fixed per audio frame. The audio elementary stream ESa is composed of audio encoded data per access unit. In the example of FIG. 2, the audio encoder 21 is operable to output audio encoded data "ak" of an access unit AUak at the k-th audio frame.

Next, timings of an audio packetized elementary stream PESa to be generated by the audio packet generator 42 are described. As shown in FIG. 2, the audio packet generator 42 is operable to generate the audio packetized elementary stream PESa by chronologically and sequentially combining audio PES header data generated by the PESa header generator 44 per access unit, and audio encoded data per access unit.

As shown in FIG. 2, generation of the audio packetized elementary stream PESa is started at a timing when the time of the STC coincides with the audio generation start timing "tae". The audio encoder 21 is operable to supply, to the audio buffer 41, audio encoded data at a higher bit rate than the maximum bit rate of audio data defined in the multiplexing device. On the other hand, the audio packet generator 42 generates the audio packetized elementary stream PESa at a processing rate corresponding to the maximum bit rate of audio data. Accordingly, a time required for transferring the audio packetized elementary stream PESa is longer than a time required for transferring the audio elementary stream ESa, even if e.g. audio encoded data "a0" of the audio elementary stream PESa has the same data size as audio encoded data "a0" of the audio packetized elementary stream PESa.

PESa header data generated by the PESa header generator 44 includes time stamp information. The PTSa information i.e. audio presentation timing information indicating the audio presentation start timing delayed from the audio generation start timing "tae" by the audio frame cycle Tafr, or timings sequentially delayed from the audio presentation start timing with an interval of the audio frame cycle Tafr is stored in respective PESa headers.

For instance, referring to FIG. 2, a PESa header to be generated for the first time immediately after the audio generation start timing "tae" stores PTSa0 i.e. an audio leading PTSa value indicating the audio presentation start timing. A succeeding PESa header stores PTSa1 i.e. a PTSa value indicating a timing delayed from the audio presentation start timing by the audio frame cycle Tafr.

Next, the audio remaining size Sra calculated by the audio remaining size calculator 43 is described. In the multiplexing device of this embodiment, the audio buffer 41 is operable to store audio encoded data corresponding to several audio frames in advance during a period from the point of time when the recording request signal shown in FIG. 2 is outputted to the audio generation start timing "tae".

Thereafter, at the audio generation start timing "tae", the audio remaining size calculator 43 is operable to start summing up the actual audio size Sa per audio access unit. Thereby, the audio remaining size Sra to be notified from the audio remaining size calculator 43 to the audio packet generator 42 is incremented by the actual audio size Sa. Thereby, the audio packet generator 42 is operable to start generating a TS packet. The audio remaining size calculator 43 is also operable to subtract an audio transmission size Sta of transmission data contained in a TS packet generated by the audio packet generator 42.

The multiplexing device of this embodiment performs the aforementioned operations. By performing the above operations, as shown in FIG. 2, the audio remaining size Sra is incremented by the actual audio size Sa at an interval of the audio frame cycle Tafr; and is decremented by the audio transmission size Sta, each time transmission data is transmitted. The audio remaining size calculator 43 is operable to notify the audio packet generator 42 of the audio remaining size Sra as the audio remaining size information D(Sra).

In the following, timings of the multiplexing pattern signal P in the multiplexing device of this embodiment are described.

Figure 3:
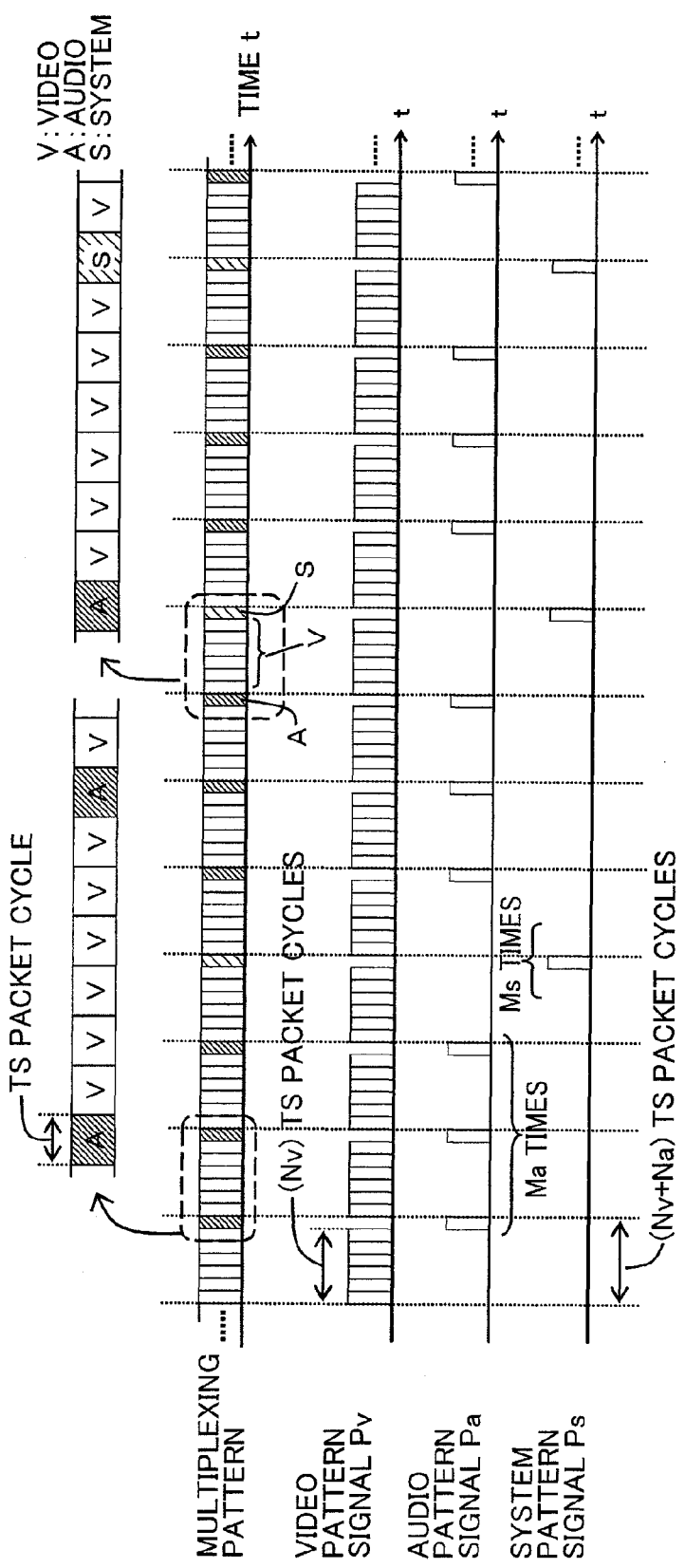
FIG. 3 is a timing chart showing a multiplexing pattern signal in the multiplexing device of the first embodiment.

FIG. 3 is a timing chart showing an example of the multiplexing pattern signal P in the multiplexing device of the first embodiment. As described above, the multiplexing pattern is an allocation pattern representing the order or combination of types of data i.e. video data, audio data, and system data to be multiplexed into a transport stream TS. In this embodiment, an example of the multiplexing pattern is a pattern constituted of a video period corresponding to a video elementary stream ESv, and an audio period corresponding to an audio elementary stream ESa, wherein the video period and the audio period are cyclically repeated at a ratio (Nv:Na).

Referring to FIG. 3, a period of (Nv+Na)TS packet cycles corresponding to (Nv+Na) times of a TS packet cycle is constituted of a video period of (Nv)TS packet cycles corresponding to (Nv) times of a TS packet cycle, and an audio period of (Na)TS packet cycles corresponding to (Na) times of a TS packet cycle. In this embodiment, an audio period is constituted of an audio transmission period corresponding to an audio elementary stream ESa, and a system period corresponding to system data; and the audio transmission period and the system period are cyclically repeated at a ratio (Ma:Ms). In FIG. 3, an audio transmission period is allocated "Ma" times, and a system period is allocated "Ms" times out of (Ma+Ms) times.

The detail on the above arrangement is described in the following. The ratio (Nv:Na) between a video period and an audio period is schematically defined as follows. The following is an exemplified method for defining the ratio (Nv:Na). Specifically, in order to define the ratio (Nv:Na), for instance, let it be assumed that the transmission bit rate of a transport stream TS is Rx (bps), and the maximum bit rate of a video elementary stream ESv is Rv (bps). Further, there is defined a ratio capable of securing a transmission band for transmitting data of a bit rate larger than the maximum bit rate Rv (bps) in transmitting a video elementary stream ESv by a transport stream TS; and securing a transmission band for transmitting an audio elementary stream ESa, system data, and a PES header.

For instance, in the case where the ratio between a video period and an audio period is set to (Nv−1):Na, based on the bit rates as defined above, the transmission band in the video period is narrowed, which may make it impossible or difficult to transmit video data. Conversely, in the case where the ratio between a video period and an audio period is set to (Nv+1):Na, it may be impossible or difficult to transmit an audio elementary stream ESa, system data, and a PES header.

In view of the above, setting the ratio between a video period and an audio period to (Nv:Na), considering a data loss by a TS packet header, enables to secure Rx(bps)×(184 bytes/188 bytes)×(Nv/Nv+Na)), as a transmission band for the video period; and secure Rx(bps)×(184 bytes/188 bytes)×(Na/Nv+Na)), as a transmission band for the audio period. 188 bytes is a byte length of a TS packet, and 184 bytes is a byte length of a payload, excluding 4 bytes of a TS packet header.

Referring to FIG. 3, the multiplexing pattern represented by the multiplexing pattern signal P to be generated by the multiplexing pattern generator 56 is constituted of a video period corresponding to TS packets indicated by the symbols "V", and an audio period corresponding to TS packets indicated by the symbols "A" and "S", wherein the video period and the audio period are cyclically repeated at a ratio (Nv:Na). The basic unit of the multiplexing pattern is a TS packet cycle. As shown in FIG. 3, the multiplexing pattern is a pattern, wherein a video period corresponding to (Nv)TS packet cycles and an audio period corresponding to (Na)TS packet cycles are combined, and a period corresponding to (Nv+Na) TS packet cycles is repeated. Further, as shown in FIG. 3, the multiplexing pattern is a pattern, wherein in each of the audio periods, an audio transmission period corresponding to a TS packet indicated by the symbol "A", and a system period corresponding to a TS packet indicated by the symbol "S" are cyclically repeated at a ratio (Ma:Ms).

FIG. 3 shows timings of a video pattern signal Pv included in the multiplexing pattern signal P to be notified from the multiplexing pattern generator 56 to the video packet generator 32. The video pattern signal Pv corresponds to a video period in the multiplexing pattern. FIG. 3 also shows timings of an audio pattern signal Pa included in the multiplexing pattern signal P to be notified from the multiplexing pattern generator 56 to the audio packet generator 42. The audio pattern signal Pa corresponds to an audio period in the multiplexing pattern. FIG. 3 also shows timings of a system pattern signal Ps included in the multiplexing pattern signal P to be notified from the multiplexing pattern generator 56 to the system packet generator 49. The system pattern signal Ps corresponds to a system period in the multiplexing pattern.

The multiplexing device of this embodiment is configured in such a manner that the video packet generator is operable to generate a TS packet containing video encoded data at a timing of the video pattern signal Pv in accordance with the multiplexing pattern as shown in FIG. 3, if the video remaining size Srv is sufficient. The audio packet generator 42 is operable to generate a TS packet containing audio encoded data at a timing of the audio pattern signal Pa, if the audio remaining size Sra is sufficient. The system packet generator 49 is operable to generate a TS packet containing system data at a timing of the system pattern signal Ps. If the video remaining size Srv and the audio remaining size Sra are sufficient, a TS packet generated by either one of the video packet generator 32, the audio packet generator 42, and the system packet generator 49 is successively supplied to the multiplexer 51 according to a predetermined order. Thereby, the multiplexer 51 is operable to generate a transport stream TS multiplexed according to the multiplexing pattern.

In the foregoing section, an approach for defining the ratio between a video period and an audio period to (Nv:Na) has been briefly described. The ratio is defined in detail according to the following manner, for instance. In the following, the detail as to how the multiplexing pattern is defined is described by taking an example, wherein the transmission bit rate of a transport stream TS is set to Rx (bps), and the maximum bit rate of a video elementary stream ESv is set to Rv (bps).

In this example, the maximum bit rate of the video elementary stream ESv is set to Rv (bps). PES packet header data and stuffing data are added in storing video encoded data per access unit in a PES packet, and aligning the PES packet with a TS packet. In this example, let it be assumed that a PES packet header is composed solely of PTS and DTS and has 19 bytes, and stuffing data has maximally 183 bytes. The number of video frames is thirty per second. The transmission bit rate required in a transport stream TS for transferring a TS packet containing video encoded data is a value obtained by adding an overhead value for packetization to the maximum bit rate of video encoded data. Accordingly, the required transmission bit rate is equal to: a bit rate of video encoded data+(PES packet header size+stuffing size)×frame number=Rv(bps)+(19 bytes+183 bytes)×30 frames. In this condition, as far as a maximum transmittable bit rate of video data is larger than the required maximum bit rate, there is no likelihood that a video buffer in a decoder may cause underflow.

Similarly to the above, as shown in FIG. 3, an audio period has a pattern, wherein an audio transmission period and a system period are cyclically repeated at a ratio (Ma:Ms) to secure a transmission band for transmitting a TS packet containing system data. Alternatively, the ratio may be a ratio depending on audio encoded data. Further alternatively, in the case where an audio bit rate of LPCM 2 channel/16 bits encoded data is used, a multiplexing pattern may be configured in such a manner that the ratio (Ma:Ms) between an audio transmission period and a system period depends on the audio bit rate.

In the case where the transmission bit rate of a transport stream TS is set to Rx (bps), and data is transmitted at a ratio (Ma:Ms) in an audio transmission period in an audio period, it is possible to secure a packet number satisfying: (Rx(bps)/188 bytes)×(Na/(Nv+Na))×(Ma/(Ma+Ms)), wherein the size of a TS packet is 188 bytes.

For instance, in LPCM encoding, it is necessary to store audio data attached with audio data header per audio frame in a PES packet so as to align the PES packet with a TS packet. Assuming that a header of a PES packet is composed solely of PTS data and has 14 bytes, since the payload size of a TS packet is 184 bytes, the number of TS packets required for storing audio encoded data corresponding to one audio frame is equal to: the total size of one audio frame/TS packet payload size=(audio data size of one audio frame+overhead size corresponding to header)/TS packet payload size=(16 bits×2 channels×240 samplings+14 bytes+4 bytes)/184 bytes=5.31, which is nearly equal to six. In the case where the number of audio frame per second is 200, the required maximum number of TS packets is: 6×200=1,200. In this arrangement, as far as the available number of TS packets is smaller than the required maximum number of TS packets, there is no likelihood that an audio buffer in a receiver may cause underflow.

Figure 4:
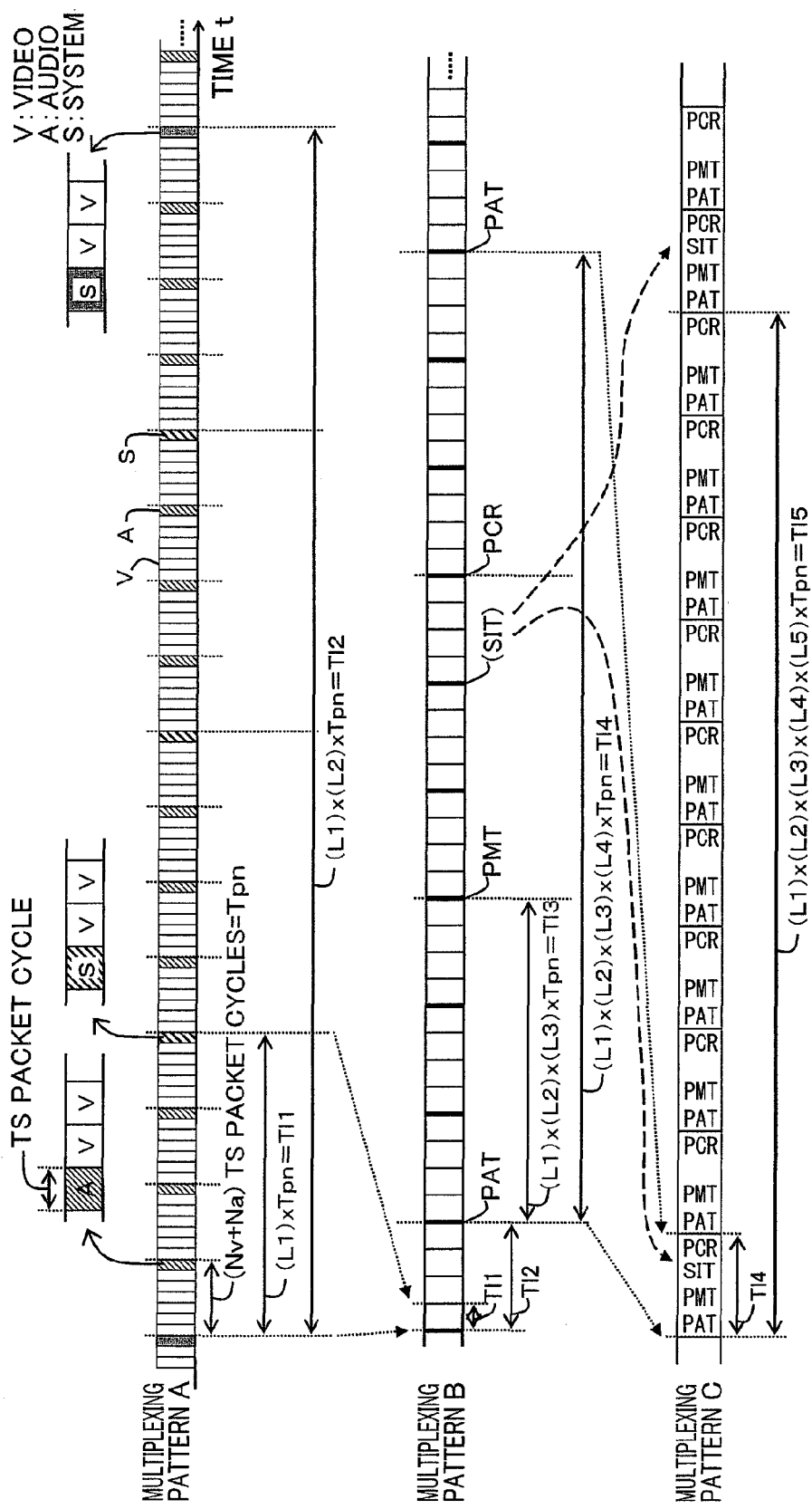
FIG. 4 is a timing chart showing timings indicating system data transmission in the multiplexing device of the first embodiment.

In the following, a system period for transmitting system data is described in detail. FIG. 4 is a timing chart showing an example of timings of system data transmission in the multiplexing device of the first embodiment. Referring to FIG. 4, a multiplexing pattern "A" is a multiplexing pattern substantially equivalent to the multiplexing pattern shown in FIG. 3. In the multiplexing pattern "A" shown in FIG. 4, a period corresponding to (Nv+Na)TS packet cycles is defined as a period Tpn, a period L1 times of the period Tpn is defined as a period T11, and a period L2 times of the period T11 is defined as a period T12.

A multiplexing pattern "B" shown in FIG. 4 is an example of an allocation pattern showing how a PAT packet, a PMT packet, and a PCR packet respectively containing PAT, PMT, and PCR as system data are allocated in a period T13 corresponding to a period L3 times of the period T12, as a block cycle.

A multiplexing pattern "C" shown in FIG. 4 is an allocation pattern showing how an SIT packet containing SIT as system data is allocated in a period T14 corresponding to a period L4 times of the period T13, as a block cycle. In the multiplexing pattern "C" shown in FIG. 4, a period L5 times of the period T14 is defined as a period T15. In the following, a system period for transmitting system data is described in detail referring to FIG. 4.

As shown in FIG. 3, transmission of an audio packet is suspended Ms times per (Ma+Ms) audio periods to secure system data transmission. As described above, the multiplexing pattern is a pattern, wherein in each of the audio periods, an audio transmission period corresponding to a TS packet indicated by the symbol "A", and a system period corresponding to a TS packet indicated by the symbol "S" are cyclically repeated at a ratio (Ma:Ms). Accordingly, as shown in the multiplexing pattern "A" in FIG. 4, a system period is repeated at a cycle of the period T11.

In the multiplexing pattern "B" shown in FIG. 4, a system period is constituted of a system transmission period for transmitting system data, and a suspending period; and the system transmission period and the suspending period are cyclically repeated at a ratio (Ks:Kr). Specifically, as shown in the multiplexing pattern "B" in FIG. 4, assuming that the period T11 corresponds to a small block cycle, a system transmission period occurs once per (Ks0+Kr0) small block cycles. Further, in the multiplexing pattern "B" in FIG. 4, assuming that four small block cycles constitute one large block cycle, a system transmission period and a suspending period are cyclically repeated at a ratio (Ks1:Kr1). In other words, as shown in the multiplexing pattern "B" in FIG. 4, one of the PAT packet, the PMT packet, and the PCR packet is alternately transmitted every period of three large block cycles i.e. every period T13.

As described above, the PAT packet, the PMT packet, and the PCR packet are each transmitted once per the period T13 in this order. This arrangement enables to transmit the PAT packet, the PMT packet, and the PCR packet at a timing when neither a video TS packet nor an audio TS packet is transmitted.

As shown in the multiplexing pattern "B" in FIG. 4, it is possible to configure the multiplexing pattern in such a manner that the system data SIT is transmitted during one of the suspending periods in the period T12. Specifically, for instance, as shown by the multiplexing pattern "C" in FIG. 4, the SIT packet may be transmitted once per L5 times during a suspending period in a system period.

In the following, timings and operations in the multiplexing device of this embodiment in starting transmission of a video elementary stream ESv are described in detail.

Figure 5:
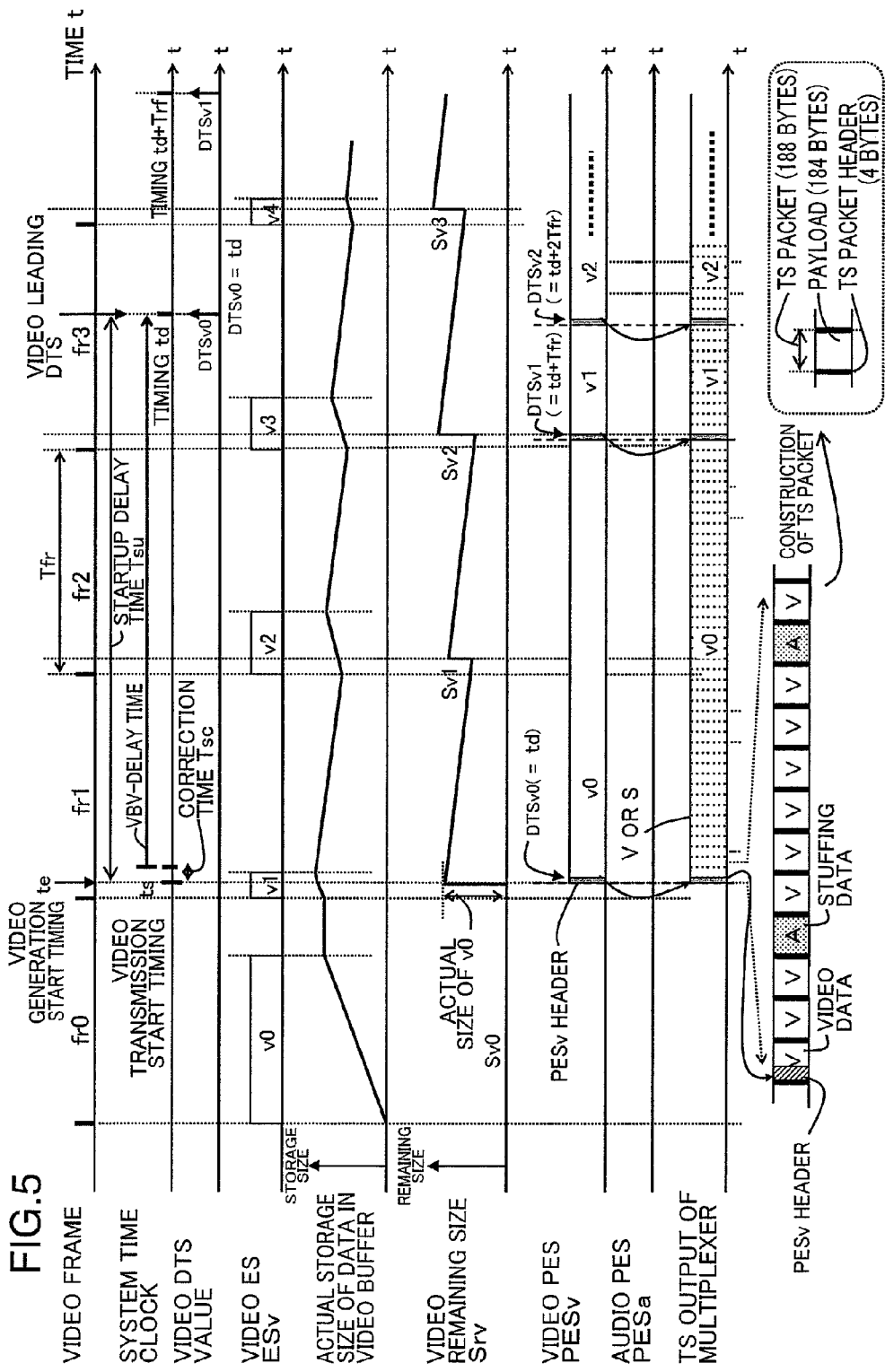
FIG. 5 is a timing chart showing timings indicating video transmission start in the multiplexing device of the first embodiment.

FIG. 5 is a timing chart showing timings indicating video transmission start in the multiplexing device of the first embodiment. In the following, timings and operations in the multiplexing device before and after video transmission start are described in detail referring to FIG. 5.

Referring to FIG. 5, a video frame indicates a time unit of an operation relating to video data in the multiplexing device. The system time clock indicates a timing to be generated by the system time clock generator 55 i.e. STC. DTSv information indicates a value of DTS information corresponding to each of access units of video.

FIG. 5 also shows timings of a video elementary stream ESv to be outputted from the video encoder 11, an actual storage size of video encoded data to be stored in the video buffer 31, and a video remaining size Srv calculated by the video remaining size calculator 33.

FIG. 5 also shows timings of a video packetized elementary stream PESv to be generated by the video packet generator 32, timings of an audio packetized elementary stream PESa to be generated by the audio packet generator 42, and timings of a transport stream TS to be transmitted from the multiplexer 51.

As described referring to FIG. 2, first, the video encoder 11 starts compression encoding in response to a recording request signal. Thereafter, video encoded data generated by the video encoder 11 is supplied to the video buffer 31 per access unit. During a video frame fr0, video encoded data v0 per access unit generated by the video encoder 11 is supplied to the video buffer 31. FIG. 5 shows an example, wherein the video encoded data v0 has a large amount of encoded data corresponding to I-picture in the video frame fr0. Video encoded data e.g. the video encoded data v0 to be outputted from the video encoder 11 is supplied from the video encoder 11 to the video buffer 31 at a bit rate higher than a predetermined maximum bit rate of video. Accordingly, as shown in FIG. 5, the video buffer 31 is operable to store video encoded data at a speed corresponding to the transmission bit rate of the video encoder 11.

FIG. 5 also shows an example, wherein the video generation start timing "te" is defined at a predetermined timing in a video frame fr1. Specifically, since the video remaining size calculator 33 is notified of the video generation start timing information D(te) from the controller 59, the video remaining size calculator 33 is operable to read out the actual video size information D(Sv0) from the video unit size measuring section 12, at a timing when the time of the STC coincides with the video generation start timing information D(te) i.e. at the video generation start timing "te", while monitoring the time of the STC; and sum up the video remaining size Srv and the readout actual video size Sv0.

By performing the above operation, as shown in FIG. 5, at the video generation start timing "te", the video remaining size Srv is incremented from the actual video size 0 by the actual video size Sv0. Concurrently, the video remaining size calculator 33 is operable to start notifying the video packet generator 32 of the video remaining size information D(Srv). Since the video remaining size is sufficient at the video generation start timing "te", the video packet generator 32 is operable to start generating a TS packet (video TS packet) containing video encoded data.

The video remaining size calculator 33 is operable to start notifying the time stamp generator 57 of a first video AU leading notification signal AUHv at the video generation start timing "te". Then, the time stamp generator 57 is operable to notify the PESv header generator 34 of DTSv0 information indicating a value of the video decoding start timing "td", as a leading DTS.

As described above, at the video generation start timing "te", the video packet generator 32 is operable to read out, from the PESv header generator 34, data of a PESv header containing DTSv0 information, as a TS packet to be generated for the first time, in starting generation of a TS packet containing video encoded data. Then, the video packet generator 32 is operable to store the PESv header data in a payload, as a data storage area of a TS packet, and then store leading video encoded data in the empty area of the payload to generate a leading TS packet containing these data. Specifically, since the video buffer 31 is operable to store video encoded data generated in the video frame fr0, the leading TS packet contains leading data of the video encoded data v0.

After a leading TS packet is generated, the video packet generator 32 is operable to notify the video remaining size calculator 33 of the video transmission size information D(Stv) indicating the video transmission size Stv of video encoded data stored in the TS packet. Specifically, in the case where a leading TS packet is generated, the video remaining size calculator 33 is notified of the size of data stored in the empty area of a payload, as the video transmission size information D(Stv). If the data type indicated by the multiplexing pattern signal P does not indicate video at the video generation start timing "te", the video packet generator 32 is operable to start generating a leading TS packet at a timing when the data type indicated by the multiplexing pattern signal P indicates video.

After a leading TS packet is generated, during a period when the video remaining size Srv is sufficient, and the data type indicated by the multiplexing pattern signal P indicates video, the video packet generator 32 is operable to successively generate a TS packet containing video encoded data. As a result, as shown in FIG. 5, each time a TS packet containing video encoded data is generated, the video remaining size Srv is decremented by the video transmission size Stv.

Next, in a video frame fr1, video encoded data v1 per access unit generated by the video encoder 11 is supplied to the video buffer 31. FIG. 5 shows an example, wherein the video encoded data v1 has a small amount of encoded data corresponding to B-picture or P-picture in the video frame fr1. The video encoded data v1 is supplied from the video encoder 11 to the video buffer 31. Accordingly, as shown in FIG. 5, the video buffer 31 is operable to store the video encoded data v0 at a speed corresponding to the transmission bit rate of the video encoder 11, and the video packet generator 32 is operable to read out video encoded data from the video buffer 31 in the order of storage, thereby erasing the video encoded data stored in the video buffer 31 in the order of storage.

The video remaining size calculator 33 is also operable to read out succeeding actual video size information D(Sv1) from the video unit size measuring section 12, at a timing delayed from the video generation start timing "te" by the video frame cycle Tfr, while monitoring the time of the STC; and sum up the video remaining size Srv and the readout actual video size Sv1. By performing the above operation, as shown in FIG. 5, the video remaining size Srv is incremented by the actual video size Sv1 at a timing (te+Tfr).

The video remaining size calculator 33 is also operable to notify the time stamp generator 57 of a succeeding video AU leading notification signal AUHv upon detecting that the last video encoded data of the first access unit has been transmitted. Then, the time stamp generator 57 is operable to notify the PESv header generator 34 of DTSv1 information indicating a succeeding DTS. The DTSv1 information is information relating to a timing delayed from the timing DTSv0 by the video frame cycle Tfr i.e. a timing (td+Tfr).

In generating a TS packet containing video encoded data of a succeeding access unit, the video packet generator 32 is operable to read out data of a PESv header containing DTSv1 information from the PESv header generator 34, store the PESv header data in a payload as a data storage area of a TS packet, and store leading video encoded data v1 in the empty area of the payload, thereby generating a leading TS packet containing these data.

As described above, in each of video frames "fr", the video remaining size calculator 33 is operable to calculate the video remaining size Srv, and the video packet generator 32 is operable to generate a TS packet containing PESv header data and video encoded data in accordance with the video remaining size information D(Srv) and the multiplexing pattern represented by the multiplexing pattern signal P.

The multiplexing device of the embodiment is further provided with the startup delay time Tsu and the correction time Tsc as shown in FIG. 5 in transmitting a transport stream TS. Specifically, as shown in FIG. 5, in the case where the startup delay time Tsu is defined as a VBV delay time, for instance, a delay time by a multiplexing operation is not considered, because the VBV delay time is defined based on an idealistic condition where video decoding is performed at a predetermined bit rate. The VBV delay time is a time defined in a decoder model including a decoder buffer, called a system target decoder (STD) defined in the MPEG system; and is a time required for filling a decoder buffer called a VBV buffer with data at a bit rate for video decoding. On the other hand, the multiplexing device of the embodiment is provided with a delay time required for an operation by the video packet generator 32 and the multiplexer 51, and data is transmitted based on a multiplexing pattern. As a result, an operation of transmitting video encoded data is suspended during an audio period, and transmission loss may occur in the audio period.

In view of the above, the multiplexing device of the embodiment is provided with a video transmission start timing "ts", which is a point of time earlier than the VBV delay time by the correction time "Tsc", as shown in FIG. 5, to compensate for transmission loss resulting from a delay time by a multiplexing operation. Specifically, the transmission loss is compensated by transmitting data at a timing earlier than the start of the idealistic VBV delay time by the aforementioned delay time. More specifically, as shown in FIG. 5, in the multiplexing device of the embodiment, the video transmission start timing "ts" is defined as the video generation start timing "te"; and a timing delayed from the video generation start timing "te" by the startup delay time "Tsu", which is a sum of the VBV delay time and the correction time "Tsc" corresponding to a maximum delay time by a multiplexing operation, is defined as a video leading DTSv. Performing the above operation enables to fill the decoder buffer with data by the timing when the decoder starts a decoding operation in accordance with the DTS.

As shown in the audio packetized elementary stream PESa in FIG. 5, transmission of audio encoded data is suspended during a time zone including a point of time when transmission of a transport stream TS is started. In other words, a time required for decoding audio data is shorter than a time required for decoding video data. Accordingly, a timing of transmitting audio encoded data is delayed, as compared with a timing of transmitting video encoded data, to correct a time lag between audio presentation timing and video presentation timing resulting from the time difference. In view of the above, as shown in FIG. 5, a TS packet containing e.g. stuffing data is transmitted during an audio transmission period in a transport stream TS.

Next, timings and operations in the multiplexing device of the embodiment in starting transmission of an audio elementary stream ESa are described in detail.

Figure 6:
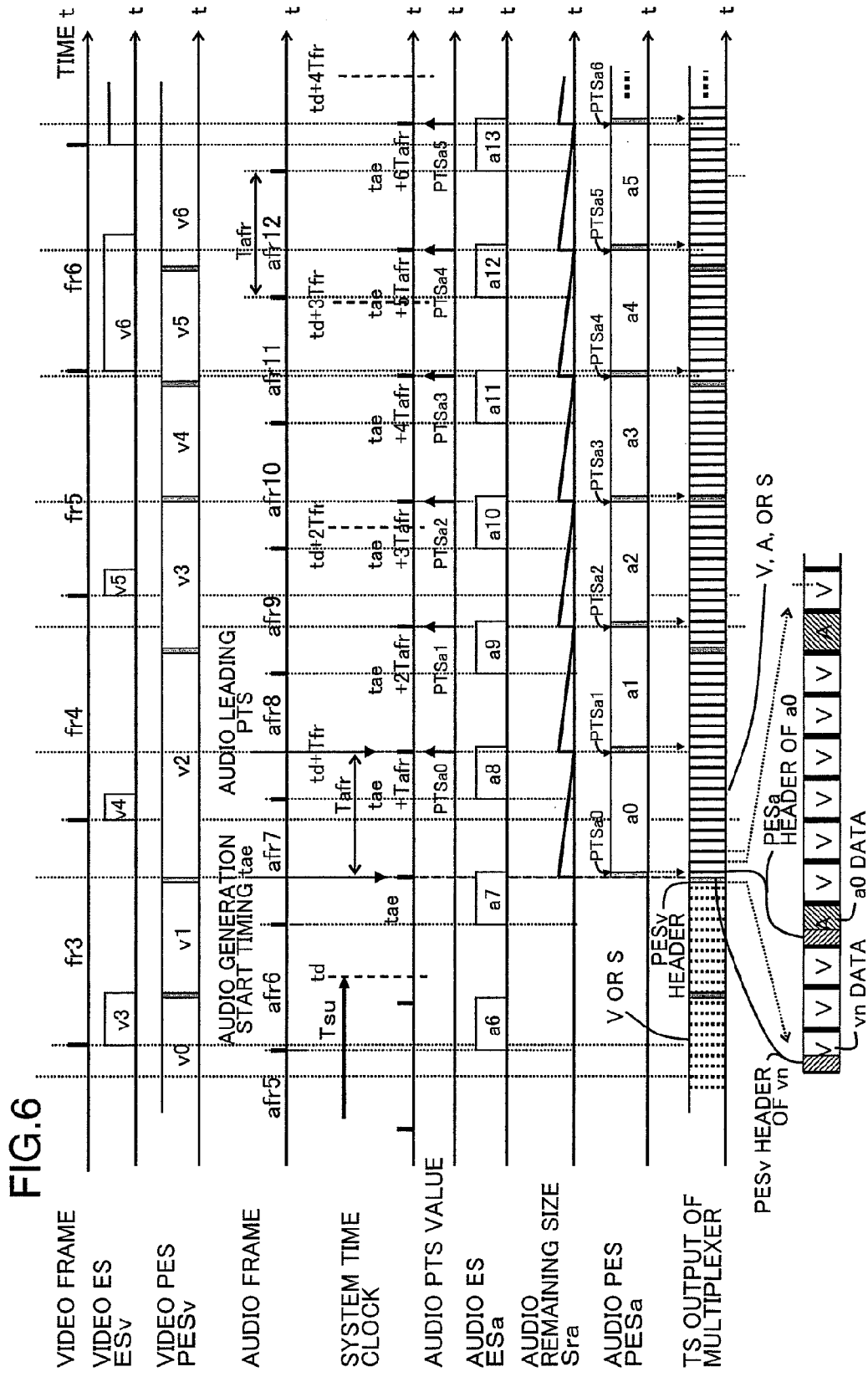
FIG. 6 is a timing chart showing timings indicating audio transmission start in the multiplexing device of the first embodiment.

FIG. 6 is a timing chart showing timings indicating audio transmission start in the multiplexing device of the first embodiment. In the following, timings and operations in the multiplexing device before and after audio transmission start are described in detail referring to FIG. 6.

Referring to FIG. 6, a video frame indicates a time unit of an operation relating to video data in the multiplexing device. FIG. 6 also shows timings of a video elementary stream ESv to be outputted from the video encoder 11, and timings of a video packetized elementary stream PESv to be generated by the video packet generator 32.

An audio frame indicates a time unit of an operation relating to audio data in the multiplexing device. The system time clock indicates a timing to be generated by the system time clock generator 55 i.e. STC. PTSa information indicate a value of PTS information corresponding to each of access units of audio.

FIG. 6 also shows timings of an audio elementary stream ESa to be outputted from the audio encoder 21, an audio remaining size Sra calculated by the audio remaining size calculator 43, timings of an audio packetized elementary stream PESa to be generated by the audio packet generator 42, and timings of a transport stream TS to be transmitted from the multiplexer 51.

As described referring to FIG. 2, first, the audio encoder 21 starts compression encoding in response to a recording request signal. Thereafter, audio encoded data generated by the audio encoder 21 is supplied to the audio buffer 41 per access unit. During an audio frame afr0, audio encoded data a0 per access unit generated by the audio encoder 21 is supplied to the audio buffer 41. Audio encoded data e.g. the audio encoded data a0 to be outputted from the audio encoder 21 is supplied from the audio encoder 21 to the audio buffer 41 at a bit rate higher than a predetermined maximum bit rate of audio. Accordingly, the audio buffer 41 is operable to store audio encoded data at a speed corresponding to the transmission bit rate of the audio encoder 21. Thus, audio encoded data a1, a2, and a3 are successively stored.

FIG. 6 also shows an example, wherein the audio generation start timing "tae" is defined at a predetermined timing in an audio frame afr7. Specifically, assuming that a timing delayed from the video decoding start timing "td" by the video frame cycle Tfr is defined as an audio leading PTS timing, as shown in FIG. 2, the audio generation start timing "tae" is defined as a timing advanced from the audio leading PTS timing by the audio frame cycle Tafr.

Specifically, since the audio remaining size calculator 43 is notified of the audio generation start timing information D(tae) from the controller 59, the audio remaining size calculator 43 is operable to read out, from the audio unit size measuring section 22, actual audio size information D(Sa0) of a leading access unit, at a timing when the time of the STC coincides with the audio generation start timing information D(tae) i.e. at the audio generation start timing "tae", while monitoring the time of the STC; and sum up the audio remaining size Sra and the readout actual audio size Sa0.

By performing the above operation, as shown in FIG. 6, at the audio generation start timing "tae", the audio remaining size Sra is incremented from the actual audio size 0 by the actual audio size Sa0. Concurrently, the audio remaining size calculator 43 is operable to start notifying the audio packet generator 42 of the audio remaining size information D(Sra). Since the audio remaining size is sufficient at the audio generation start timing "tae", the audio packet generator 42 is operable to start generating a TS packet (audio TS packet) containing audio encoded data.

The audio remaining size calculator 43 is operable to notify the time stamp generator 57 of a first audio AU leading notification signal AUHa at the audio generation start timing "tae". Then, the time stamp generator 57 is operable to notify the PESa header generator 44 of PTSaO information indicating a value of audio presentation start timing (td+Tfr), as a leading PTS.

As described above, at the audio generation start timing "tae", the audio packet generator 42 is operable to read out, from the PESa header generator 44, PESa header data containing PTSaO information, as a TS packet to be generated for the first time, in starting generation of a TS packet containing audio encoded data. Then, the audio packet generator 42 is operable to store the PESa header data in a payload, as a data storage area of a TS packet, and then store leading audio encoded data in the empty area of the payload to generate a leading TS packet containing these data. Specifically, since the audio buffer 41 is operable to store audio encoded data generated in the audio frame afr0, the leading TS packet contains leading data of the audio encoded data a0.

After a leading TS packet is generated, the audio packet generator 42 is operable to notify the audio remaining size calculator 43 of the audio transmission size information D(Sta) indicating the audio transmission size Sta of audio encoded data stored in a TS packet. Specifically, in the case where a leading TS packet is generated, the audio remaining size calculator 43 is notified of the size of data stored in the empty area of a payload, as the audio transmission size information D(Sta). If the data type indicated by the multiplexing pattern signal P does not indicate audio at the audio generation start timing "tae", the audio packet generator 42 is operable to start generating a leading TS packet at a timing when the data type indicated by the multiplexing pattern signal P indicates audio.

After a leading TS packet is generated, during a period when the audio remaining size Sra is sufficient, and the data type indicated by the multiplexing pattern signal P indicates audio, the audio packet generator 42 is operable to successively generate a TS packet containing audio encoded data. As a result, as shown in FIG. 6, each time a TS packet containing audio encoded data is generated, the audio remaining size Sra is decremented by the audio transmission size Sta.

Next, in an audio frame afr1, audio encoded data a1 per access unit generated by the audio encoder 21 is supplied to the audio buffer 41. The audio encoded data a1 is supplied from the audio encoder 21 to the audio buffer 41. Accordingly, the audio buffer 41 is operable to store the audio encoded data a1 at a speed corresponding to the transmission bit rate of the audio encoder 21, and the audio packet generator 42 is operable to read out audio encoded data from the audio buffer 41 in the order of storage, thereby erasing the audio encoded data stored in the audio buffer 41 in the order of storage.

The audio remaining size calculator 43 is also operable to read out succeeding actual audio size information D(Sa1) from the audio unit size measuring section 22, at a timing delayed from the audio generation start timing "tae" by the audio frame cycle Tafr, while monitoring the time of the STC; and sum up the audio remaining size Sra and the readout actual audio size Sa1. By performing the above operation, as shown in FIG. 6, the audio remaining size Sra is incremented by the actual audio size Sa1 at a timing (tae+Tafr).

The audio remaining size calculator 43 is also operable to notify the time stamp generator 57 of a succeeding audio AU leading notification signal AUHa upon detecting that the last audio encoded data of the first access unit has been transmitted. Then, the time stamp generator 57 is operable to notify the PESv header generator 34 of PTSa1 information indicating a succeeding PTS. The PTSv1 information is information relating to a timing delayed from the timing PTSa0 by the audio frame cycle Tafr i.e. a timing (td+Tfr+Tafr).

In generating a TS packet containing audio encoded data of a succeeding access unit, the audio packet generator 42 is operable to read out data of a PESa header containing PTSa1 information from the PESa header generator 44, store the PESa header data in a payload as a data storage area of a TS packet, and store leading audio encoded data a1 in the empty area of the payload, thereby generating a leading TS packet containing these data.

As described above, in each of audio frames "afr", the audio remaining size calculator 43 is operable to calculate the audio remaining size Sra, and the audio packet generator 42 is operable to generate a TS packet containing PESa header data and audio encoded data in accordance with the audio remaining size information D(Sra) and the multiplexing pattern represented by the multiplexing pattern signal P.

Whereas video encoded data is variable length encoded data, audio encoded data is fixed length encoded data. Accordingly, as shown in FIG. 2, whereas the video remaining size Srv calculated by the video remaining size calculator 33 is changed per video frame, the audio remaining size Sra calculated by the audio remaining size calculator 43 is not changed per audio frame after start of audio transmission.

As described above, at the audio generation start timing "tae", the audio packet generator 42 is operable to start generating a TS packet containing PESa header data and audio encoded data in accordance with the audio remaining size information D(Sra) and the multiplexing pattern represented by the multiplexing pattern signal P. A TS packet generated by the audio packet generator 42 is multiplexed into a transport stream TS during an audio transmission period of the multiplexing pattern, as shown in FIG. 6.

Next, timings and operations in the multiplexing device of the embodiment in the case where the video remaining size is zero in transmitting a video elementary stream ESv are described in detail.

Figure 7:
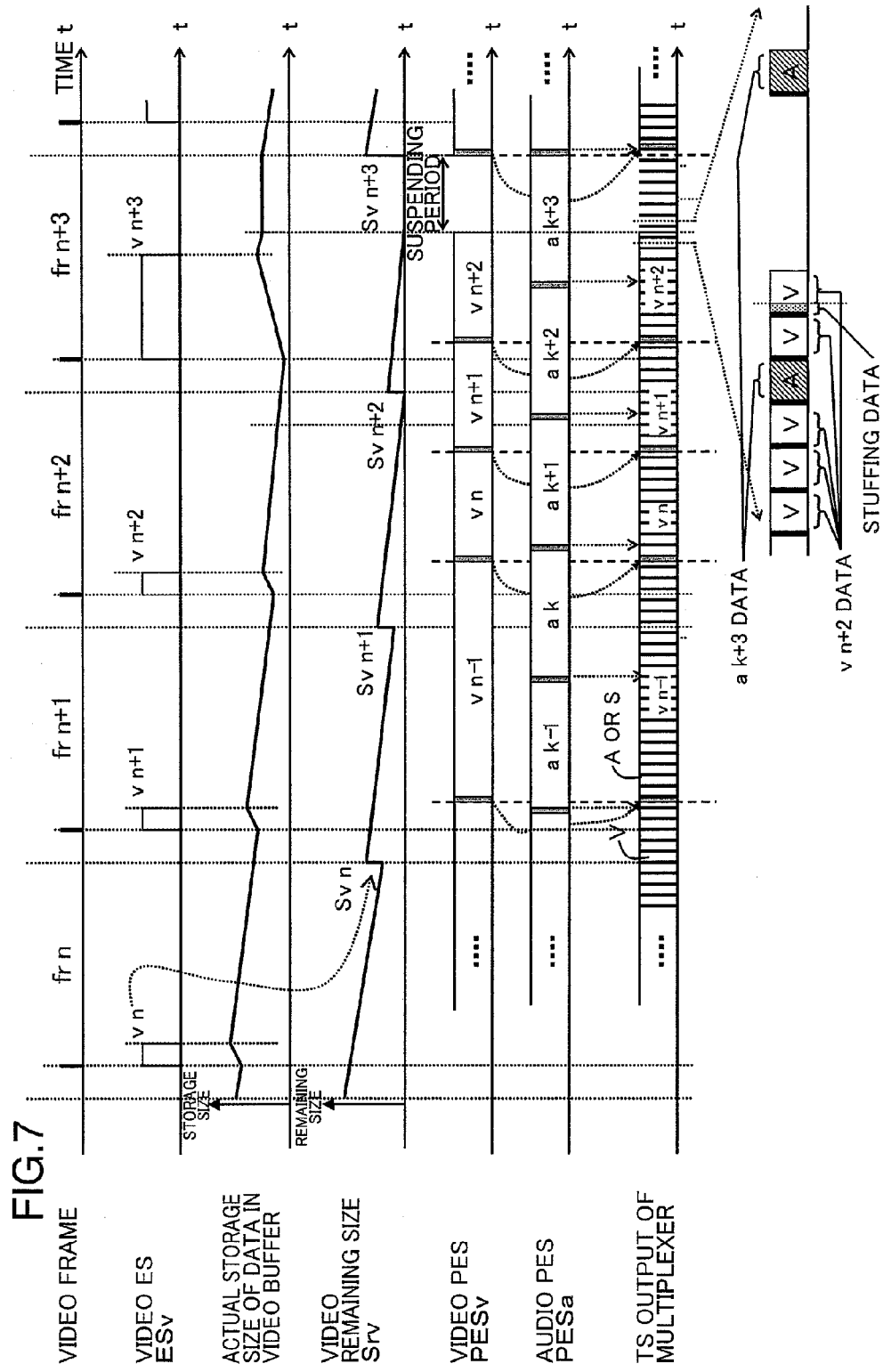
FIG. 7 is a timing chart showing timings in the case where the video remaining size in the multiplexing device of the first embodiment is insufficient.

FIG. 7 is a timing chart showing timings in the multiplexing device of the first embodiment in the case where the video remaining size is zero. In the following, timings and operations in the multiplexing device in the case where the video remaining size is zero in video transmission are described in detail referring to FIG. 7.

Referring to FIG. 7, a video frame indicates a time unit of an operation relating to video data in the multiplexing device. FIG. 7 also shows timings of a video elementary stream ESv to be outputted from the video encoder 11, an actual storage size of video encoded data to be stored in the video buffer 31, and a video remaining size Srv calculated by the video remaining size calculator 33. FIG. 7 also shows timings of a video packetized elementary stream PESv to be generated by the video packet generator 32, timings of an audio packetized elementary stream PESa to be generated by the audio packet generator 42, and timings of a transport stream TS to be transmitted from the multiplexer 51.

In the multiplexing device of the embodiment, the video encoder 11 is operable to generate video encoded data having a variable bit length. Accordingly, in the case where a sequence of still images is processed, for instance, the data size of video encoded data such as B-picture or P-picture is reduced. If video encoded data of a small data size is generated per access unit, the amount of data to be read out from the video buffer 31 is increased, as compared with the amount of video encoded data to be supplied to the video buffer 31. As a result, the video buffer 31 may be empty. FIG. 7 is a timing chart, assuming that the video buffer 31 may be empty.

As shown in the video elementary stream ESv in FIG. 7, if video encoded data e.g. (vn), (vn+1), and (vn+2) of a small data size per access unit are continued, the data size of video encoded data to be accumulated in the video buffer 31 is reduced with time. Likewise, the video remaining size Srv calculated by the video remaining size calculator 33 is reduced. As a result, a condition may occur that the video remaining size Srv is 0, or equal to or smaller than the video transmission size Stv, as illustrated in a video frame (frn+3) period in FIG. 7.

In the multiplexing device of the embodiment, as shown in FIG. 7, a suspending period for suspending generation of a video packetized elementary stream PESv is provided, in the case where the video remaining size Srv is equal to or smaller than the video transmission size Stv.

Referring to FIG. 7, for instance, in a video frame (frn), at a timing when the time of the STC coincides with a timing (te+n×Tfr), the video remaining size calculator 33 is operable to read out actual video size information D(Svn) from the video unit size measuring section 12, and sum up the video remaining size Srv and the readout actual video size Svn. Thereafter, the video packet generator 32 continues generating a TS packet containing video encoded data. Accordingly, each time a TS packet containing video encoded data is generated, the video remaining size Srv is decremented by the video transmission size. In particular, as shown in the video frame (frn) period, wherein the sum of video transmission sizes in a video frame cycle Tfr is larger than the actual video size Svn of the video encoded data (vn), the video remaining size Srv is decremented by the video frame unit. As shown in FIG. 7, if the video encoded data (vn), (vn+1), and (vn+2) of a small data size are continued, the video remaining size Srv becomes 0, or becomes equal to or smaller than the video transmission size Stv, as shown in the video frame (frn+3) period.

Even after the video remaining size Srv is equal to or smaller than the video transmission size Stv, the video remaining size calculator 33 is operable to notify the video packet generator 32 of the video remaining size information D(Srv) indicating that the video remaining size Srv is equal to or smaller than the video transmission size Stv. At a timing when the multiplexing pattern signal P indicates video, the video packet generator 32 is operable to judge whether the video remaining size Srv is equal to or larger than a succeeding video transmission size Stv. In this case, since the video remaining size Srv is equal to or smaller than the succeeding video transmission size Stv, the video packet generator 32 suspends generating a TS packet containing video encoded data. Accordingly, merely a TS packet containing audio encoded data, and a TS packet containing system data are supplied to the multiplexer 51. As a result, as shown in FIG. 7, the multiplexer 51 is operable to transmit a transport stream TS, wherein transmission of a video TS packet is suspended in a suspending period.

As shown in FIG. 7, the video remaining size Srv becomes e.g. 0 in a suspending period. Alternatively, the video buffer 31 may be operable to accumulate video encoded data in a period corresponding to the correction time shown in FIG. 5.

FIG. 7 shows an example, wherein transmission of a video TS packet is suspended in a suspending period. Alternatively, a TS packet containing null data may be transmitted.

Figure 8:
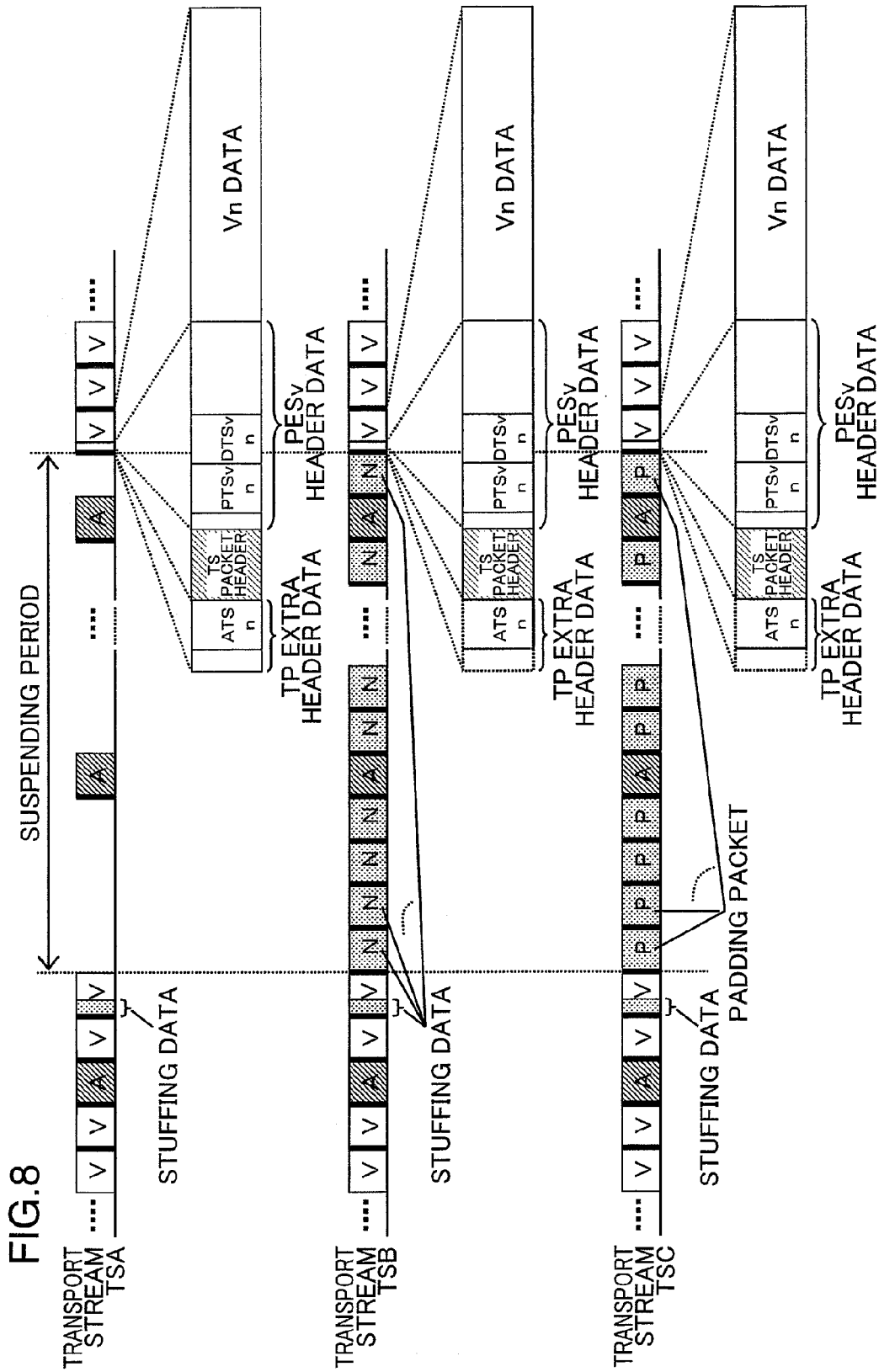
FIG. 8 is a timing chart for describing an operation to be performed by the multiplexing device of the first embodiment during a suspending period.

FIG. 8 is a timing chart showing an example of an operation to be performed in a suspending period when the video remaining size Srv becomes equal to or smaller than the video transmission size Stv. In a transport stream TSA shown in FIG. 8, the video packet generator 32 is operable to suspend generating a TS packet containing video encoded data in a suspending period; and the multiplexer 51 is operable to suspend transmitting a video TS packet in a video period. In the transport stream TSA shown in FIG. 8, a transport stream TS composed of packets called source packets having a TP extra header data area is utilized.

In a transport stream TSB shown in FIG. 8, the video packet generator 32 is operable to generate a TS packet containing stuffing data such as null data, in place of video encoded data; and the multiplexer 51 is operable to transmit a TS packet containing stuffing data in a video period. In a transport stream TSC shown in FIG. 8, the video packet generator 32 is operable to generate a padding packet in place of a TS packet containing video encoded data; and the multiplexer 51 is operable to transmit a padding packet in a video period.

In the case where the transport stream TSA as shown in FIG. 8 is transmitted in a suspending period, the video packet generator 32 is operable to store last video encoded data of an access unit in a payload of a TS packet. In the case where there is an empty area in the payload, the video packet generator 32 is operable to fill the empty area of the payload with stuffing data. After a TS packet containing the last video encoded data of the access unit is generated, the video packet generator 32 suspends generating a TS packet, as shown in the transport stream TSA in FIG. 8, if the video remaining size Srv becomes equal to or smaller than the video transmission size Stv. After termination of the suspending period, in response to supply of succeeding video encoded data to the video buffer 31, the video encoder 11 is operable to notify the video remaining size calculator 33 of the actual video size Sv at the aforementioned predetermined timing.

By performing the above operation, the video remaining size Srv to be calculated by the video remaining size calculator 33 becomes equal to or larger than the video transmission size Stv. Then, the video packet generator 32 is operable to resume generating a TS packet. In this case, since succeeding data to be transmitted corresponds to leading data of an access unit, the video packet generator 32 is operable to store PESv header data in a TS packet, and store leading video encoded data in an empty area of a payload to generate a TS packet containing video encoded data.

In the multiplexing device of the embodiment, in the case where generation of a TS packet is resumed after suspending transmission of a TS packet in a suspending period, as shown in the transport stream TSA in FIG. 8, an arrival time stamp (ATS) as shown by the symbol ATSn is stored in a TP extra header data area, and a TS packet containing the arrival time stamp ATSn is transmitted. By performing the above operation, even in a suspending period, a transport stream TS can be smoothly reproduced by utilizing the arrival time stamp. Providing an arrival time stamp is advantageous in reducing the capacity of data to be recorded in the recording medium 62.

In the case where the transport stream TSB as shown in FIG. 8 is transmitted in a suspending period, the video packet generator 32 is operable to store last video encoded data of an access unit in a payload of a TS packet. In the case where there is an empty area in the payload, the video packet generator 32 is operable to fill the empty area of the payload with stuffing data. After a TS packet containing the last video encoded data of the access unit is generated, the video packet generator 32 is operable to generate a TS packet containing stuffing data indicated by the symbol "N" for filling an empty area of the TS packet, as shown in the transport stream TSB in FIG. 8, if the video remaining size Srv becomes equal to or smaller than the video transmission size Stv, or smaller than the video transmission size Stv.

By performing the above operation, during a video period in the suspending period, the multiplexer 51 is operable to transmit a TS packet containing stuffing data. Similarly to the case of the transport stream TSA in FIG. 8, after termination of the suspending period, in response to supply of succeeding video encoded data to the video buffer 31, the video packet generator 32 is operable to resume generating a TS packet. In this case, since succeeding data to be transmitted corresponds to leading data of an access unit, the video packet generator 32 is operable to store PESv header data in a TS packet, and store leading video encoded data in an empty area of a payload to generate a TS packet containing video encoded data.

In the case where the transport stream TSC as shown in FIG. 8 is transmitted in a suspending period, the video packet generator 32 is operable to store last video encoded data of an access unit in a payload of a TS packet. If there is an empty area in the payload, the video packet generator 32 is operable to fill the empty area of the payload with stuffing data. After a TS packet containing the last video encoded data of the access unit is generated, the video packet generator 32 is operable to generate a padding packet indicated by the symbol "P" for filling an empty area of the TS packet, as shown in the transport stream TSC in FIG. 8, if the video remaining size Srv becomes equal to or smaller than the video transmission size Stv, or smaller than the video transmission size Stv.

By performing the above operation, during a video period in the suspending period, the multiplexer 51 is operable to transmit a padding packet. Similarly to the case of the transport stream TSA shown in FIG. 8, after termination of the suspending period, in response to supply of succeeding video encoded data to the video buffer 31, the video packet generator 32 is operable to resume generating a TS packet. In this case, since succeeding data to be transmitted corresponds to leading data of an access unit, the video packet generator 32 is operable to store PESv header data in a TS packet, and store leading video encoded data in an empty area of a payload to generate a TS packet containing video encoded data.

In generating the transport stream TSB or the transport stream TSC shown in FIG. 8, a packet having a TP extra header data area may be transmitted, or an ordinary TS packet may be transmitted.

Next, an operation to be performed by the multiplexing device of the embodiment is described in detail.

Figure 9:
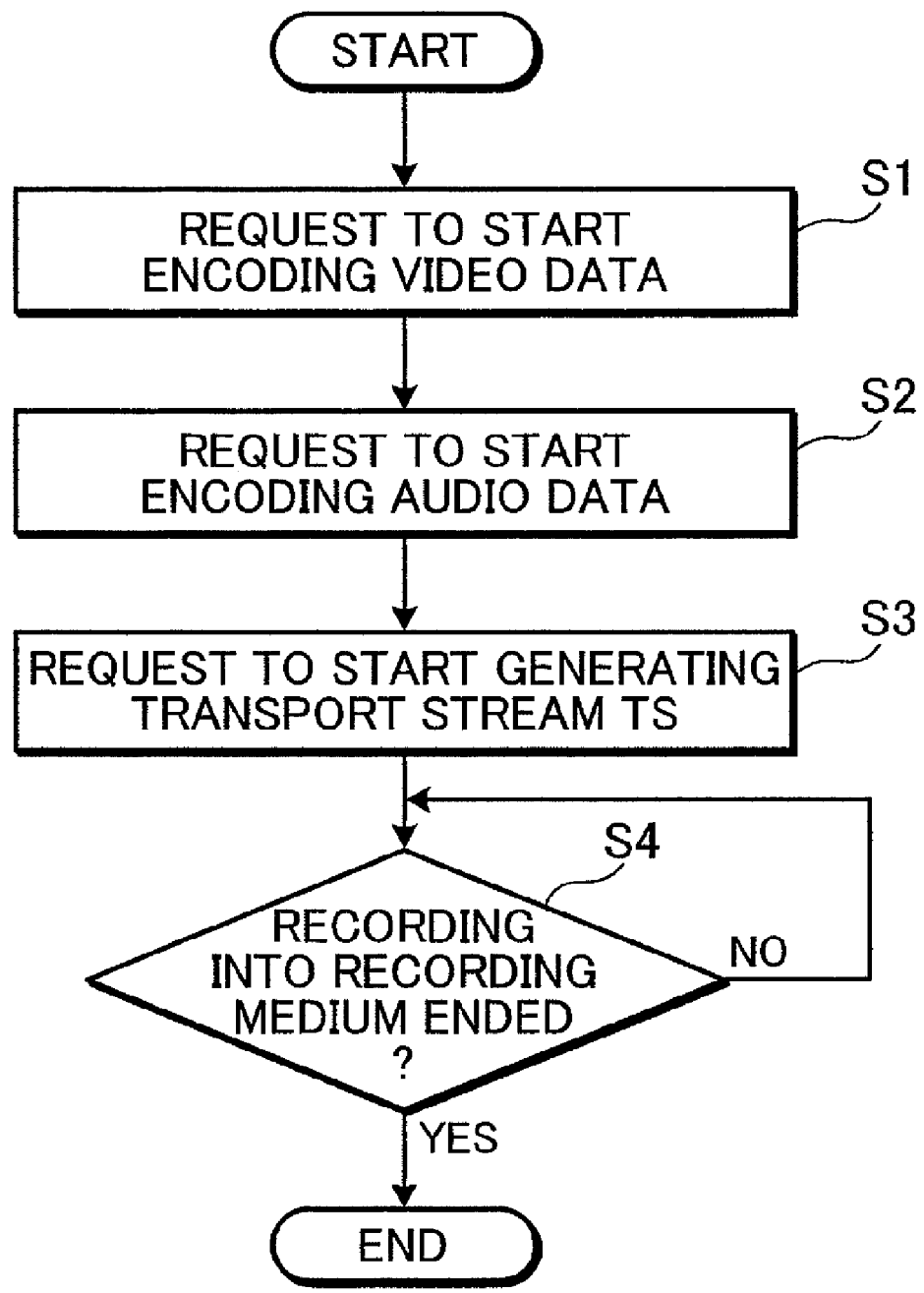
FIG. 9 is a flowchart showing an operation to be performed by a device controller in the multiplexing device of the first embodiment.

FIG. 9 is a flowchart showing an operation to be performed by the device controller 19 in the multiplexing device of the first embodiment. In the following, the operation to be performed by the multiplexing device of the embodiment is described in detail referring to FIG. 9.

Upon receiving a user's designation to record contents, the device controller 19 in the multiplexing device performs an operation as shown in FIG. 9. Specifically, the device controller 19 requests the video encoder 11 to start an operation of encoding inputted video data i.e. an operation of subjecting inputted video data to compression encoding (Step S1).

Then, the device controller 19 requests the audio encoder 21 to start an operation of encoding inputted audio data i.e. an operation of subjecting inputted audio data to compression encoding (Step S2). Then, the device controller 19 requests the controller 59 in the TS generating section 30 to start generating a transport stream TS (Step S3). Thereafter, the device controller 19 is brought to a standby state to wait for a user's designation or a like designation, and terminates an operation of recording the contents into the recording medium 62 upon accepting a command to terminate recording the contents (Step S4).

Figure 10:
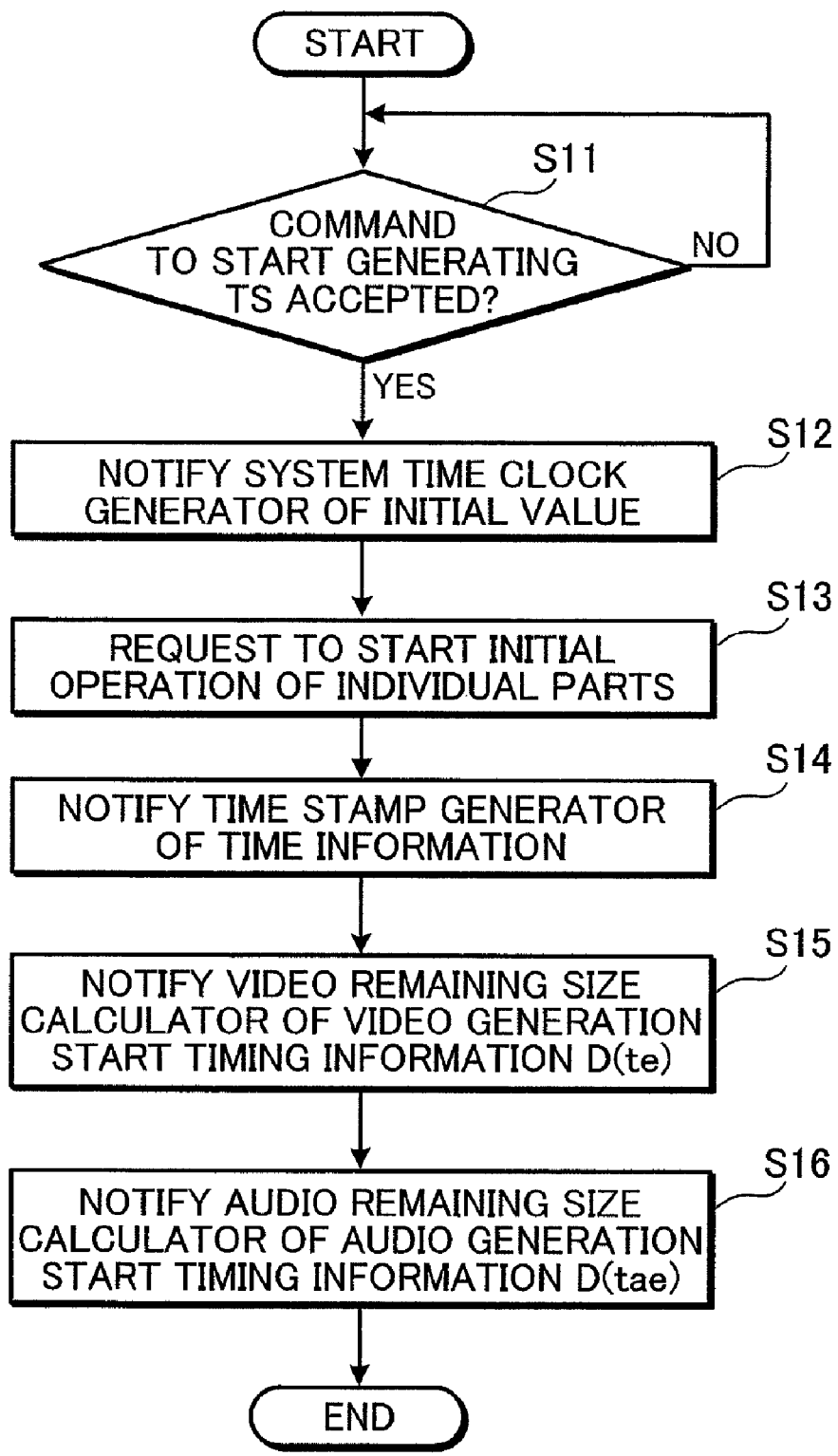
FIG. 10 is a flowchart showing an operation to be performed by a controller in the multiplexing device of the first embodiment.

Next, an operation to be performed by the controller 59 is described. FIG. 10 is a flowchart showing an operation to be performed by the controller 59 in the multiplexing device of the first embodiment.

First, the controller 59 in the TS generating section 30 judges whether a command to start generating a transport stream TS to be outputted from the device controller 19 has been accepted (Step S11). If the controller 59 judges that a command to start generating a transport stream TS has not been accepted (NO in Step S11), the controller 59 is brought to a standby state until a command to start generating a transport stream TS is accepted.

If, on the other hand, the controller 59 judges that a command to start generating a transport stream TS has been accepted (YES in Step S11), the controller 59 starts the following operation. First, the controller 59 notifies the system time clock generator 55 of an initial value of STC (Step S12). Thereby, the system time clock generator 55 starts counting a reference timing from the initial value, notifies the video remaining size calculator 33 and the audio remaining size calculator 43 of STC information, and notifies the system packet generator 49 of PCR information.

Then, the controller 59 requests the individual parts in the TS generating section 30 to start initial operations thereof (Step S13). In this embodiment, the initial operations include an operation of booting a program, and an operation of initializing a variable. Then, the controller 59 notifies the time stamp generator 57 of time information relating to startup timings, and time information relating to a video frame and an audio frame (Step S14).

Then, the controller 59 notifies the video remaining size calculator 33 of video generation start timing information D(te) (Step S15). Thereby, the video remaining size calculator 33 waits until the time of the STC coincides with the video generation start timing "te". Then, the controller 59 notifies the audio remaining size calculator 43 of audio generation start timing information D(tae) (Step S16). Thereby, the audio remaining size calculator 43 waits until the time of the STC coincides with the audio generation start timing "tae". Thereafter, the controller 59 is brought to a standby state to wait for e.g. a command from the device controller 19.

Figure 11:
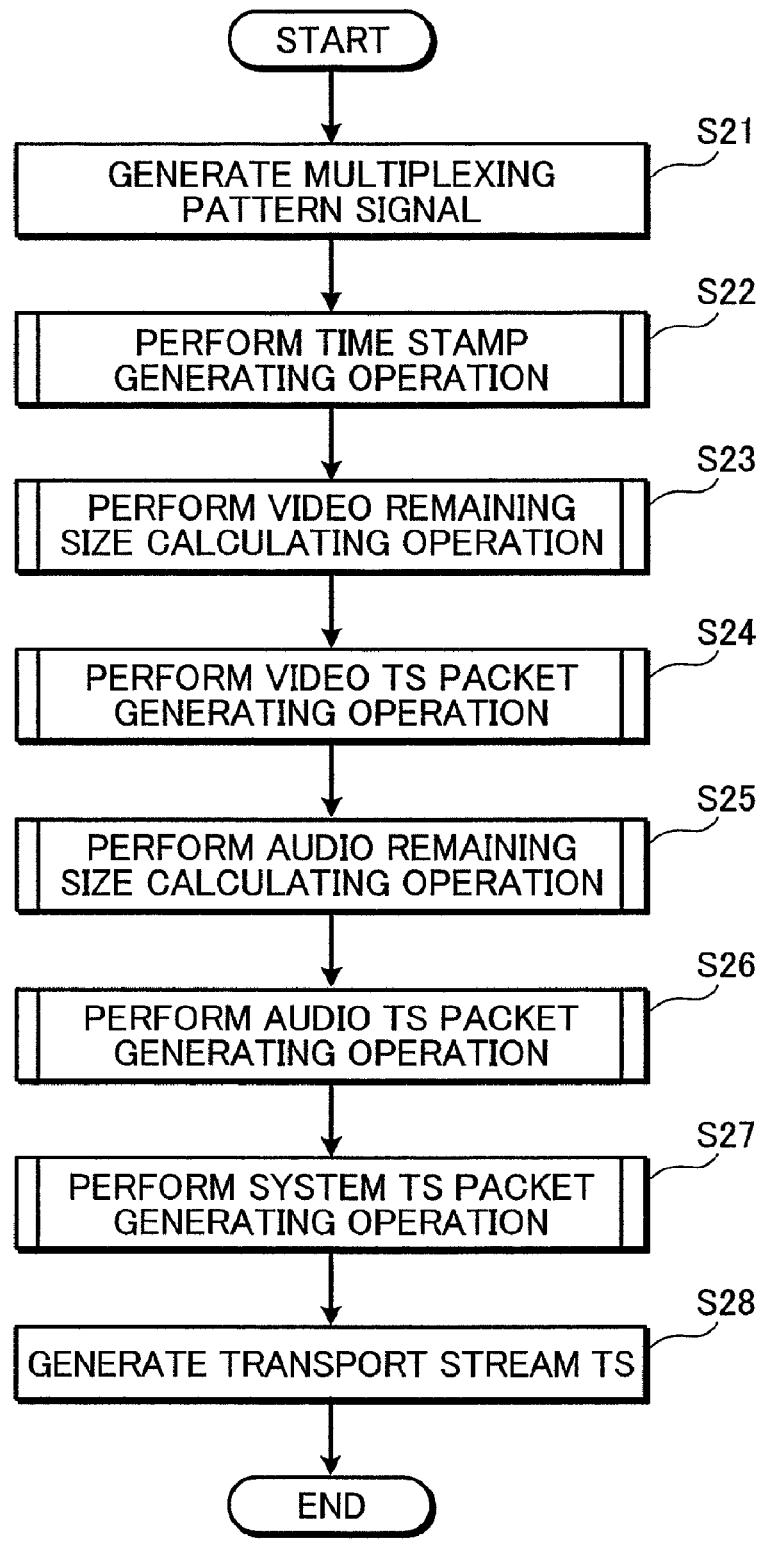
FIG. 11 is a flowchart showing a multiplexed stream generating operation to be performed by the multiplexing device of the first embodiment.

Next, a multiplexed stream generating operation to be performed by the multiplexing device of the embodiment is described. FIG. 11 is a flowchart showing a multiplexed stream generating operation to be performed by the multiplexing device of the first embodiment.

First, the multiplexing pattern generator 56 generates a multiplexing pattern signal P corresponding to a multiplexing pattern indicating the order of types of data to be multiplexed; and outputs the multiplexing pattern signal P to the video packet generator 32, the audio packet generator 42, and the system packet generator 49 (Step S21).

Then, the time stamp generator 57 generates time stamp information, using the time information outputted from the controller 59 (Step S22). The time information includes time information relating to startup timings such as the startup delay time Tsu and the correction time Tsc; and time information indicating the video frame cycle Tfr and the audio frame cycle Tafr. A time stamp information generating operation to be performed by the time stamp generator 57 is described later referring to FIGS. 12 and 13.

Then, the video remaining size calculator 33 calculates video remaining size i.e. the size of multiplexable data of a video elementary stream which has been temporarily stored in the video buffer 31, and outputs video remaining size information indicating the calculated video remaining size (Step S23). The video remaining size calculating operation to be performed by the video remaining size calculator 33 is described later referring to FIG. 15.

Then, the video packet generator 32 reads out, as transmission data, data of a predetermined size from the video elementary stream temporarily stored in the video buffer 31, based on the multiplexing pattern signal and the video remaining size information; and generates a video TS packet containing the readout transmission data (Step S24). The video TS packet generating operation to be performed by the video packet generator 32 is described later referring to FIGS. 16 and 17.

Then, the audio remaining size calculator 43 calculates an audio remaining size i.e. the size of multiplexable data of an audio elementary stream which has been temporarily stored in the audio buffer 41, and outputs audio remaining size information indicating the calculated audio remaining size (Step S25). The audio remaining size calculating operation to be performed by the audio remaining size calculator 43 is described later referring to FIG. 18.

Then, the audio packet generator 42 reads out, as transmission data, data of a predetermined size from the audio elementary stream temporarily stored in the audio buffer 41, based on the multiplexing pattern signal and the audio remaining size information; and generates an audio TS packet containing the readout transmission data (Step S26). The audio TS packet generating operation to be performed by the audio packet generator 42 is described later referring to FIGS. 19 and 20.

Then, the system packet generator 49 generates a system TS packet containing system data including information relating to a multiplexed stream to be generated, based on the multiplexing pattern signal (Step S27). The system TS packet generating operation to be performed by the system packet generator 49 is described later referring to FIG. 21.

Then, the multiplexer 51 multiplexes the video TS packet generated by the video packet generator 32, the audio TS packet generated by the audio packet generator 42, and the system TS packet generated by the system packet generator 49 into a transport stream TS in the order of generation (Step S28).

Figure 12:
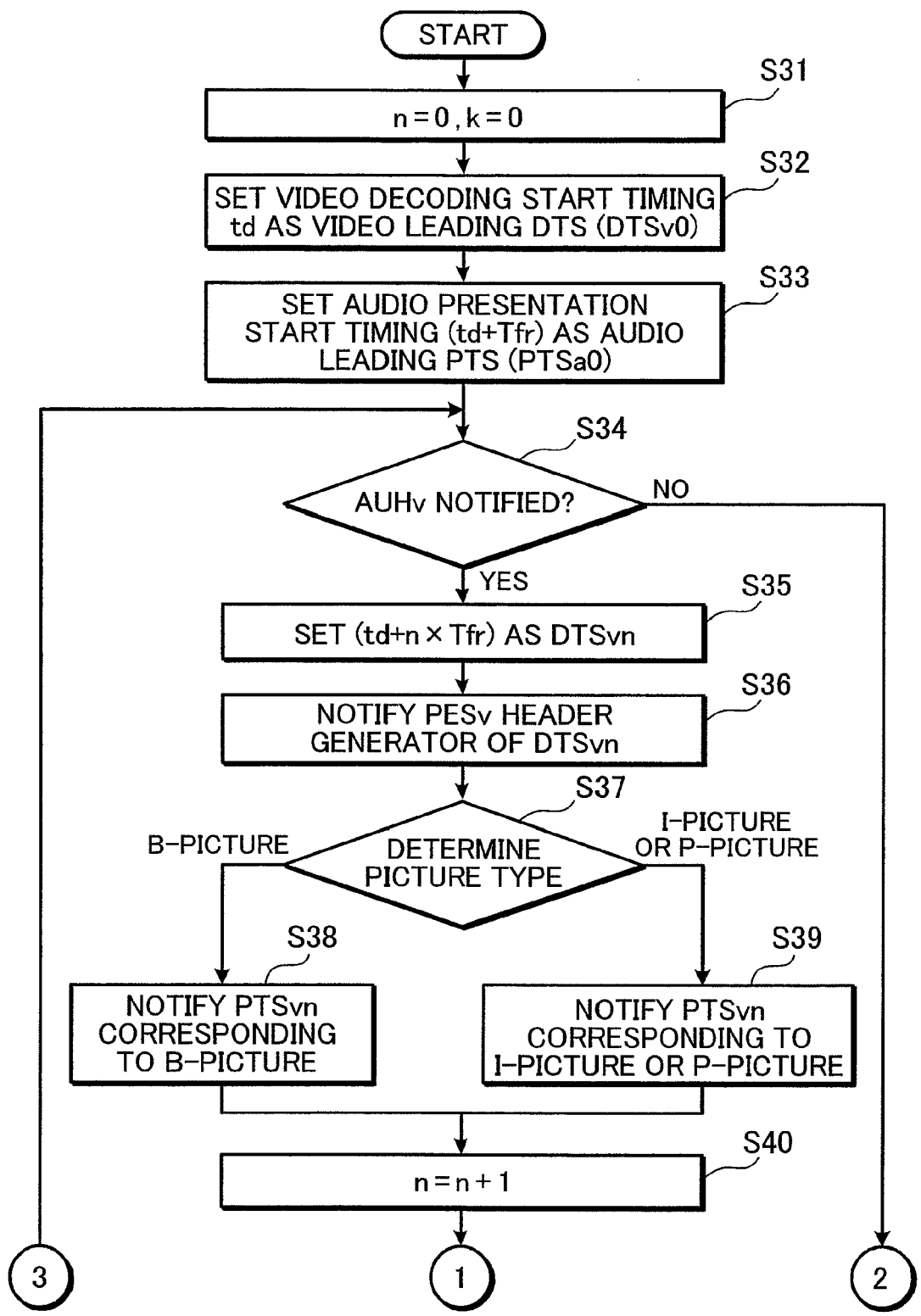
FIG. 12 is a first half of a flowchart showing an operation to be performed by a time stamp generator in the multiplexing device of the first embodiment.
Figure 13:
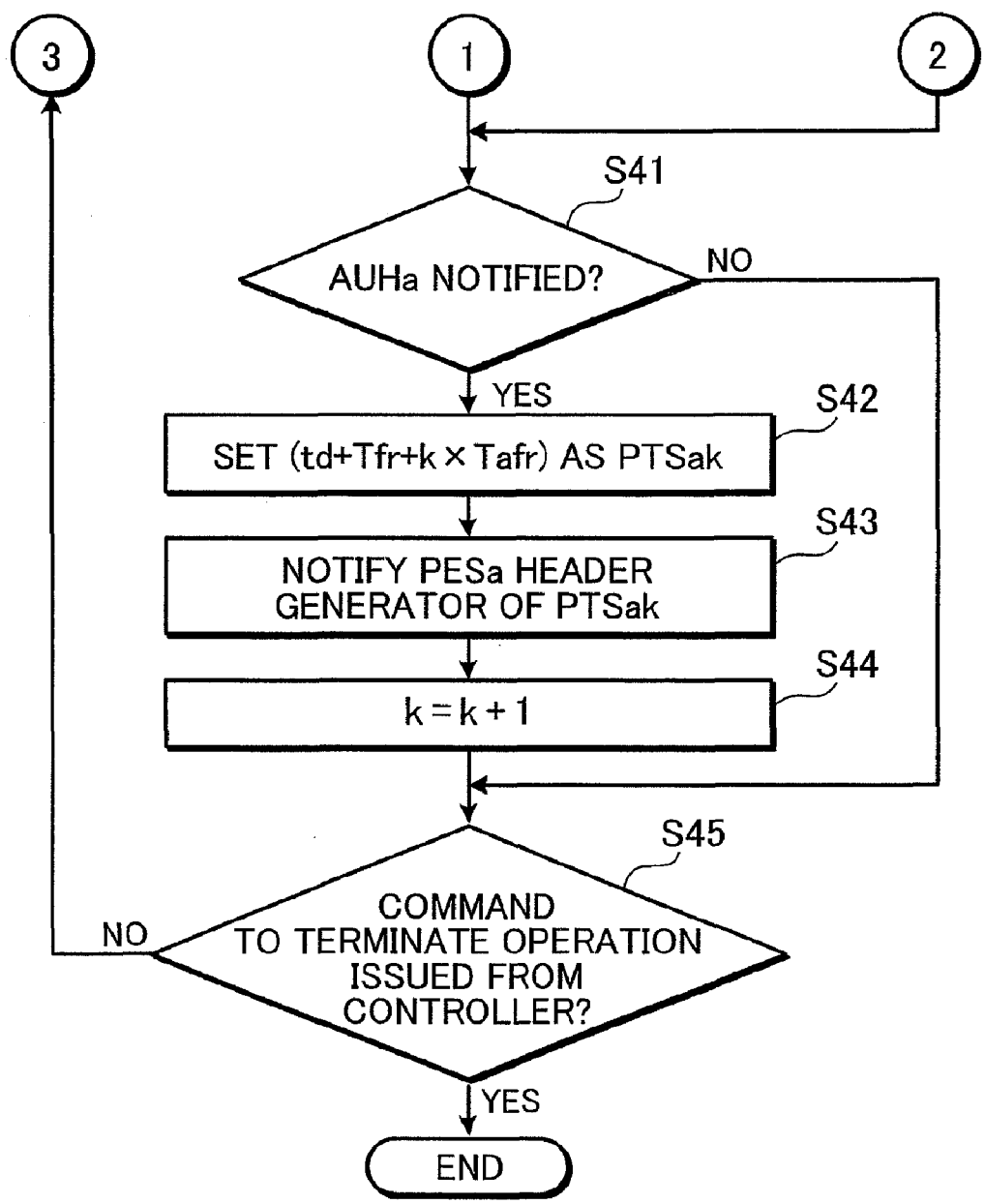
FIG. 13 is a second half of the flowchart showing the operation to be performed by the time stamp generator in the multiplexing device of the first embodiment.

Next, the operation to be performed by the time stamp generator 57 in Step S22 in FIG. 11 is described. FIGS. 12 and 13 are a flowchart showing the operation to be performed by the time stamp generator 57 in the multiplexing device of the first embodiment. The time stamp generator 57 performs the operation as shown in FIGS. 12 and 13 upon receiving time information relating to startup timings, and time information relating to a video frame and an audio frame from the controller 59.

First, the time stamp generator 57 resets a counter "N" for counting a video frame, and a counter "K" for counting an audio frame, in other words, sets the counter "N" and the counter "K" to 0 (Step S31).

Then, the time stamp generator 57 sets the video decoding start timing "td", as a DTS value with respect to video encoded data of an access unit to be transmitted for the first time, based on the time information relating to startup timings, which has been notified from the controller 59 (Step S32).

Then, the time stamp generator 57 sets the audio presentation start timing (td+Tfr), as a PTS value with respect to audio encoded data of an access unit to be transmitted for the first time, based on the time information relating to startup timings, which has been notified from the controller 59 (Step S33).

Thereafter, the time stamp generator 57 judges whether a video AU leading notification signal AUHv has been notified from the video remaining size calculator 33 (Step S34). If it is judged that a video AU leading notification signal AUHv has not been notified (NO in Step S34), the time stamp generator 57 judges whether an audio AU leading notification signal AUHa has been notified from the audio remaining size calculator 43 (Step S41).

In Step S41, if it is judged that an audio AU leading notification signal AUHa has not been notified (NO in Step S41), the time stamp generator 57 judges whether a command to terminate the time stamp generating operation has been issued from the controller 59 (Step S45).

In Step S45, if it is judged that a command to terminate the time stamp generating operation has not been issued from the controller 59 (NO in Step S45), the routine returns to Step S34, and the time stamp generator 57 judges whether a video AU leading notification signal AUHv has been issued from the video remaining size calculator 33. Specifically, the time stamp generator 57 waits for notification of a video AU leading notification signal AUHv from the video remaining size calculator 33, and an audio AU leading notification signal AUHa from the audio remaining size calculator 43 until a command to terminate the time stamp generating operation is issued from the controller 59 by repeating the above loop.

In Step S34, if it is judged that a video AU leading notification signal AUHv has been notified (YES in Step S34), the time stamp generator 57 sets a DTS value with respect to video encoded data per access unit. Specifically, assuming that the value of the counter "N" for counting a video frame is set to "n", the time stamp generator 57 sets a timing (td+n× Tfr) as DTSvn with respect to the n-th access unit (Step S35). Then, the time stamp generator 57 notifies the PESv header generator 34 of the DTSvn (Step S36).

Then, the time stamp generator 57 determines the picture type of the access unit (Step S37). If it is judged that the picture type of the access unit is B-picture, the time stamp generator 57 notifies the PESv header generator 34 of PTSvn indicating a PTS value corresponding to B-picture (Step S38). If, on the other hand, it is judged that the picture type of the access unit is I-picture or P-picture, PTSvn indicating a PTS value corresponding to I-picture or P-picture is notified to the PESv header generator 34 (Step S39). Thereafter, the time stamp generator 57 increments the value of the counter "N" by one (Step S40), and the routine proceeds to Step S41.

Figure 14:
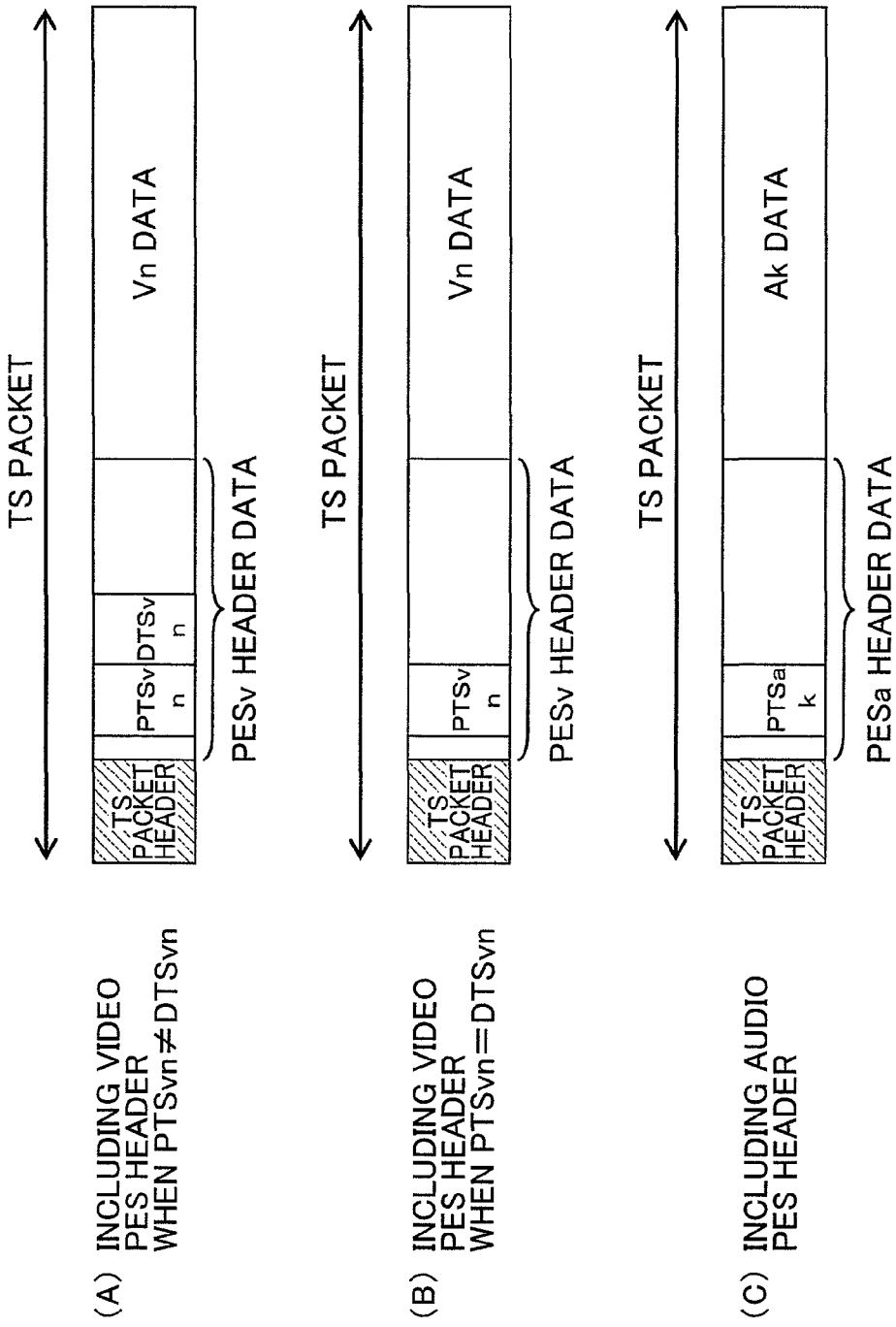
FIG. 14 is a diagram showing arrangement examples of a TS packet including a PES header in the multiplexing device of the first embodiment.

FIG. 14 is a diagram showing arrangements of a TS packet containing a PES header in the multiplexing device of the first embodiment. The arrangement (A) in FIG. 14 shows an example of a TS packet containing a video PES header, wherein DTSvn indicating a DTS value, and PTSvn indicating a PTS value are different from each other in a video PES. The arrangement (B) in FIG. 14 shows an example of a TS packet containing a video PES header, wherein DTSvn is identical to PTSvn. As shown in the arrangement (B) in FIG. 14, normally, in the case where a DTS value and a PTS value are identical to each other, solely the PTS value is stored. The PESv header generator 34 is operable to generate PESv header data as shown in the arrangement (A) or the arrangement (B) in FIG. 14, using DTSvn information and PTSvn information which have been notified as described above.

Referring back to FIG. 13, in Step S41, if it is judged that an audio AU leading notification signal AUHa has been notified, the time stamp generator 57 sets a PTS value with respect to audio encoded data per access unit. Specifically, assuming that the value of the counter "K" for counting an audio frame is set to "k", the time stamp generator 57 sets a timing (td+ Tfr+k×Tafr) as PTSak with respect to the k-th access unit (Step S42).

Then, the time stamp generator 57 notifies the PESa header generator 44 of the PTSak (Step S43). Thereafter, the time stamp generator 57 increments the value of the counter "K" by one (Step S44), and the routine proceeds to Step S45. The PESa header generator 44 is operable to generate PESa header data as shown in the arrangement (C) in FIG. 14, using PTSak information which has been notified as described above. If it is judged that a command to terminate the time stamp generating operation has been issued from the controller 59 (YES in Step S45), the routine is ended.

Figure 15:
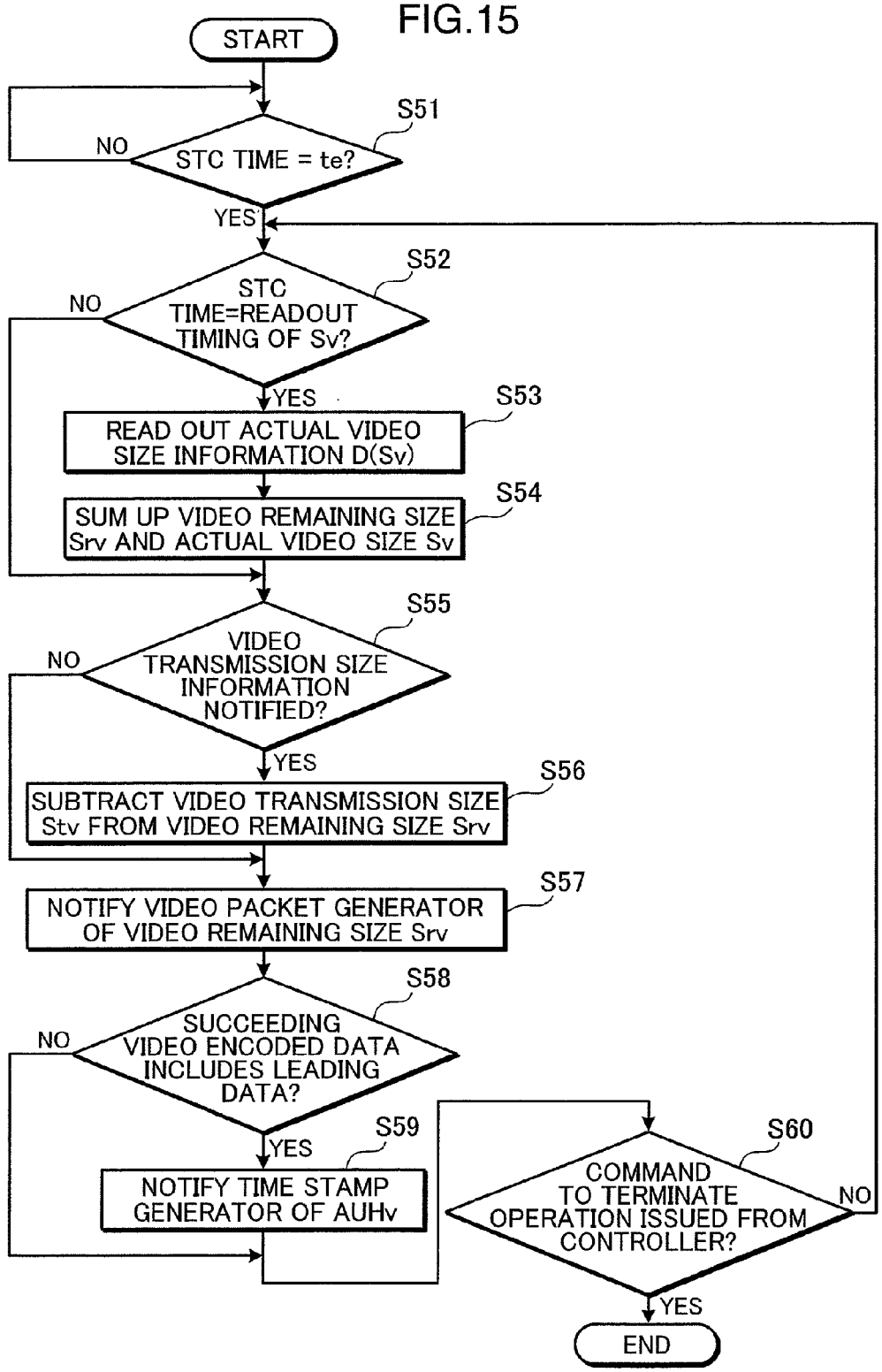
FIG. 15 is a flowchart showing an operation to be performed by a video remaining size calculator in the multiplexing device of the first embodiment.

Next, the operation to be performed by the video remaining size calculator 33 in Step S23 in FIG. 11 is described. FIG. 15 is a flowchart showing the operation to be performed by the video remaining size calculator 33 in the multiplexing device of the first embodiment. The video remaining size calculator 33 performs the operation shown in FIG. 15, upon receiving video generation start timing information D(te) from the controller 59.

First, the video remaining size calculator 33 judges whether the time of the STC to be notified from the system time clock generator 55 coincides with the video generation start timing "te" (Step S51). If it is judged that the time of the STC does not coincide with the video generation start timing "te" (NO in Step S51), the video remaining size calculator 33 repeatedly performs the judgment in Step S51 at a predetermined time interval.

If it is judged that the time of the STC coincides with the video generation start timing "te" (YES in Step S51), the video remaining size calculator 33 proceeds to a succeeding step. First, the video remaining size calculator judges whether the time of the STC coincides with a readout timing of the actual video size Sv (Step S52). If it is judged that the time of the STC does not coincide with a readout timing of the actual video size Sv (NO in Step S52), the video remaining size calculator 33 proceeds to Step S55, which is described in the following.

If, on the other hand, it is judged that the time of the STC coincides with a readout timing of the actual video size Sv (YES in Step S52), the video remaining size calculator 33 reads out actual video size information D(Sv) from the video unit size measuring section 12 (Step S53). Then, the video remaining size calculator 33 sums up the video remaining size Srv and the actual video size Sv indicated by the readout actual video size information D(Sv) (Step S54).

Then, the video remaining size calculator 33 judges whether video transmission size information D(Stv) has been notified from the video packet generator 32 (Step S55). If it is judged that video transmission size information D(Stv) has been notified (YES in Step S55), the video remaining size calculator 33 subtracts the video transmission size Stv indicated by the readout video transmission size information D(Stv) from the video remaining size Srv (Step S56).

If, on the other hand, it is judged that video transmission size information D(Stv) has not been notified (NO in Step S55), the routine of the video remaining size calculator 33 proceeds to Step S57. Then, the video remaining size calculator 33 notifies the video packet generator 32 of the calculated video remaining size Srv, as video remaining size information D(Srv) (Step S57).

Thereafter, the video remaining size calculator 33 judges whether video encoded data to be transmitted in a succeeding operation includes leading data of an access unit (Step S58). If it is judged that video encoded data to be transmitted in a succeeding operation includes leading data of an access unit (YES in Step S58), the video remaining size calculator 33 notifies the time stamp generator 57 of a video AU leading notification signal AUHv (Step S59).

If, on the other hand, it is judged that video encoded data to be transmitted in a succeeding operation does not include leading data of an access unit (NO in Step S58), the routine of the video remaining size calculator 33 proceeds to Step S60. Then, the video remaining size calculator 33 judges whether a command to terminate the video remaining size calculating operation has been issued from the controller 59 (Step S60). If it is judged that a command to terminate the video remaining size calculating operation has not been issued (NO in Step S60), the routine of the video remaining size calculator 33 returns to Step S52. If, on the other hand, it is judged that a command to terminate the video remaining size calculating operation has been issued (YES in Step S60), the video remaining size calculator 33 terminates the video remaining size calculating operation.

Figure 16:
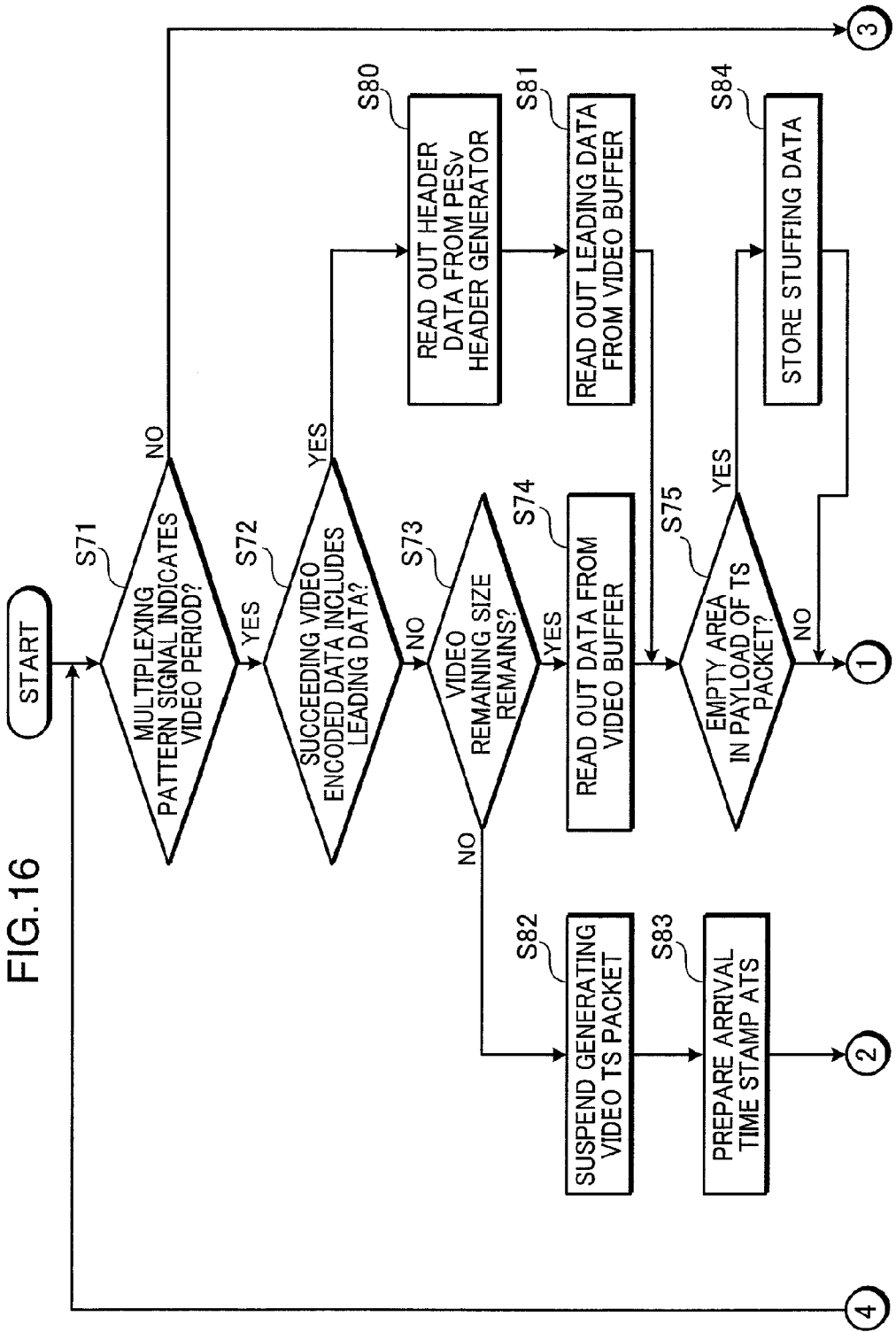
FIG. 16 is a first half of a flowchart showing an operation to be performed by a video packet generator in the multiplexing device of the first embodiment.
Figure 17:
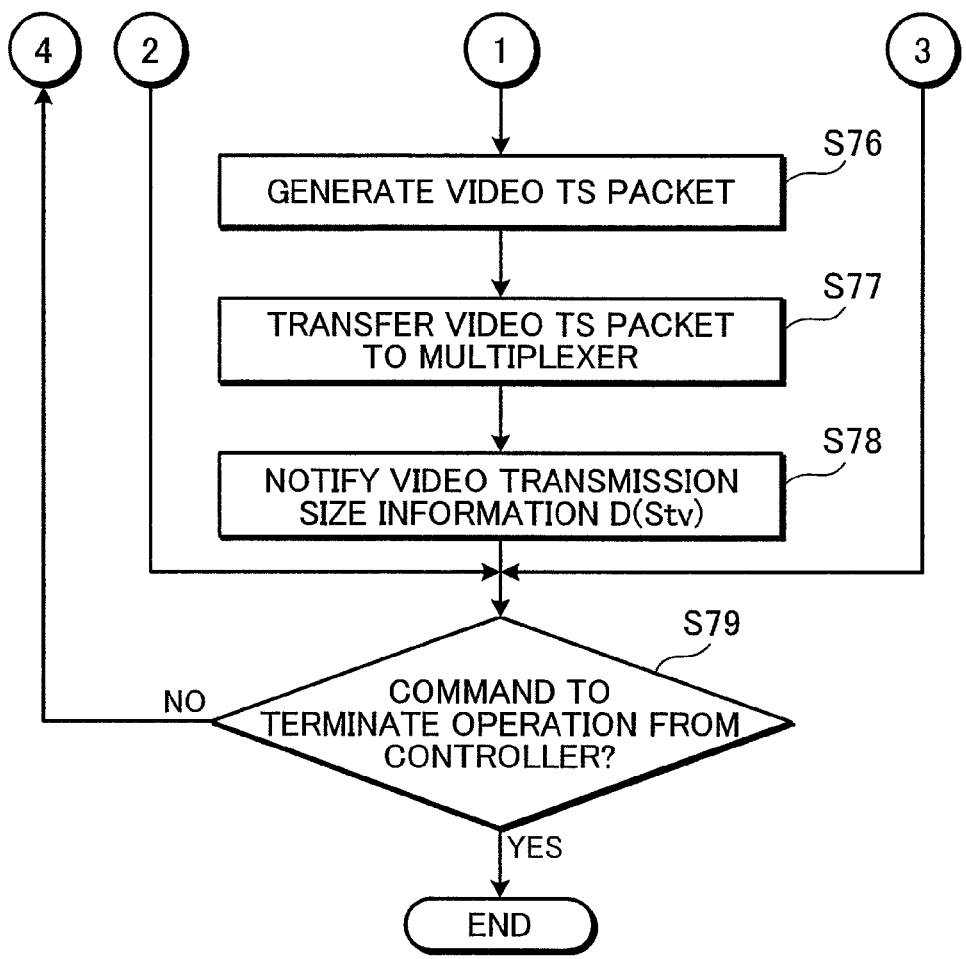
FIG. 17 is a second half of the flowchart showing the operation to be performed by the video packet generator in the multiplexing device of the first embodiment.

Next, the operation to be performed by the video packet generator 32 in Step S24 in FIG. 11 is described. FIGS. 16 and 17 are a flowchart showing the operation to be performed by the video packet generator 32 in the multiplexing device of the first embodiment. The video packet generator 32 performs the operation shown in FIGS. 16 and 17 in response to start of an initial operation thereof.

First, the video packet generator 32 judges whether the multiplexing pattern signal P indicates a video period (Step S71). If it is judged that the multiplexing pattern signal P does not indicate a video period (NO in Step S71), the video packet generator 32 proceeds to Step S79, which is described in the following.

If, on the other hand, it is judged that the multiplexing pattern signal P indicates a video period (YES in Step S71), the video packet generator 32 judges whether video encoded data to be transmitted in a succeeding operation includes leading data of an access unit (Step S72). If it is judged that video encoded data to be transmitted in a succeeding operation includes leading data of an access unit (YES in Step S72), the video packet generator 32 proceeds to Step S80, which is described in the following.

If, on the other hand, it is judged that video encoded data to be transmitted in a succeeding operation does not include leading data of an access unit (NO in Step S72), the video packet generator 32 judges whether there is video encoded data to be transmitted, based on the video remaining size information D(Srv) notified from the video remaining size calculator 33 (Step S73). If it is judged that there is no video encoded data to be transmitted (NO in Step S73), the video packet generator 32 proceeds to Step S82, which is described in the following.

If, on the other hand, it is judged that there is video encoded data to be transmitted (YES in Step S73), the video packet generator 32 reads out video encoded data to be transmitted, from the video buffer 31 (Step S74). Then, the video packet generator 32 judges whether there is an empty area in a payload of a TS packet to be generated (Step S75). If it is judged that there is an empty area in a payload of a TS packet to be generated (YES in Step S75), the video packet generator 32 fills the empty area with stuffing data (Step S84).

If, on the other hand, it is judged that there is no empty area in a payload of a TS packet to be generated (NO in Step S75), the video packet generator 32 proceeds to Step S76. Then, the video packet generator 32 generates a video TS packet, wherein data is stored in a payload, as described above (Step S76). Then, the video packet generator 32 transfers the video TS packet to the multiplexer 51 (Step S77).

Then, the video packet generator 32 notifies the video remaining size calculator 33 of the video transmission size information D(Stv) (Step S78). Thereafter, the video packet generator 32 judges whether a command to terminate a video packet generating operation has been issued from the controller 59 (Step S79). If it is judged that a command to terminate a video packet generating operation has not been issued (NO in Step S79), the routine of the video packet generator 32 returns to Step S71. If, on the other hand, it is judged that a command to terminate a video packet generating operation has been issued (YES in Step S79), the video packet generator 32 terminates the video packet generating operation.

In Step S72, if it is judged that video encoded data to be transmitted in a succeeding operation includes leading data of an access unit (YES in Step S72), the video packet generator 32 reads out PESv header data from the PESv header generator 34 (Step S80). Then, the video packet generator 32 reads out video encoded data corresponding to the leading data to be transmitted, from the video buffer 31, and stores the video encoded data in a payload area (Step S81). Thereafter, the video packet generator 32 proceeds to Step S75.

In Step S73, it is judged that there is no video encoded data to be transmitted (NO in Step S73), the video packet generator 32 suspends generating a video TS packet (Step S82). Then, the video packet generator 32 prepares an arrival time stamp ATS to be stored in PESv header data to be transmitted in a succeeding operation (Step S83). Specifically, as described referring to FIG. 8, in the case where a period when the amount of data generated by the video encoder 11 is small is continued, after generating a TS packet containing last video encoded data of an access unit, the video packet generator 32 suspends generating a TS packet, if the video remaining size Srv is equal to or smaller than the video transmission size Stv. Then, after termination of the suspending period, in response to supply of succeeding video encoded data to the video buffer 31, the video packet generator 32 transmits an arrival time stamp ATS, and resumes generating a TS packet.

As described referring to FIG. 8, the video packet generator 32 may be operable to generate a TS packet containing stuffing data in a suspending period, as illustrated in the transport stream TSB in FIG. 8; or the video packet generator 32 may be operable to generate a padding packet in a suspending period, as illustrated in the transport stream TSC in FIG. 8, in place of performing the operations in Step S82 and Step S83 shown in FIG. 16.

Figure 18:
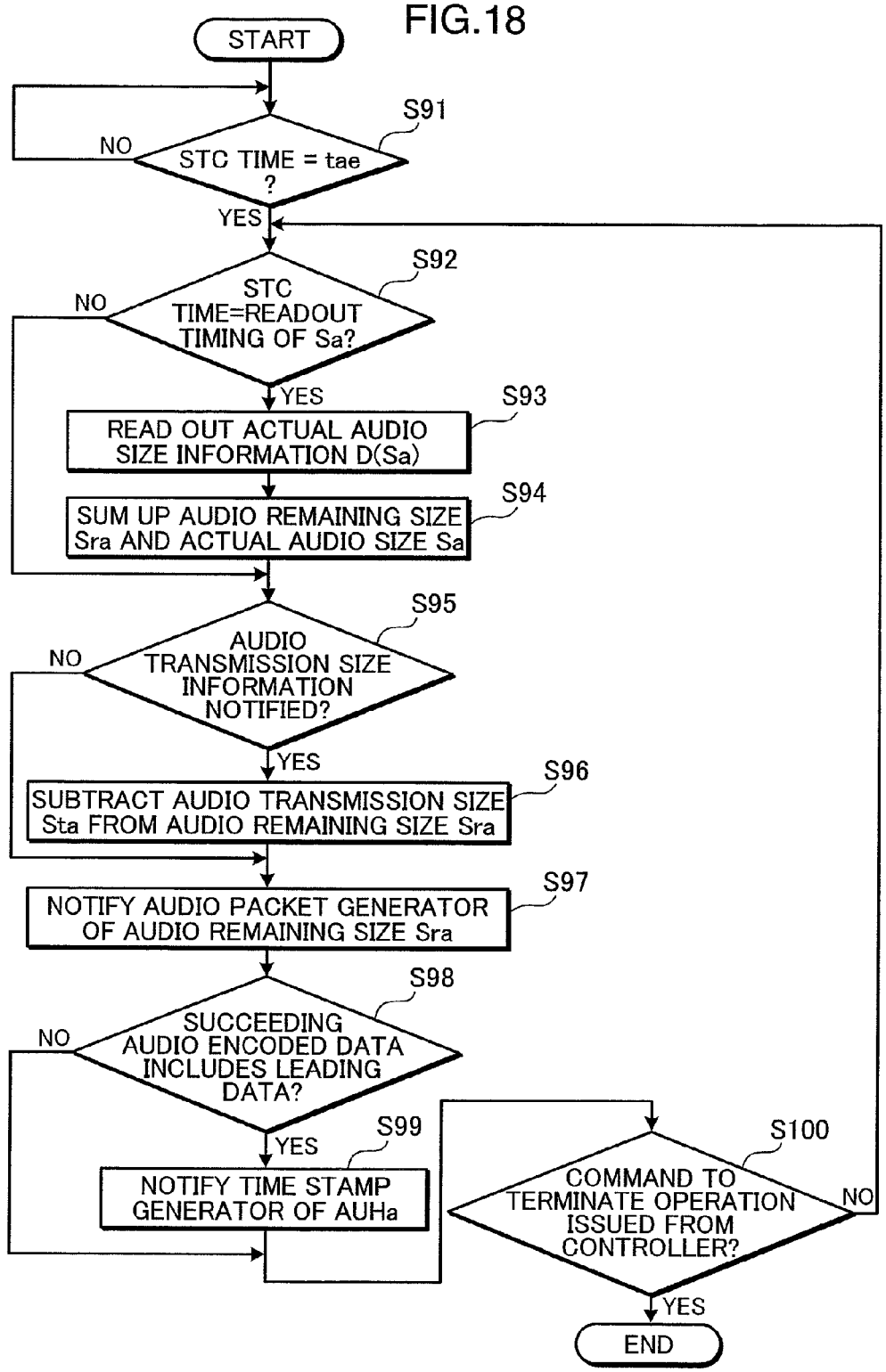
FIG. 18 is a flowchart showing an operation to be performed by an audio remaining size calculator in the multiplexing device of the first embodiment.

Next, the operation to be performed by the audio remaining size calculator 43 in Step S25 in FIG. 11 is described. FIG. 18 is a flowchart showing the operation to be performed by the audio remaining size calculator 43 in the multiplexing device of the first embodiment. The audio remaining size calculator 43 performs the operation shown in FIG. 18, upon receiving audio generation start timing information D(tae) from the controller 59.

First, the audio remaining size calculator 43 judges whether the time of the STC to be notified from the system time clock generator 55 coincides with the audio generation start timing "tae" (Step S91). If it is judged that the time of the STC does not coincide with the audio generation start timing "tae" (NO in Step S91), the audio remaining size calculator 43 repeatedly performs the judgment in Step S91 at a predetermined time interval.

If it is judged that the time of the STC coincides with the audio generation start timing "tae" (YES in Step S91), the routine of the audio remaining size calculator 43 proceeds to a succeeding step. First, the audio remaining size calculator 43 judges whether the time of the STC coincides with a readout timing of the actual audio size Sa (Step S92). If it is judged that the time of the STC does not coincide with a readout timing of the actual audio size Sa (NO in Step S92), the routine of the audio remaining size calculator 43 proceeds to Step S95, which is described in the following.

If, on the other hand, it is judged that the time of the STC coincides with a readout timing of the actual audio size Sa (YES in Step S92), the audio remaining size calculator 43 reads out actual audio size information D(Sa) from the audio unit size measuring section 22 (Step S93). Then, the audio remaining size calculator 43 sums up the audio remaining size Sra and the actual audio size Sa indicated by the readout actual audio size information D(Sa) (Step S94).

Then, the audio remaining size calculator 43 judges whether audio transmission size information D(Sta) has been notified from the audio packet generator 42 (Step S95). If it is judged that audio transmission size information D(Sta) has been notified (YES in Step S95), the audio remaining size calculator 43 subtracts the audio transmission size Sta indicated by the readout audio transmission size information D(Sta) from the audio remaining size Sra (Step S96).

If, on the other hand, it is judged that audio transmission size information D(Sta) has not been notified (NO in Step S95), the routine of the audio remaining size calculator 43 proceeds to Step S97. Then, the audio remaining size calculator 43 notifies the audio packet generator 42 of the calculated audio remaining size Sra, as audio remaining size information D(Sra) (Step S97).

Thereafter, the audio remaining size calculator 43 judges whether audio encoded data to be transmitted in a succeeding operation includes leading data of an access unit (Step S98). If it is judged that audio encoded data to be transmitted in a succeeding operation includes leading data of an access unit (YES in Step S98), the audio remaining size calculator 43 notifies the time stamp generator 57 of an audio AU leading notification signal AUHa (Step S99).

If, on the other hand, it is judged that audio encoded data to be transmitted in a succeeding operation does not include leading data of an access unit (NO in Step S98), the routine of the audio remaining size calculator 43 proceeds to Step S100. Then, the audio remaining size calculator 43 judges whether a command to terminate an audio remaining size calculating operation has been issued from the controller 59 (Step S100). If it is judged that a command to terminate an audio remaining size calculating operation has not been issued (NO in Step S100), the routine of the audio remaining size calculator 43 returns to Step S92. If, on the other hand, it is judged that a command to terminate an audio remaining size calculating operation has been issued (YES in Step S100), the audio remaining size calculator 43 terminates the audio remaining size calculating operation.

Figure 19:
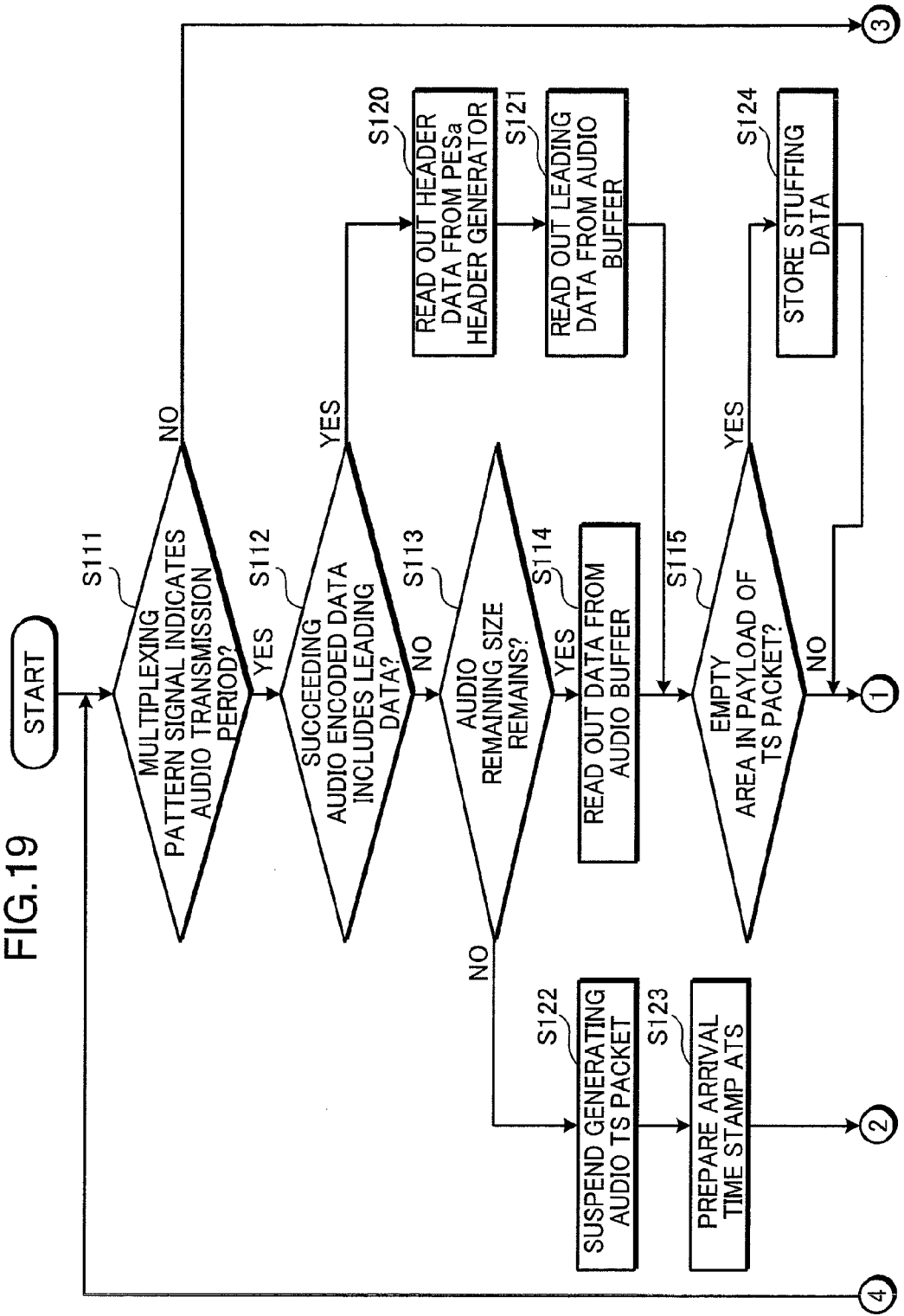
FIG. 19 is a first half of a flowchart showing an operation to be performed by an audio packet generator in the multiplexing device of the first embodiment.
Figure 20:
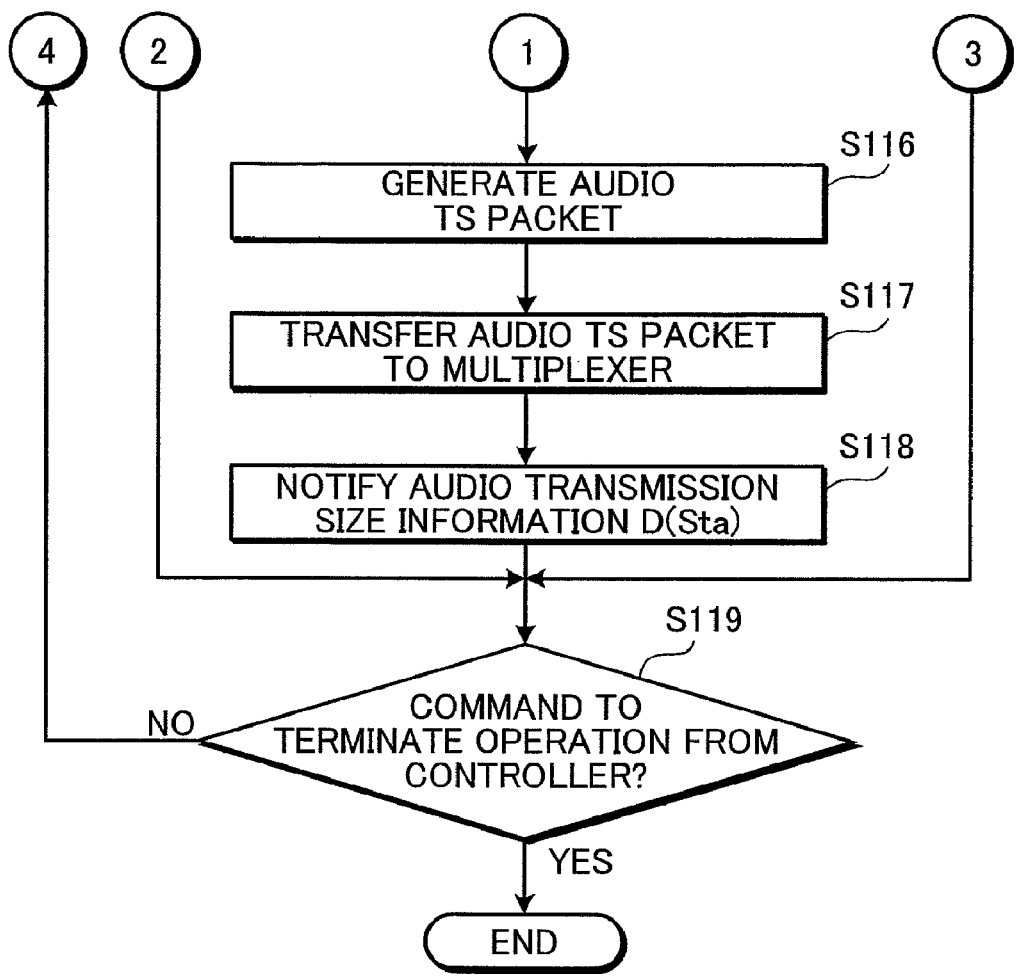
FIG. 20 is a second half of the flowchart showing the operation to be performed by the audio packet generator in the multiplexing device of the first embodiment.

Next, the operation to be performed by the audio packet generator 42 in Step S26 in FIG. 11 is described. FIGS. 19 and 20 are a flowchart showing the operation to be performed by the audio packet generator 42 in the multiplexing device of the first embodiment. The audio packet generator 42 performs the operation shown in FIGS. 19 and 20 in response to start of an initial operation thereof.

First, the audio packet generator 42 judges whether the multiplexing pattern signal P indicates an audio transmission period (Step S111). If it is judged that the multiplexing pattern signal P does not indicate an audio transmission period (NO in Step S111), the routine of the audio packet generator 42 proceeds to Step 119, which is described in the following. If, on the other hand, it is judged that the multiplexing pattern signal P indicates an audio transmission period (YES in Step S111), the audio packet generator 42 judges whether audio encoded data to be transmitted in a succeeding operation includes leading data of an access unit (Step S112). If it is judged that audio encoded data to be transmitted in a succeeding operation includes leading data of an access unit (YES in Step S112), the routine of the audio packet generator 42 proceeds to Step S120, which is described in the following.

If, on the other hand, it is judged that audio encoded data to be transmitted in a succeeding operation does not include leading data of an access unit (NO in Step S112), the audio packet generator 42 judges whether there is audio encoded data to be transmitted, based on the audio remaining size information D(Sra) notified from the audio remaining size calculator 43 (Step S113). If it is judged that there is no audio encoded data to be transmitted (NO in Step S113), the routine of the audio packet generator 42 proceeds to Step S122, which is described in the following.

If, on the other hand, it is judged that there is audio encoded data to be transmitted (YES in Step S113), the audio packet generator 42 reads out audio encoded data to be transmitted, from the audio buffer 41 (Step S114). Then, the audio packet generator 42 judges whether there is an empty area in a payload of a TS packet to be generated (Step S115). If it is judged that there is an empty area in a payload of a TS packet to be generated (YES in Step S115), the audio packet generator 42 fills the empty area with stuffing data (Step S124).

If, on the other hand, it is judged that there is no empty area in a payload of a TS packet to be generated (NO in Step S115), the routine of the audio packet generator 42 proceeds to Step S116. Then, the audio packet generator 42 generates an audio TS packet, wherein data is stored in a payload as described above (Step S116). Then, the audio packet generator 42 transfers the audio TS packet to the multiplexer 51 (Step S117).

Then, the audio packet generator 42 notifies the audio remaining size calculator 43 of the audio transmission size information D(Sta) (Step S118). Thereafter, the audio packet generator 42 judges whether a command to terminate an audio packet generating operation has been issued from the controller 59 (Step S119). If it is judged that a command to terminate an audio packet generating operation has not been issued (NO in Step S119), the routine of the audio packet generator 42 returns to Step S111. If, on the other hand, it is judged that a command to terminate an audio packet generating operation has been issued (YES in Step S119), the audio packet generator 42 terminates the audio packet generating operation.

In Step S112, if it is judged that audio encoded data to be transmitted in a succeeding operation includes leading data of an access unit (YES in Step S112), the audio packet generator 42 reads out PESa header data from the PESa header generator 44 (Step S120). Then, the audio packet generator 42 reads out audio encoded data corresponding to the leading data to be transmitted, from the audio buffer 41, and stores the audio encoded data in a payload area (Step S121). Thereafter, the routine of the audio packet generator 42 proceeds to Step S115.

In Step S113, if it is judged that there is no audio encoded data to be transmitted, based on the audio remaining size information D(Sra) notified from the audio remaining size calculator 43 (NO in Step S113), the audio packet generator 42 suspends generating an audio TS packet (Step S122). Then, the audio packet generator 42 prepares an arrival time stamp ATS to be stored in PESa header data to be transmitted in a succeeding operation (Step S123). Specifically, similarly to the case of processing video data as described referring to FIG. 8, in the case where a period when the amount of data generated by the audio encoder 21 is small is continued, after generating a TS packet containing last audio encoded data of an access unit, the audio packet generator 42 suspends generating a TS packet, if the audio remaining size Sra is equal to or smaller than the audio transmission size Sta. Then, after termination of the suspending period, in response to supply of succeeding audio encoded data to the audio buffer 41, the audio packet generator 42 transmits an arrival time stamp ATS, and resumes generating a TS packet.

As described referring to FIG. 8, the audio packet generator 42 may be operable to generate a TS packet containing stuffing data in a suspending period, as illustrated in the transport stream TSB in FIG. 8; or the audio packet generator 42 may be operable to generate a padding packet in a suspending period, as illustrated in the transport stream TSC in FIG. 8, in place of performing the operations in Step S122 and Step S123 shown in FIG. 19.

Figure 21:
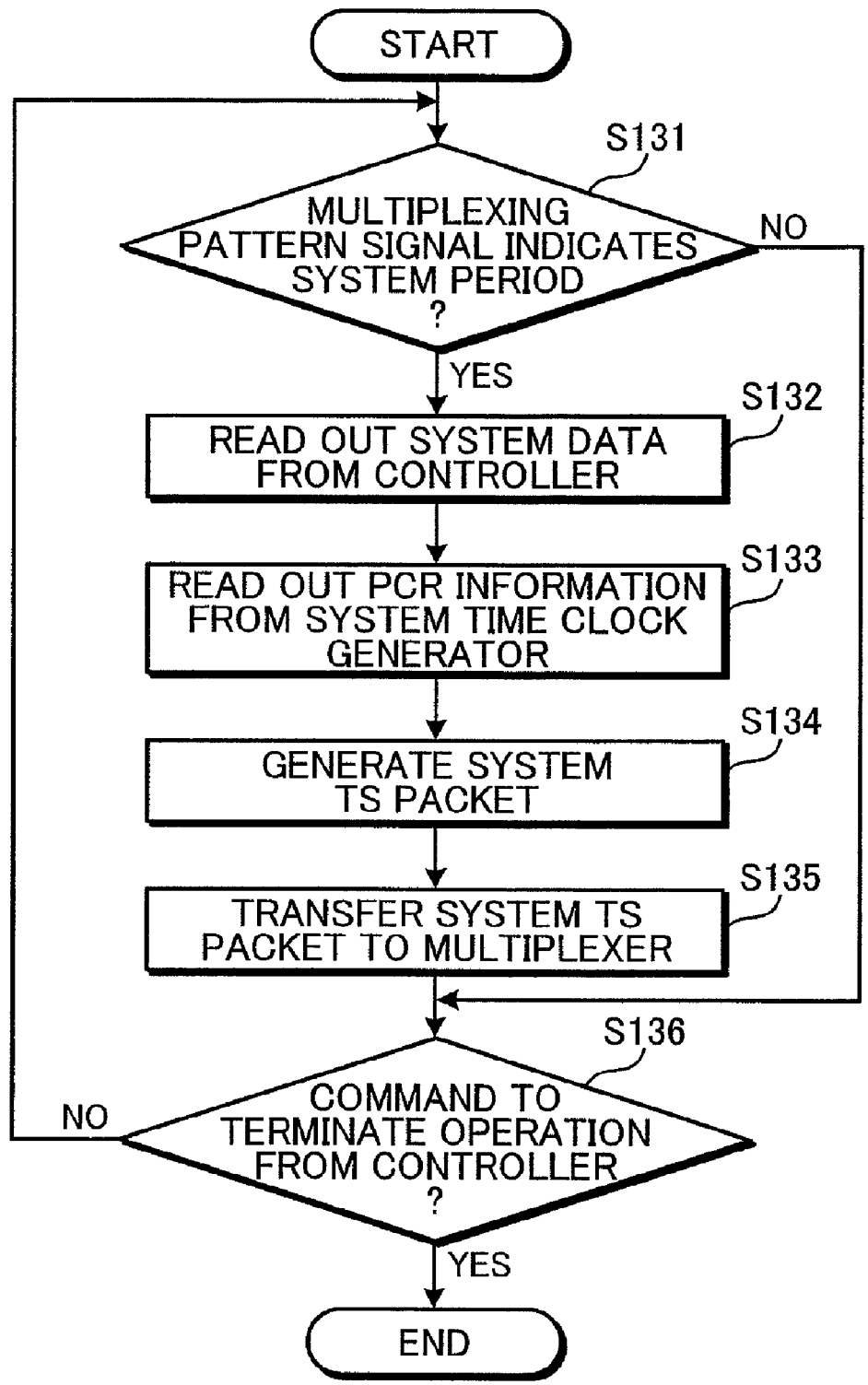
FIG. 21 is a flowchart showing an operation to be performed by a system packet generator in the multiplexing device of the first embodiment.

Next, the operation to be performed by the system packet generator 49 in Step S27 in FIG. 11 is described. FIG. 21 is a flowchart showing the operation to be performed by the system packet generator 49 in the multiplexing device of the first embodiment. The system packet generator 49 performs the operation shown in FIG. 21 in response to start of an initial operation thereof.

First, the system packet generator 49 judges whether the multiplexing pattern signal P indicates a system period (Step S131). If it is judged that the multiplexing pattern signal P does not indicate a system period (NO in Step S131), the routine of the system packet generator 49 proceeds to Step S136, which is described in the following.

If, on the other hand, it is judged that the multiplexing pattern signal P indicates a system period (YES in Step S131), the system packet generator 49 reads out system data to be transmitted in a succeeding operation, which is notified from the controller 59 (Step S132). Then, the system packet generator 49 reads out PCR information from the system time clock generator 55 (Step S133). Then, the system packet generator 49 stores the readout information in a payload of a TS packet, and generates a system TS packet containing the information relating to system data (Step S134).

Thereafter, the system packet generator 49 transfers the system TS packet to the multiplexer 51 (Step S135). Then, the system packet generator 49 judges whether a command to terminate a system packet generating operation has been issued from the controller 59 (Step S136). If it is judged that a command to terminate a system packet generating operation has not been issued (NO in Step S136), the routine of the system packet generator 49 returns to Step S131. If, on the other hand, it is judged that a command to terminate a system packet generating operation has been issued (Step S136), the system packet generator 49 terminates the system packet generating operation.

By performing the aforementioned operations shown in FIGS. 9 through 13, and 15 through 21, a multiplexing pattern signal corresponding to a multiplexing pattern indicating the order of types of data to be multiplexed is generated. Then, a video remaining size i.e. the size of multiplexable data of a video elementary stream stored in the video buffer is calculated, and video remaining size information indicating the calculated video remaining size is outputted. Likewise, an audio remaining size i.e. the size of multiplexable data of an audio elementary stream stored in the audio buffer is calculated, and audio remaining size information indicating the calculated audio remaining size is outputted. In performing the above operations, the video remaining size and the audio remaining size are calculated, based on the data size per access unit, the video transmission size i.e. the size of transmission data contained in a video TS packet, and the audio transmission size i.e. the size of transmission data contained in an audio TS packet.

Then, data of a predetermined size is read out, as transmission data, from the elementary stream stored in the video buffer, based on the multiplexing pattern signal and the video remaining size information, to generate a video TS packet containing the readout transmission data. Likewise, data of a predetermined size is read out, as transmission data, from the elementary stream stored in the audio buffer, based on the multiplexing pattern signal and the audio remaining size information, to generate an audio TS packet containing the readout transmission data. In performing the above operations, a multiplex packet is generated, if the data type indicated by the multiplexing pattern signal shows matching, and the remaining size is equal to or larger than the transmission size. Then, the video TS packet and the audio TS packet are multiplexed into a transport stream in the order of generation.

As described above, in the multiplexing device of the embodiment, the video packet generator 32, the audio packet generator 42, and the system packet generator 49 are each operable to generate a TS packet in accordance with the multiplexing pattern signal P from the multiplexing pattern generator 56. Accordingly, properly setting a ratio of the individual data i.e. video data, audio data, and system data in a multiplexing pattern enables to generate TS packets of the respective elementary streams depending on the ratio represented by the multiplexing pattern. This is advantageous in preventing overflow of a decoder buffer.

The video packet generator 32 and the audio packet generator 42 are each operable to generate a TS packet, in the case where a remaining size to be obtained based on a computation result of the video remaining size calculator 33 or the audio remaining size calculator 43 is equal to or larger than a size required for generating a TS packet; and are operable to suspend transmitting a TS packet, or generate a TS packet wherein an empty area is filled with a stuffing byte, in the case where the remaining size is smaller than the size of the empty area of a payload of a TS packet to be generated. Accordingly, even in the case where the amount of encoded data per access unit is extremely small, there can be prevented underflow of a decoder buffer resulting from a decrease in the amount of encoded data, by suspending transmission of a TS packet or transmitting a null packet.

The multiplexing device of the embodiment is advantageous in performing a multiplexing operation with a simplified arrangement, while preventing breakdown of a decoder buffer, even if encoded data generated by an encoder is variable length encoded data generated at a variable bit rate. Similarly to the multiplexing device of the embodiment, a multiplexing method of the embodiment is advantageous in performing a multiplexing operation with a simplified arrangement, while preventing breakdown of a decoder buffer, even if encoded data generated by an encoder is variable length encoded data generated at a variable bit rate.

Whereas an operating frequency required for performing a multiplexing operation by a conventional multiplexing device is e.g. 54 MHz, an operating frequency required for performing a multiplexing operation by the multiplexing device of the first embodiment can be reduced to e.g. 18 MHz. Thus, the amount of data to be subjected to a multiplexing operation can be reduced to one-third, as compared with the conventional arrangement. This enables to shorten a time required for a multiplexing operation.

Furthermore, the ratio of a multiplexing operation with respect to an overall operation (the operating frequency for the overall operation is e.g. 243 MHz) in a recording and reproducing device loaded with a multiplexing device, can be reduced from 22% to 7%. This enables to simultaneously record and simultaneously reproduce multiple programs. The above arrangement also enables to suppress an increase in the throughput resulting from an increase in the throughput rate by high-definition image formation.

Second Embodiment

Figure 22:
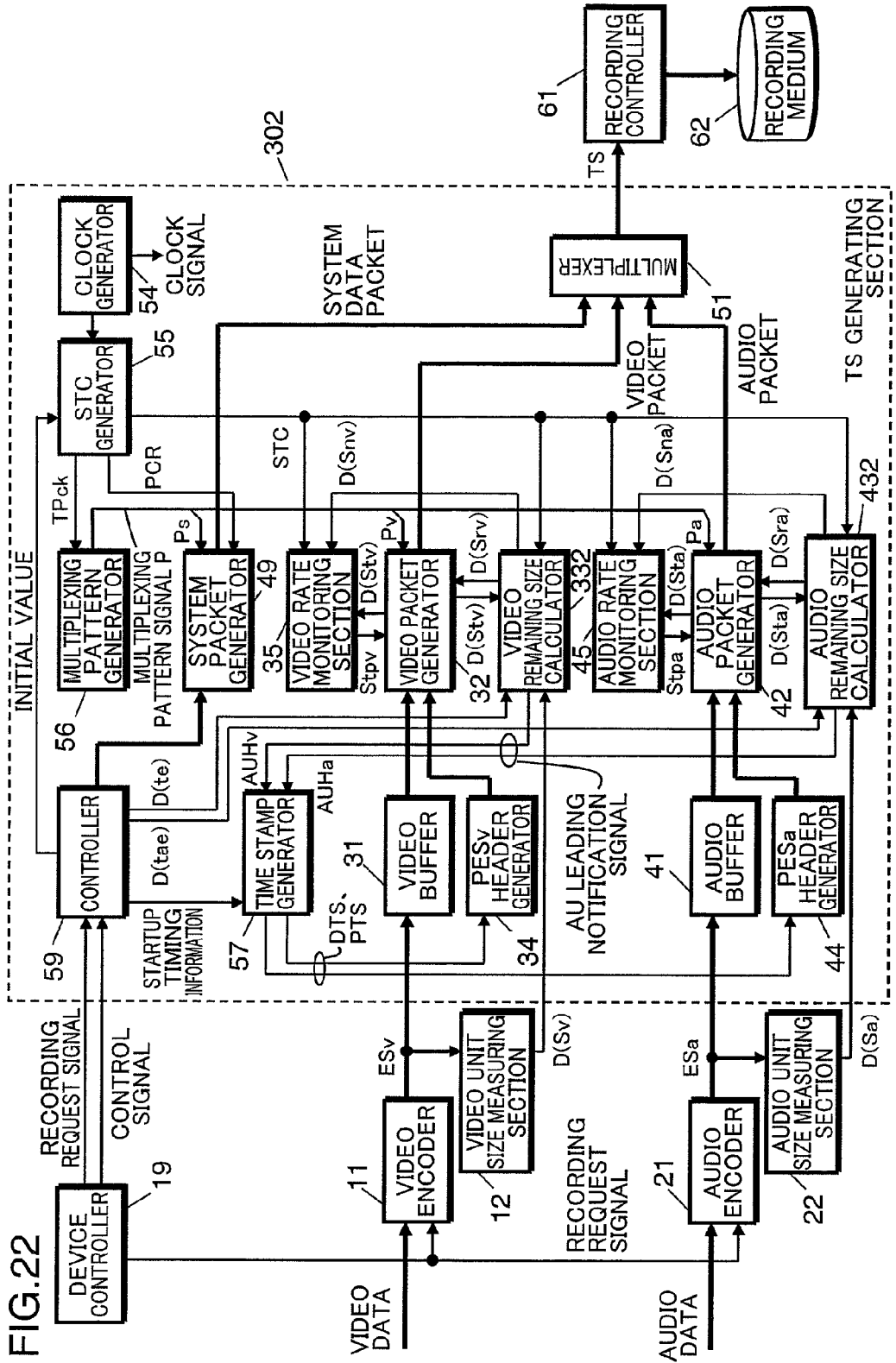
FIG. 22 is a block diagram showing an arrangement of a multiplexing device in accordance with a second embodiment of the invention.
Figure 23:
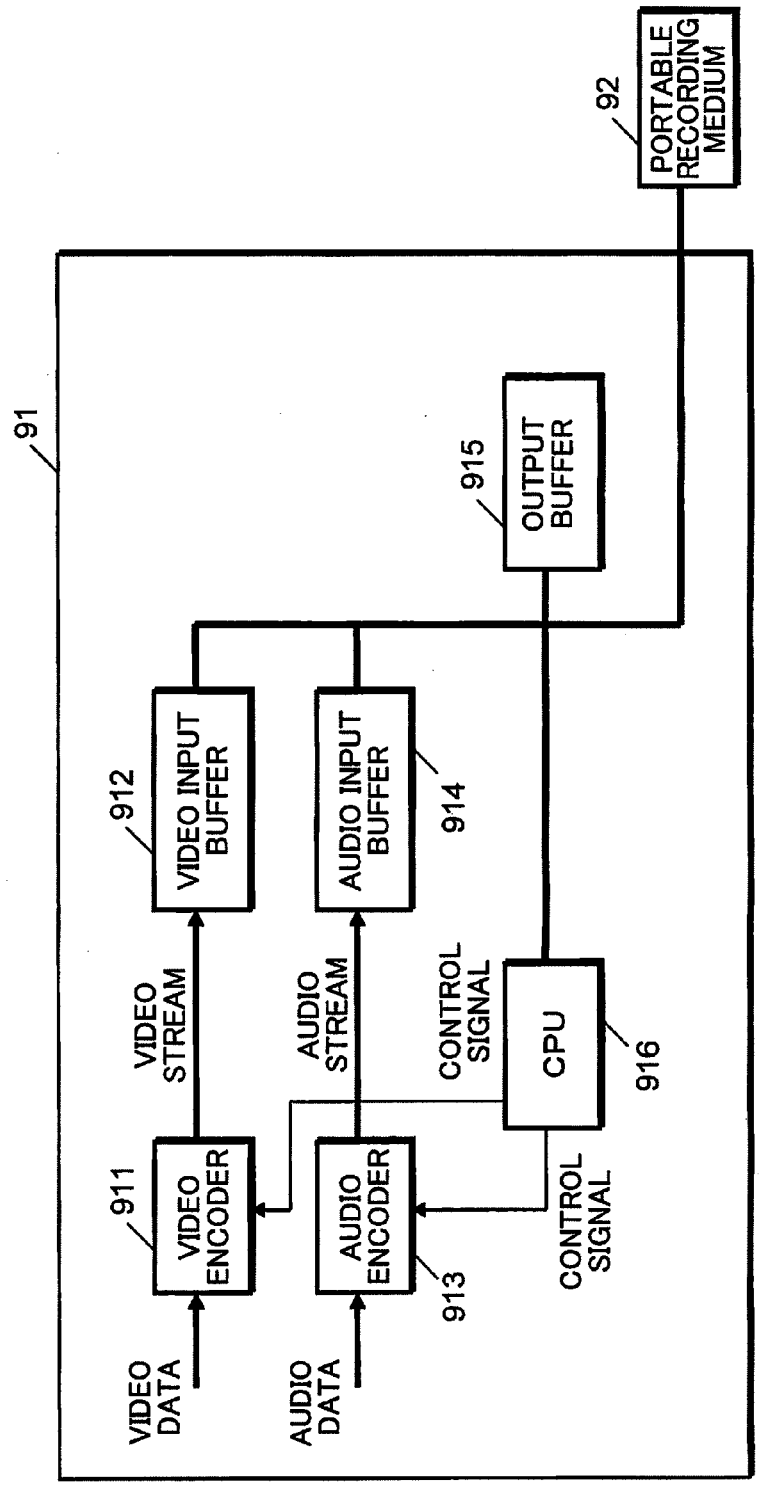
FIG. 23 is a block diagram showing an arrangement of a conventional multiplexing device.
Figure 24:
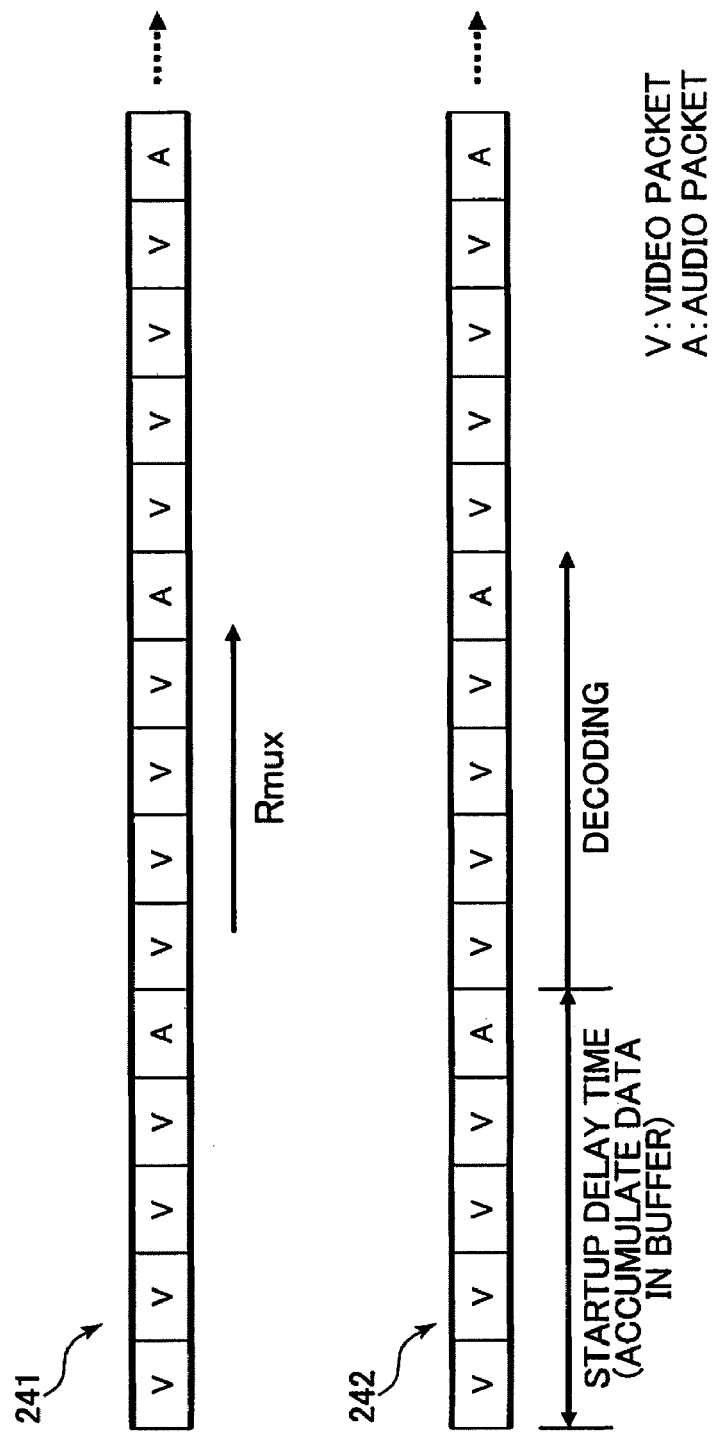
FIG. 24 is a conceptual diagram showing a method for allocating video packets and audio packets in the conventional multiplexing device.

FIG. 22 is a block diagram showing an arrangement of a multiplexing device in accordance with the second embodiment of the invention. As shown in FIG. 22, similarly to the first embodiment, the multiplexing device of the second embodiment is a multiplexing device for subjecting video data and audio data to compression encoding, and multiplexing video encoded data and audio encoded data generated by the compression encoding into a transport stream, as a multiplexed stream, to record the transport stream in a recording medium.

Similarly to the first embodiment, the multiplexing device of the second embodiment can be applied to encoded data generated based on MPEG-2 or MPEG-4 AVC format, as a known compression encoding format. In particular, as shown in FIG. 22, the second embodiment is different from the first embodiment in that a TS generating section 302 further includes a video rate monitoring section 35 and an audio rate monitoring section 45.

A video remaining size calculator 332 is operable to generate required video transmission size information indicating the required size of video encoded data to be transmitted per lapse of time, and notify the video rate monitoring section 35 of the required video transmission size information. An audio remaining size calculator 432 is operable to generate required audio transmission size information indicating the required size of audio encoded data to be transmitted per lapse of time, and notify the audio rate monitoring section 45 of the required audio transmission size information.

Elements in FIG. 22 having the same reference numerals as those in FIG. 1 have the same arrangement as the corresponding ones in FIG. 1, and detailed description thereof is omitted herein. Similarly to the first embodiment, in the second embodiment, a video elementary stream ESv to be outputted from a video encoder 11 is an elementary stream having a variable bit rate, which is composed of variable length encoded data whose maximum bit rate is defined.

Referring to FIG. 22, the video rate monitoring section 35 is operable to calculate a sum of sizes of transmission data generated by a video packet generator 32; and notify the video packet generator 32 of a transmission suspending signal indicating a request to suspend generating a video TS packet, if the sum is over a size defined in a condition that an elementary stream is outputted at a required maximum bit rate. Upon receiving the transmission suspending signal, the video packet generator 32 is operable to suspend generating a video TS packet, even if a data type indicated by a multiplexing pattern signal P shows matching, and a video remaining size is equal to or larger than a video transmission size.

Similarly to the video rate monitoring section 35, the audio rate monitoring section 45 is operable to calculate a sum of sizes of transmission data generated by an audio packet generator 42; and notify the audio packet generator 42 of a transmission suspending signal indicating a request to suspend generating an audio TS packet, if the sum is over a size defined in a condition that an elementary stream is outputted at a required maximum bit rate. Upon receiving the transmission suspending signal, the audio packet generator 42 is operable to suspend generating an audio TS packet, even if a data type indicated by a multiplexing pattern signal P shows matching, and an audio remaining size is equal to or larger than an audio transmission size.

Providing the video rate monitoring section 35 and the audio rate monitoring section 45 having the above configuration enables to suspend generating a TS packet by the video packet generator 32, and temporarily suspend transmitting video encoded data, if a generated bit rate of generated encoded data is over a predetermined maximum bit rate. This enables to prevent a likelihood that data may be excessively transmitted, thereby preventing a likelihood that a decoder buffer may cause overflow. In the following, an arrangement and an operation of the multiplexing device of the second embodiment are described in detail, primarily based on the video rate monitoring section 35 and the audio rate monitoring section 45.

In the second embodiment, the video remaining size calculator 332 is operable to calculate a required video transmission size Snv i.e. the required size of video encoded data to be transmitted per lapse of time, using a lapse of time obtained based on STC information and actual video size information D(Sv); and notify the video rate monitoring section 35 of the required video transmission size Snv, as required video transmission size information D(Snv).

As shown in FIG. 22, the video rate monitoring section 35 is notified of STC information from a system time clock generator 55; and is notified, from the video packet generator 32, of the data size of video encoded data used in generating a TS packet i.e. video transmission size information D(Stv) indicating a video transmission size Sty.

The video rate monitoring section 35 is operable to calculate a sum of sizes of transmission data generated by the video packet generator 32, utilizing the video transmission size information D(Stv); judge whether the sum is over a size defined in a condition that an elementary stream is outputted at a required maximum bit rate, i.e., the required video transmission size Snv indicated by the notified required video transmission size information D(Snv); and notify the video packet generator 32 of a video transmission suspending signal Stpv, if it is judged that the sum is over the required video transmission size Snv. In other words, the video rate monitoring section 35 is operable to perform the following operation to generate a video transmission suspending signal Stpv.

First, the video rate monitoring section 35 is operable to successively sum up the video transmission size Stv indicated by the video transmission size information D(Stv), each time the video transmission size information D(Stv) is notified from the video packet generator 32 to calculate a sum of the video transmission sizes. Then, the video rate monitoring section 35 is operable to subtract the sum from the required video transmission size Snv. Then, the video rate monitoring section 35 is operable to successively sum up the subtraction result, and judge whether the summation result is over a predetermined upper limit. If it is judged that the summation result is over the predetermined upper limit, the video rate monitoring section 35 is operable to output, to the video packet generator 32, a video transmission suspending signal Stpv indicating a request to suspend generating a TS packet containing video encoded data. The video packet generator 32 is operable to suspend generating a TS packet, upon receiving the video transmission suspending signal Stpv indicating a request to suspend generating a TS packet.

As described above, the video monitoring section 35 is operable to judge whether the sum of video transmission sizes is over the size defined in the condition that an elementary stream is outputted at the required maximum bit rate, suspend generating a TS packet by the video packet generator 32, and temporarily suspend transmitting video encoded data, if it is judged that the sum of video transmission sizes is over the size defined in the condition that an elementary stream is outputted at the required maximum bit rate. This arrangement enables to prevent a likelihood that data may be excessively transmitted, thereby preventing a likelihood that a decoder buffer may cause overflow.

In the second embodiment, similarly to the video remaining size calculator 332, the audio remaining size calculator 432 is operable to calculate a required audio transmission size Sna i.e. the required size of audio encoded data to be transmitted per lapse of time, using a lapse of time obtained based on STC information and actual audio size information D(Sa); and notify the audio rate monitoring section 45 of the required audio transmission size Sna, as required audio transmission size information D(Sna).

As shown in FIG. 22, the audio rate monitoring section 45 is notified of STC information from the system time clock generator 55; and is notified, from the audio packet generator 42, of the data size of audio encoded data used in generating a TS packet i.e. audio transmission size information D(Sta) indicating an audio transmission size Sta.

The audio rate monitoring section 45 is operable to calculate a sum of sizes of transmission data generated by the audio packet generator 42, utilizing the audio transmission size information D(Stv); judge whether the sum is over a size defined in a condition that an elementary stream is outputted at a required maximum bit rate, in other words, the required audio transmission size Sna indicated by the notified required audio transmission size information D(Sna); and notify the audio packet generator 42 of an audio transmission suspending signal Stpa, if it is judged that the sum is over the required audio transmission size Sna. In other words, the audio rate monitoring section 45 is operable to perform the following operation to generate an audio transmission suspending signal Stpa.

First, the audio rate monitoring section 45 is operable to successively sum up the audio transmission size Sta indicated by the audio transmission size information D(Sta), each time the audio transmission size information D(Sta) is notified from the audio packet generator 42 to calculate a sum of the audio transmission sizes. Then, the audio rate monitoring section 45 is operable to subtract the sum from the required audio transmission size Sna. Then, the audio rate monitoring section 45 is operable to successively sum up the subtraction result, and judge whether the summation result is over a predetermined upper limit. If it is judged that the summation result is over the predetermined upper limit, the audio rate monitoring section 45 is operable to output, to the audio packet generator 42, an audio transmission suspending signal Stpa indicating a request to suspend generating a TS packet containing audio encoded data. The audio packet generator 42 is operable to suspend generating a TS packet, upon receiving the audio transmission suspending signal Stpa indicating a request to suspend generating a TS packet.

As described above, similarly to the video rate monitoring section 35, the audio monitoring section 45 is operable to judge whether the sum of audio transmission sizes is over the size defined in the condition that an elementary stream is outputted at the required maximum bit rate, suspend generating a TS packet by the audio packet generator 42, and temporarily suspend transmitting audio encoded data, if it is judged that the sum of audio transmission sizes is over the size defined in the condition that an elementary stream is outputted at the required maximum bit rate. This arrangement enables to prevent a likelihood that data may be excessively transmitted, thereby preventing a likelihood that a decoder buffer may cause overflow.

Alternatively, in the case where the video remaining size calculated by the video remaining size calculator 332, and the audio remaining size calculated by the audio remaining size calculator 432 become 0, respectively, the video rate monitoring section 35 and the audio rate monitoring section 45 may clear the sum of transmission sizes and the size defined in the condition that an elementary video stream is outputted at the required maximum bit rate, and start monitoring the video bit rate and the audio bit rate, respectively. Further alternatively, the sum of the sizes may include the data size of stuffing data.

In the first and the second embodiments, the audio encoder 21 is operable to encode audio data so as to output audio encoded data having a fixed bit length per access unit. The invention may be applied to an arrangement that the audio encoder 21 is operable to encode audio data so as to output audio encoded data composed of variable length encoded data per access unit.

Specifically, an audio elementary stream ESa to be outputted from the audio encoder 21 may be an elementary stream having a variable bit rate, which is composed of variable length encoded data whose maximum bit rate is defined. In the modification, a timing delayed from an audio generation start timing "tae" by a startup delay time including an audio buffer delay time corresponding to a time required for filing an audio decoder buffer at a predetermined maximum bit rate may be defined as an audio presentation start timing. Then, the audio packet generator 42 may be operable to generate a multiplex packet containing data including an audio PES header storing PTSa indicating the audio presentation start timing, and leading data of an audio access unit, at the audio generation start timing "tae". Thereafter, the audio packet generator 42 is operable to generate a multiplex packet containing data including an audio PES header storing PTSa delayed from the audio presentation timing by an audio frame cycle Tafr, and leading data of an audio access unit, each time the multiplex packet containing data including leading data of an audio access unit is generated.

Further alternatively, the startup delay time may be a time obtained by summing up an audio buffer delay time, and a maximum delay time by a multiplexing operation. Further alternatively, the audio remaining size calculator 43, 432 may be configured to sum up the data size of an audio access unit and the audio remaining size, at the audio generation start timing "tae", and at timings delayed from the audio generation start timing "tae" with an interval of the audio frame cycle Tafr.

The invention has been described based on the foregoing embodiments, but the invention is not limited to the foregoing embodiments. The invention may include the following modifications.

(1) The multiplexing device is e.g. a computer system configured of a microprocessor, an ROM (Read Only Memory), an RAM (Random Access Memory), a hard disk unit, a display unit, a keyboard, and a mouse. A computer program is stored in the RAM or the hard disk unit. A function of each of the elements in the multiplexing device is executed when the microprocessor is operated in accordance with the computer program. The computer program is a program composed of a combination of operation codes each indicating a command to a computer in order to execute a predetermined function.

(2) A part or all of the elements constituting the multiplexing device may be configured into a system LSI (Large Scale Integration), which is a large-scale integrated circuit. The system LSI is an ultra multi-functional LSI fabricated by integrating multiple component units on a single chip. Specifically, the system LSI is a computer system configured of a microprocessor, an ROM, and an RAM. A computer program is stored in the RAM. A function of the system LSI is executed when the microprocessor is operated in accordance with the computer program.

Each of the elements constituting the multiplexing device may be configured into a single chip element; or a part or all of the elements constituting the multiplexing device may be configured into a single chip element.

In the specification, a system LSI is used. Alternatively, an IC (Integrated Circuit), an LSI, a super LSI, or an ultra LSI may be used depending on a degree of integration. The approach of fabricating the elements into an integrated circuit is not limited to an LSI technology, but a dedicated circuit or a multi-purpose processor may be used. Further alternatively, after an LSI chip is fabricated, a programmable FPGA (Field Programmable Gate Array) or a reconfigurable processor capable of reconfiguring connection or setting of circuit cells in the LSI chip may be used.

If an integration circuit technology substantially equivalent to the LSI technology is developed in the future by the progress of semiconductor technology or by another technology derived from semiconductor technology, it is needless to say that functional blocks may be integrated, using the novel technology. It is also possible to perform integration, using the biotechnology.

(3) A part or all of the elements constituting the multiplexing device may be configured of an IC card detachably mountable to a device, or a standalone module. The IC card or the module is a computer system configured of a microprocessor, an ROM, and an RAM. The IC card or the module may include the aforementioned ultra multi-functional LSI. A function of the IC card or the module is executed when the microprocessor is operated in accordance with a computer program. The IC card or the module may have a tamper resistance.

(4) The invention may be directed to multiplexing methods substantially equivalent to the multiplexing devices described in the first and the second embodiments. Further alternatively, the invention may be directed to a computer program for executing the multiplexing methods using a computer, or may be directed to a digital signal composed of the computer program.

Further alternatively, the invention may be directed to a computer-readable recording medium recorded with the computer program or the digital signal e.g. a flexible disk, a hard disk, a CD-ROM, an MO, a DVD, a DVD-ROM, a DVD-RAM, a BD (Blu-ray Disc), and a semiconductor memory. Further alternatively, the invention may be directed to the digital signal recorded in the recording media.

Further alternatively, the invention may be directed to a transmitting medium for transmitting the computer program or the digital signal via an electronic communications line, a wireless or a wired communications line, a network such as the Internet, or data broadcasting.

Further alternatively, the invention may be directed to a computer system equipped with a microprocessor and a memory, wherein the memory stores the computer program, and the microprocessor is operated in accordance with the computer program.

Further alternatively, the invention may be directed to an independent computer system operable by transferring the computer program or the digital signal recorded in the recording media, or by transferring the computer program or the digital signal via a network or a like medium.

(5) One or more of the embodiments and the modifications may be combined according to needs.

The above embodiments mainly embrace features of the invention having the following arrangements.

A multiplexing device according to an aspect of the invention is a multiplexing device for multiplexing elementary streams, which have respective content types and are respectively composed of encoded data generated per access unit, in the unit of multiplex packets, to generate a multiplexed stream composed of the multiplex packets. The multiplexing device includes: a multiplexing pattern generating section for generating a multiplexing pattern signal corresponding to a multiplexing pattern indicating an order of types of data to be multiplexed; a buffer section for temporarily storing the elementary stream; a remaining size calculating section for calculating, as a remaining size, a size of multiplexable data of the elementary stream stored in the buffer section to output remaining size information indicating the remaining size; a packet generating section for reading out, as transmission data, data of a predetermined size from the elementary stream stored in the buffer section, based on the multiplexing pattern signal generated by the multiplexing pattern generating section, and the remaining size information outputted from the remaining size calculating section, to generate the multiplex packet containing the readout transmission data; and a multiplexing section for multiplexing the multiplex packets generated by the packet generating section in an order of generation to generate the multiplexed stream, wherein the remaining size calculating section is operable to calculate the remaining size, based on a data size per access unit, and the size of the transmission data contained in the multiplex packet generated by the packet generating section, as a transmission size, and the packet generating section is operable to generate the multiplex packet, if the data type indicated by the multiplexing pattern signal shows matching, and the remaining size is equal to or larger than the transmission size.

In the above arrangement, the multiplexing pattern generating section is operable to generate a multiplexing pattern signal corresponding to a multiplexing pattern indicating an order of types of data to be multiplexed. The buffer section is operable to temporarily store the elementary stream. The remaining size calculating section is operable to calculate, as a remaining size, a size of multiplexable data of the elementary stream stored in the buffer section to output remaining size information indicating the remaining size. The packet generating section is operable to read out, as transmission data, data of a predetermined size from the elementary stream stored in the buffer section, based on the multiplexing pattern signal and the remaining size information, to generate the multiplex packet containing the readout transmission data. Thereafter, the multiplexing section is operable to multiplex the multiplex packets generated by the packet generating section in an order of generation to generate the multiplexed stream. The remaining size calculating section is operable to calculate the remaining size, based on a data size per access unit, and a size of the transmission data contained in the multiplex packet generated by the packet generating section, as a transmission size. The packet generating section is operable to generate the multiplex packet, if the data type indicated by the multiplexing pattern signal shows matching, and the remaining size is equal to or larger than the transmission size.

According to the aspect of the invention, if the data type indicated by the multiplexing pattern signal shows matching, and the remaining size is equal to or larger than the transmission size, a multiplex packet is generated. Accordingly, even if encoded data generated by an encoder is variable length encoded data generated at a variable bit rate, breakdown of a decoder buffer can be prevented. Further, the remaining size is calculated, based on the data size per access unit, and the transmission size of transmission data contained in the multiplex packet, and a multiplexing operation is performed by simulation of an encoder buffer. Accordingly, as compared with a conventional multiplexing operation to be performed by simulation of a decoder buffer, a time required for a multiplexing operation can be shortened.

In the multiplexing device, preferably, the multiplexing pattern may be a pattern that a period when the multiplex packet is generated is cyclically repeated at a predetermined ratio, depending on the type of data to be contained in the multiplex packet.

In the above arrangement, the multiplex packet composed of the elementary stream can be generated in accordance with the multiplexing pattern that the period when the multiplex packet is generated is cyclically repeated at the predetermined ratio, depending on the type of data to be contained in the multiplex packet. This enables to prevent underflow of a decoder buffer.

In the multiplexing device, preferably, the multiplexing pattern may be defined in such a manner that a bit rate for use in a multiplexing operation is equal to or larger than a maximum bit rate required depending on the type of data to be contained in the multiplex packet.

In the above arrangement, the multiplexing pattern is defined in such a manner that a bit rate for use in a multiplexing operation is equal to or larger than a maximum bit rate required depending on the type of data to be contained in the multiplex packet. This enables to prevent underflow of a decoder buffer, in the case where a maximum transmittable bit rate is larger than the maximum bit rate required depending on the type of data to be contained in the multiplex packet.

In the multiplexing device, preferably, the remaining size calculating section may be operable to calculate the remaining size by performing a computation of summing up the data size per access unit at an interval of an access unit, and subtracting the transmission size, each time the multiplex packet containing the transmission data is generated by the packet generating section.

In the above arrangement, the remaining size is calculated by performing a computation of summing up the data size per access unit at an interval of an access unit, and subtracting the transmission size, each time the multiplex packet containing the transmission data is generated. This enables to properly calculate the size of multiplexable data of the elementary stream stored in the buffer section, as the remaining size.

In the multiplexing device, preferably, the remaining size calculating section may be operable to calculate the remaining size per access unit by performing the computation. In this arrangement, the remaining size per access unit is calculated by performing the computation of summing up the data size per access unit at an interval of an access unit, and subtracting the transmission size, each time the multiplex packet containing the transmission data is generated. This enables to properly calculate the size of multiplexable data of the elementary stream stored in the buffer section per access unit, as the remaining size.

In the multiplexing device, assuming that a point of time when the remaining size calculating section starts summing up the data size per access unit is a generation start timing, and a point of time delayed from the generation start timing by a startup delay time corresponding to a time required for filling a decoder buffer at a predetermined maximum bit rate is a decoding start timing, preferably, the packet generating section may be operable to generate a multiplex packet containing a PES header containing a decoding time stamp indicating the decoding start timing, and leading data of the access unit, depending on the generation start timing, and the multiplexing pattern corresponding to the multiplexing pattern signal; and generate a multiplex packet containing a PES header containing a decoding time stamp delayed from the decoding start timing with the interval of the access unit, and leading data of the access unit, each time the multiplex packet containing the leading data of the access unit is generated.

In the above arrangement, a point of time when the remaining size calculating section starts summing up the data size per access unit is defined as a generation start timing, and a point of time delayed from the generation start timing by a startup delay time corresponding to a time required for filling a decoder buffer at a predetermined maximum bit rate is defined as a decoding start timing. The packet generating section is operable to generate a multiplex packet containing a PES header containing a decoding time stamp indicating the decoding start timing, and leading data of the access unit, depending on the generation start timing, and the multiplexing pattern corresponding to the multiplexing pattern signal; and generate a multiplex packet containing a PES header containing a decoding time stamp delayed from the decoding start timing with the interval of the access unit, and leading data of the access unit, each time the multiplex packet containing the leading data of the access unit is generated.

As described above, the point of time when the remaining size calculating section starts summing up the data size per access unit is defined as the generation start timing, and the point of time delayed from the generation start timing by the startup delay time corresponding to the time required for filling the decoder buffer at the predetermined maximum bit rate is defined as the decoding start timing. The above arrangement enables to fill the decoder buffer before the timing when a decoder starts a decoding operation in accordance with the decoding time stamp.

In the multiplexing device, preferably, the startup delay time may be a time obtained by summing up the time required for filing the decoder buffer at the predetermined maximum bit rate, and a maximum delay time by the multiplexing operation.

In the above arrangement, the startup delay time is a time obtained by summing up the time required for filing the decoder buffer at the predetermined maximum bit rate, and a maximum delay time by the multiplexing operation. The above arrangement enables to fill the decoder buffer before the timing when a decoder starts a decoding operation in accordance with the decoding time stamp.

In the multiplexing device, preferably, the remaining size calculating section may be operable to sum up the data size per access unit and the remaining size at the generation start timing and at timings delayed from the generation start timing with the interval of the access unit.

In the above arrangement, the data size per access unit and the remaining size can be summed up at the generation start timing and at the timings delayed from the generation start timing with the interval of the access unit.

Preferably, the multiplexing device may further comprise: a rate monitoring section for calculating a sum of sizes of the transmission data generated by the packet generating section, and notifying the packet generating section of a transmission suspending signal indicating a request to suspend generating a multiplex packet, if the sum is over a size of transmission data defined in a condition that the elementary stream is outputted at a required maximum bit rate, wherein the packet generating section is operable to generate the multiplex packet, if the data type indicated by the multiplexing pattern signal shows matching, the remaining size is equal to or larger than the transmission size, and the transmission suspending signal is not issued from the rate monitoring section.

In the above arrangement, the rate monitoring section is operable to calculate a sum of sizes of the transmission data, and issue a transmission suspending signal indicating a request to suspend generating a multiplex packet, if the sum is over a size of transmission data defined in a condition that the elementary stream is outputted at a required maximum bit rate. The packet generating section is operable to generate the multiplex packet, if the data type indicated by the multiplexing pattern signal shows matching, the remaining size is equal to or larger than the transmission size, and the transmission suspending signal is not issued from the rate monitoring section.

As described above, if the sum is over the size of transmission data defined in the condition that the elementary stream is outputted at the required maximum bit rate, generation of a multiplex packet is suspended, and transmission of encoded data is temporarily suspended. This enables to prevent a likelihood that data may be excessively transmitted.

In the multiplexing device, preferably, the rate monitoring section may be operable to clear the sum, and the size of transmission data defined in the condition that the elementary stream is outputted at the required maximum bit rate, if the remaining size calculated by the remaining size calculating section is 0.

In the above arrangement, if the remaining size is 0, it is possible to clear the sum, and the size of transmission data defined in the condition that the elementary stream is outputted at the required maximum bit rate.

In the multiplexing device, preferably, the packet generating section may be operable to generate the multiplex packet containing stuffing data for filling a data shortage area, if the remaining size calculated by the remaining size calculating section is smaller than the transmission size. This arrangement enables to generate the multiplex packet containing the stuffing data for filling the data shortage area, if the remaining size is smaller than the transmission size.

In the multiplexing device, preferably, the buffer section may include a video buffer for temporarily storing a video elementary stream, and an audio buffer for temporarily storing an audio elementary stream. The remaining size calculating section may include a video remaining size calculator for calculating, as a video remaining size, a size of multiplexable data of the video elementary stream stored in the video buffer to output video remaining size information indicating the video remaining size; and an audio remaining size calculator for calculating, as an audio remaining size, a size of multiplexable data of the audio elementary stream stored in the audio buffer to output audio remaining size information indicating the audio remaining size. The packet generating section may include a video packet generator for reading out, as transmission data, data of a predetermined size from the video elementary stream stored in the video buffer, based on the multiplexing pattern signal generated by the multiplexing pattern generating section, and the video remaining size information outputted from the video remaining size calculator, to generate the multiplex packet containing the readout transmission data; and an audio packet generator for reading out, as transmission data, data of a predetermined size from the audio elementary stream stored in the audio buffer, based on the multiplexing pattern signal generated by the multiplexing pattern generating section, and the audio remaining size information outputted from the audio remaining size calculator, to generate the multiplex packet containing the readout transmission data.

In the above arrangement, a video elementary stream is temporarily stored in the video buffer, and an audio elementary stream is temporarily stored in the audio buffer. The video remaining size calculator is operable to calculate, as a video remaining size, a size of multiplexable data of the video elementary stream stored in the video buffer to output video remaining size information indicating the video remaining size. The audio remaining size calculator is operable to calculate, as an audio remaining size, a size of multiplexable data of the audio elementary stream stored in the audio buffer to output audio remaining size information indicating the audio remaining size. The video packet generator is operable to read out, as transmission data, data of a predetermined size from the video elementary stream stored in the video buffer, based on the multiplexing pattern signal and the video remaining size information, to generate the multiplex packet containing the readout transmission data. The audio packet generator is operable to read out, as transmission data, data of a predetermined size from the audio elementary stream stored in the audio buffer, based on the multiplexing pattern signal and the audio remaining size information, to generate the multiplex packet containing the readout transmission data.

Accordingly, if the data type indicated by the multiplexing pattern signal is video, and the video remaining size is equal to or larger than the transmission size, the multiplex packet is generated; and if the data type indicated by the multiplexing pattern signal is audio, and the audio remaining size is equal to or larger than the transmission size, the multiplex packet is generated. This arrangement enables to prevent breakdown of a video decoder buffer and an audio decoder buffer, even if encoded data generated by an encoder is variable length encoded data generated at a variable bit rate.

In the multiplexing device, preferably, the packet generating section may further include a system packet generator for generating the multiplex packet containing system data including information relating to the multiplexed stream to be generated, based on the multiplexing pattern signal generated by the multiplexing pattern generating section.

In the above arrangement, the system packet generator is operable to generate the multiplex packet containing system data including information relating to the multiplexed stream to be generated, based on the multiplexing pattern signal. This enables to generate the multiplex packet containing the system data including the information relating to the multiplexed stream to be generated.

In the multiplexing device, preferably, the multiplexing pattern may be a pattern that a video period when the multiplex packet corresponding to the video elementary stream is generated, and an audio period when the multiplex packet corresponding to the audio elementary stream is generated, are cyclically repeated at a predetermined ratio, and the audio period may be constituted of an audio transmission period when the multiplex packet corresponding to the audio elementary stream is generated, and a system period when the multiplex packet corresponding to the system data is generated.

In the above arrangement, the multiplexing pattern is the pattern that a video period when the multiplex packet corresponding to the video elementary stream is generated, and an audio period when the multiplex packet corresponding to the audio elementary stream is generated, are cyclically repeated at a predetermined ratio. Further, since the audio period is constituted of an audio transmission period when the multiplex packet corresponding to the audio elementary stream is generated, and a system period when the multiplex packet corresponding to the system data is generated, the audio elementary stream and the system data can be multiplexed at a predetermined cycle.

In the multiplexing device, preferably, the video elementary stream may be an elementary stream having a variable bit rate, the elementary stream being composed of variable length encoded data whose maximum bit rate is defined.

The above arrangement enables to prevent breakdown of a decoder buffer, even if encoded data generated by an encoder is a video elementary stream composed of variable length encoded data generated at a variable bit rate.

In the multiplexing device, assuming that a point of time when the video remaining size calculator starts summing up the data size per video access unit is a video generation start timing, and a point of time delayed from the video generation start timing by a startup delay time including a VBV delay time corresponding to a time required for filling a video decoder buffer at a predetermined maximum bit rate is a video decoding start timing, preferably, the video packet generator may be operable to generate a multiplex packet containing a video PES header containing a video decoding time stamp indicating the video decoding start timing, and leading data of a video access unit at the video generation start timing; and generate a multiplex packet containing a video PES header containing a video decoding time stamp delayed from the video decoding start timing with an interval of the video access unit, and leading data of the video access unit, each time the multiplex packet containing the leading data of the video access unit is generated.

In the above arrangement, a point of time when the video remaining size calculator starts summing up the data size per video access unit is defined as a video generation start timing, and a point of time delayed from the video generation start timing by a startup delay time including a VBV delay time corresponding to a time required for filling a video decoder buffer at a predetermined maximum bit rate is defined as a video decoding start timing. A multiplex packet containing a video PES header containing a video decoding time stamp indicating the video decoding start timing, and leading data of a video access unit is generated at the video generation start timing. Thereafter, a multiplex packet containing a video PES header containing a video decoding time stamp delayed from the video decoding start timing with an interval of the video access unit, and leading data of the video access unit is generated, each time the multiplex packet containing the leading data of the video access unit is generated.

As described above, the point of time when the video remaining size calculator starts summing up the data size per video access unit is defined as the video generation start timing, and the point of time delayed from the video generation start timing by the startup delay time including the VBV delay time corresponding to the time required for filling the video decoder buffer at the predetermined maximum bit rate is defined as the video decoding start timing. This enables to fill the decoder buffer before the timing when a decoder starts a decoding operation in accordance with the decoding time stamp.

In the multiplexing device, preferably, the startup delay time may be a time obtained by summing up the VBV delay time, and a maximum delay time by a multiplexing operation.

In the above arrangement, the startup delay time is a time obtained by summing up the VBV delay time, and a maximum delay time by a multiplexing operation. Specifically, a multiplexing pattern signal is constituted of a video period and an audio period. An operation of transmitting video encoded data is suspended during the audio period, and transmission loss is generated in the audio period. In view of the above, transmitting data at a timing earlier than the VBV delay time by the maximum delay time by the multiplexing operation enables to compensate for the transmission loss of encoded video data during the audio period, and fill the decoder buffer before the timing when a decoder starts a decoding operation in accordance with the decoding time stamp.

In the multiplexing device, preferably, the video remaining size calculator may be operable to sum up the data size per video access unit and the video remaining size at the video generation start timing and at timings delayed from the video generation start timing with the interval of the video access unit.

In the above arrangement, the data size per video access unit and the video remaining size can be summed up at the video generation start timing and at the timings delayed from the video generation start timing with the interval of the video access unit.

In the multiplexing device, preferably, the audio elementary stream may be an elementary stream having a variable bit rate, the elementary stream being composed of variable length encoded data whose maximum bit rate is defined.

The above arrangement enables to prevent breakdown of a decoder buffer, even if encoded data generated by an encoder is an audio elementary stream composed of variable length encoded data generated at a variable bit rate.

In the multiplexing device, assuming that a point of time when the audio packet generator starts generating the multiplexed stream is an audio generation start timing, and a point of time delayed from the audio generation start timing by a startup delay time including an audio buffer delay time corresponding to a time required for filling an audio decoder buffer at a predetermined maximum bit rate is an audio presentation start timing, preferably, the audio packet generator may be operable to generate a multiplex packet containing an audio PES header containing an audio presentation time stamp indicating the audio presentation start timing, and leading data of an audio access unit at the audio generation start timing; and generate a multiplex packet containing an audio PES header containing an audio presentation time stamp delayed from the audio presentation start timing with an interval of the audio access unit, and leading data of the audio access unit, each time the multiplex packet containing the leading data of the audio access unit is generated.

In the above arrangement, a point of time when the audio packet generator starts generating the multiplexed stream is defined as an audio generation start timing, and a point of time delayed from the audio generation start timing by a startup delay time including an audio buffer delay time corresponding to a time required for filling an audio decoder buffer at a predetermined maximum bit rate is defined as an audio presentation start timing. A multiplex packet containing an audio PES header containing an audio presentation time stamp indicating the audio presentation start timing, and leading data of an audio access unit is generated at the audio generation start timing. A multiplex packet containing an audio PES header containing an audio presentation time stamp delayed from the audio presentation start timing with an interval of the audio access unit, and leading data of the audio access unit is generated, each time the multiplex packet containing the leading data of the audio access unit is generated.

As described above, the point of time when the audio packet generator starts generating the multiplexed stream is defined as the audio generation start timing, and the point of time delayed from the audio generation start timing by the startup delay time including the audio buffer delay time corresponding to the time required for filling the audio decoder buffer at the predetermined maximum bit rate is defined as the audio presentation start timing. This enables to fill the decoder buffer before the timing when a decoder starts a decoding operation in accordance with the decoding time stamp.

In the multiplexing device, preferably, the startup delay time may be a time obtained by summing up the audio buffer delay time, and a maximum delay time by a multiplexing operation.

In the above arrangement, the startup delay time is a time obtained by summing up the audio buffer delay time, and a maximum delay time by a multiplexing operation. Specifically, a multiplexing pattern signal is constituted of a video period and an audio period. An operation of transmitting audio encoded data is suspended during the video period, and transmission loss is generated in the video period. In view of the above, transmitting data at a timing earlier than the audio buffer delay time by the maximum delay time by the multiplexing operation enables to compensate for the transmission loss of encoded audio data during the video period, and fill the decoder buffer before the timing when a decoder starts a decoding operation in accordance with the decoding time stamp.

In the multiplexing device, preferably, the data size per audio access unit and the audio remaining size can be summed up at the audio generation start timing and at timings delayed from the audio generation start timing with the interval of the audio access unit.

In the above arrangement, the data size per audio access unit and the audio remaining size can be summed up at the audio generation start timing and at the timings delayed from the audio generation start timing with the interval of the audio access unit.

In the multiplexing device, assuming that a point of time delayed from the video decoding start timing by a period including the interval of the video access unit is an audio presentation start timing, and a point of time advanced from the audio presentation start timing with an interval of an audio access unit is an audio generation start timing, the audio packet generator is operable to generate a multiplex packet containing an audio PES header containing an audio presentation time stamp indicating the audio presentation start timing, and leading data of the audio access unit at the audio generation start timing; and generate a multiplex packet containing an audio PES header containing an audio presentation time stamp delayed from the audio presentation start timing with the interval of the audio access unit, and leading data of the audio access unit, each time the multiplex packet containing the leading data of the audio access unit is generated.

In the above arrangement, assuming that a point of time delayed from the video decoding start timing by a period including the interval of the video access unit is an audio presentation start timing, and a point of time advanced from the audio presentation start timing with an interval of an audio access unit is an audio generation start timing, a multiplex packet containing an audio PES header containing an audio presentation time stamp indicating the audio presentation start timing, and leading data of the audio access unit is generated at the audio generation start timing. A multiplex packet containing an audio PES header containing an audio presentation time stamp delayed from the audio presentation start timing with the interval of the audio access unit, and leading data of the audio access unit is generated, each time the multiplex packet containing the leading data of the audio access unit is generated.

As described above, the point of time delayed from the video decoding start timing by the period including the interval of the video access unit is defined as the audio presentation start timing, and the point of time advanced from the audio presentation start timing with the interval of the audio access unit is defined as the audio generation start timing. This enables to fill the decoder buffer before the timing when a decoder starts a decoding operation in accordance with the decoding time stamp.

In the multiplexing device, preferably, the audio presentation start timing may be a point of time delayed from the video decoding start timing by a time obtained by summing up the interval of the video access unit, and a maximum delay time by a multiplexing operation.

In the above arrangement, a point of time delayed from the video decoding start timing by a time obtained by summing up the interval of the video access unit, and a maximum delay time by a multiplexing operation can be defined as the audio presentation start timing.

In the multiplexing device, preferably, the multiplexed stream may be a transport stream. In this arrangement, a transport stream can be used to multiplex elementary streams each of a certain content type.

An integrated circuit according to another aspect of the invention is an integrated circuit operable to multiplex elementary streams, which have respective content types and are respectively composed of encoded data generated per access unit, in the unit of multiplex packets, to generate a multiplexed stream composed of the multiplex packets. The integrated circuit comprises: a multiplexing pattern generating section for generating a multiplexing pattern signal corresponding to a multiplexing pattern indicating an order of types of data to be multiplexed; a remaining size calculating section for calculating, as a remaining size, a size of multiplexable data of the elementary stream stored in a buffer section for temporarily storing the elementary stream to output remaining size information indicating the remaining size; a packet generating section for reading out, as transmission data, data of a predetermined size from the elementary stream stored in the buffer section, based on the multiplexing pattern signal generated by the multiplexing pattern generating section, and the remaining size information outputted from the remaining size calculating section, to generate the multiplex packet containing the readout transmission data; and a multiplexing section for multiplexing the multiplex packets generated by the packet generating section in an order of generation to generate the multiplexed stream, wherein the remaining size calculating section is operable to calculate the remaining size, based on a data size per access unit, and the size of the transmission data contained in the multiplex packet generated by the packet generating section, as a transmission size, and the packet generating section is operable to generate the multiplex packet, if the data type indicated by the multiplexing pattern signal shows matching, and the remaining size is equal to or larger than the transmission size.

In the above arrangement, the multiplexing pattern generating section is operable to generate a multiplexing pattern signal corresponding to a multiplexing pattern indicating an order of types of data to be multiplexed. The remaining size calculating section is operable to calculate, as a remaining size, a size of multiplexable data of the elementary stream stored in a buffer section for temporarily storing the elementary stream to output remaining size information indicating the remaining size. The packet generating section is operable to read out, as transmission data, data of a predetermined size from the elementary stream stored in the buffer section, based on the multiplexing pattern signal and the remaining size information, to generate the multiplex packet containing the readout transmission data. Thereafter, the multiplexing section is operable to multiplex the multiplex packets generated by the packet generating section in an order of generation to generate the multiplexed stream. The remaining size calculating section is operable to calculate the remaining size, based on a data size per access unit, and the size of the transmission data contained in the multiplex packet generated by the packet generating section, as a transmission size. The packet generating section is operable to generate the multiplex packet, if the data type indicated by the multiplexing pattern signal shows matching, and the remaining size is equal to or larger than the transmission size.

According to the another aspect of the invention, if the data type indicated by the multiplexing pattern signal shows matching, and the remaining size is equal to or larger than the transmission size, a multiplex packet is generated. Accordingly, even if encoded data generated by an encoder is variable length encoded data generated at a variable bit rate, breakdown of a decoder buffer can be prevented. Further, the remaining size is calculated, based on the data size per access unit, and the transmission size of transmission data contained in the multiplex packet, and a multiplexing operation is performed by simulation of an encoder buffer. Accordingly, as compared with a conventional multiplexing operation to be performed by simulation of a decoder buffer, a time required for a multiplexing operation can be shortened.

A multiplexing method according to another aspect of the invention is a multiplexing method for multiplexing elementary streams, which are temporarily stored and have respective content types and are respectively composed of encoded data generated per access unit, in respective buffers and multiplex the elementary streams temporarily stored in the buffers in the unit of multiplex packets to generate a multiplexed stream composed of the multiplex packets. The multiplexing method comprises: a multiplexing pattern generating step of generating a multiplexing pattern signal corresponding to a multiplexing pattern indicating an order of types of data to be multiplexed; a remaining size calculating step of calculating, as a remaining size, a size of multiplexable data of the elementary stream stored in the buffer to output remaining size information indicating the remaining size; a packet generating step of reading out, as transmission data, data of a predetermined size from the elementary stream stored in the buffer, based on the multiplexing pattern signal generated in the multiplexing pattern generating step, and the remaining size information outputted in the remaining size calculating step, to generate the multiplex packet containing the readout transmission data; and a multiplexing step of multiplexing the multiplex packets generated in the packet generating step in an order of generation to generate the multiplexed stream, wherein in the remaining size calculating step, the remaining size is calculated, based on a data size per access unit, and the size of the transmission data contained in the multiplex packet generated in the packet generating step, as a transmission size, and in the packet generating step, the multiplex packet is generated, if the data type indicated by the multiplexing pattern signal shows matching, and the remaining size is equal to or larger than the transmission size.

In the above arrangement, in the multiplexing pattern generating step, a multiplexing pattern signal corresponding to a multiplexing pattern indicating an order of types of data to be multiplexed is generated. In the remaining size calculating step, a size of multiplexable data of the elementary stream stored in the buffer for temporarily storing the elementary stream is calculated, as a remaining size, to output remaining size information indicating the remaining size. In the packet generating step, data of a predetermined size is read out, as transmission data, from the elementary stream stored in the buffer, based on the multiplexing pattern signal and the remaining size information, to generate the multiplex packet containing the readout transmission data. Thereafter, in the multiplexing step, the multiplex packet generated in the packet generating step is multiplexed in an order of generation to generate the multiplexed stream. In the remaining size calculating step, the remaining size is calculated, based on a data size per access unit, and the size of the transmission data contained in the multiplex packet generated in the packet generating step, as a transmission size. Then, in the packet generating step, the multiplex packet is generated, if the data type indicated by the multiplexing pattern signal shows matching, and the remaining size is equal to or larger than the transmission size.

According to another aspect of the invention, if the data type indicated by the multiplexing pattern signal shows matching, and the remaining size is equal to or larger than the transmission size, a multiplex packet is generated. Accordingly, even if encoded data generated by an encoder is variable length encoded data generated at a variable bit rate, breakdown of a decoder buffer can be prevented. Further, the remaining size is calculated, based on the data size per access unit, and the transmission size of transmission data contained in the multiplex packet, and a multiplexing operation is performed by simulation of an encoder buffer. Accordingly, as compared with a conventional multiplexing operation to be performed by simulation of a decoder buffer, a time required for a multiplexing operation can be shortened.

A multiplexing program according to another aspect of the invention is a multiplexing program operable to temporarily store elementary streams, which have respective content types and are respectively composed of encoded data generated per access unit, in respective buffers and multiplex the elementary streams temporarily stored in the buffers in the unit of multiplex packets so as to generate a multiplexed stream composed of the multiplex packets. The multiplexing program causes a computer to function as: a multiplexing pattern generating section for generating a multiplexing pattern signal corresponding to a multiplexing pattern indicating an order of types of data to be multiplexed; a remaining size calculating section for calculating, as a remaining size, a size of multiplexable data of the elementary stream stored in the buffer to output remaining size information indicating the remaining size; a packet generating section for reading out, as transmission data, data of a predetermined size from the elementary stream stored in the buffer, based on the multiplexing pattern signal generated by the multiplexing pattern generating section, and the remaining size information outputted from the remaining size calculating section, to generate the multiplex packet containing the readout transmission data; and a multiplexing section for multiplexing the multiplex packets generated by the packet generating section in an order of generation to generate the multiplexed stream, wherein the remaining size calculating section is operable to calculate the remaining size, based on a data size per access unit, and the size of the transmission data contained in the multiplex packet generated by the packet generating section, as a transmission size, and the packet generating section is operable to generate the multiplex packet, if the data type indicated by the multiplexing pattern signal shows matching, and the remaining size is equal to or larger than the transmission size.

According to the above arrangement, the multiplexing pattern generating section is operable to generate a multiplexing pattern signal corresponding to a multiplexing pattern indicating an order of types of data to be multiplexed. The buffers are each operable to temporarily store an elementary stream. The remaining size calculating section is operable to calculate, as a remaining size, a size of multiplexable data of the elementary stream stored in the buffer to output remaining size information indicating the remaining size. The packet generating section is operable to read out, as transmission data, data of a predetermined size from the elementary stream stored in the buffer, based on the multiplexing pattern signal and the remaining size information, to generate the multiplex packet containing the readout transmission data. Thereafter, the multiplexing section is operable to multiplex the multiplex packets generated by the packet generating section in an order of generation to generate the multiplexed stream. The remaining size calculating section is operable to calculate the remaining size, based on a data size per access unit, and the size of the transmission data contained in the multiplex packet generated by the packet generating section, as a transmission size. The packet generating section is operable to generate the multiplex packet, if the data type indicated by the multiplexing pattern signal shows matching, and the remaining size is equal to or larger than the transmission size.

According to another aspect of the invention, if the data type indicated by the multiplexing pattern signal shows matching, and the remaining size is equal to or larger than the transmission size, a multiplex packet is generated. Accordingly, even if encoded data generated by an encoder is variable length encoded data generated at a variable bit rate, breakdown of a decoder buffer can be prevented. Further, the remaining size is calculated, based on the data size per access unit, and the transmission size of transmission data contained in the multiplex packet, and a multiplexing operation is performed by simulation of an encoder buffer. Accordingly, as compared with a conventional multiplexing operation to be performed by simulation of a decoder buffer, a time required for a multiplexing operation can be shortened.

A computer-readable recording medium recorded with a multiplexing program according to another aspect of the invention is a computer-readable recording medium recorded with a multiplexing program operable to temporarily store elementary streams, which have respective content types and are respectively composed of encoded data generated per access unit, in respective buffers and multiplex the elementary streams temporarily stored in the buffers in the unit of multiplex packets so as to generate a multiplexed stream composed of the multiplex packets. The multiplexing program causes a computer to function as: a multiplexing pattern generating section for generating a multiplexing pattern signal corresponding to a multiplexing pattern indicating an order of types of data to be multiplexed; a remaining size calculating section for calculating, as a remaining size, a size of multiplexable data of the elementary stream stored in the buffer to output remaining size information indicating the remaining size; a packet generating section for reading out, as transmission data, data of a predetermined size from the elementary stream stored in the buffer, based on the multiplexing pattern signal generated by the multiplexing pattern generating section, and the remaining size information outputted from the remaining size calculating section, to generate the multiplex packet containing the readout transmission data; and a multiplexing section for multiplexing the multiplex packets generated by the packet generating section in an order of generation to generate the multiplexed stream, wherein the remaining size calculating section is operable to calculate the remaining size, based on a data size per access unit, and the size of the transmission data contained in the multiplex packet generated by the packet generating section, as a transmission size, and the packet generating section is operable to generate the multiplex packet, if the data type indicated by the multiplexing pattern signal shows matching, and the remaining size is equal to or larger than the transmission size.

According to the above arrangement, the multiplexing pattern generating section is operable to generate a multiplexing pattern signal corresponding to a multiplexing pattern indicating an order of types of data to be multiplexed. The buffers are each operable to temporarily store an elementary stream. The remaining size calculating section is operable to calculate, as a remaining size, a size of multiplexable data of the elementary stream stored in the buffer to output remaining size information indicating the remaining size. The packet generating section is operable to read out, as transmission data, data of a predetermined size from the elementary stream stored in the buffer, based on the multiplexing pattern signal and the remaining size information, to generate the multiplex packet containing the readout transmission data. Thereafter, the multiplexing section is operable to multiplex the multiplex packets generated by the packet generating section in an order of generation to generate the multiplexed stream. The remaining size calculating section is operable to calculate the remaining size, based on a data size per access unit, and the size of the transmission data contained in the multiplex packet generated by the packet generating section, as a transmission size. The packet generating section is operable to generate the multiplex packet, if the data type indicated by the multiplexing pattern signal shows matching, and the remaining size is equal to or larger than the transmission size.

According to another aspect of the invention, if the data type indicated by the multiplexing pattern signal shows matching, and the remaining size is equal to or larger than the transmission size, a multiplex packet is generated. Accordingly, even if encoded data generated by an encoder is variable length encoded data generated at a variable bit rate, breakdown of a decoder buffer can be prevented. Further, the remaining size is calculated, based on the data size per access unit, and the transmission size of transmission data contained in the multiplex packet, and a multiplexing operation is performed by simulation of an encoder buffer. Accordingly, as compared with a conventional multiplexing operation to be performed by simulation of a decoder buffer, a time required for a multiplexing operation can be shortened.

A computer-readable recording medium recorded with a multiplexed stream according to still another aspect of the invention is recorded with a multiplexed stream generated by the aforementioned multiplexing method.

The above arrangement enables to record a multiplexed stream generated by the multiplexing method into a computer-readable recording medium, and reproduce multiplexed contents from the recording medium.

INDUSTRIAL APPLICABILITY

The invention is directed to a multiplexing device operable to prevent breakdown of a decoder with a simplified arrangement. Accordingly, the invention is applicable to e.g. a recording device, a recording and reproducing device, a mobile terminal device having a recording function, and a camera device capable of generating a stream of signals to record the signals in a recording medium; and is also applicable to a stream transmitter capable of generating a stream of signals to transmit the signals via a transmission path.

The invention claimed is:

1. A multiplexing device for multiplexing elementary streams, which have respective content types and are respectively composed of encoded data generated per access unit, in the unit of a multiplex packet to generate a multiplexed stream composed of multiplex packets, the multiplexing device comprising:

a multiplexing pattern generating section for generating a multiplexing pattern signal corresponding to a multiplexing pattern indicating an order of types of data to be multiplexed;

a buffer section for temporarily storing the elementary stream;

a remaining size calculating section for calculating, as a remaining size, a size of multiplexable data of the elementary stream stored in the buffer section to output remaining size information indicating the remaining size;

a packet generating section for reading out, as transmission data, data of a predetermined size from the elementary stream stored in the buffer section, based on the multiplexing pattern signal generated by the multiplexing pattern generating section, and the remaining size information outputted from the remaining size calculating section, to generate the multiplex packet containing the readout transmission data; and a multiplexing section for multiplexing the multiplex packets generated by the packet generating section in an order of generation to generate a multiplexed stream, wherein the remaining size calculating section is operable to calculate the remaining size, based on a data size per access unit, and the size of the transmission data contained in the multiplex packet generated by the packet generating section, as a transmission size, and the packet generating section is operable to generate the multiplex packet, if the data type indicated by the multiplexing pattern signal shows matching, and the remaining size is equal to or larger than the transmission size.

2. The multiplexing device according to claim 1, wherein the multiplexing pattern is a pattern that a period when the multiplex packet is generated is cyclically repeated at a predetermined ratio, depending on the type of data to be contained in the multiplex packet.

3. The multiplexing device according to claim 2, wherein the multiplexing pattern is defined in such a manner that a bit rate for use in a multiplexing operation is equal to or larger than a maximum bit rate required depending on the type of data to be contained in the multiplex packet.

4. The multiplexing device according to claim 3, wherein the remaining size calculating section is operable to calculate the remaining size by performing a computation of summing up the data size per access unit at an interval of an access unit, and subtracting the transmission size, each time the multiplex packet containing the transmission data is generated by the packet generating section.

5. The multiplexing device according to claim 4, wherein the remaining size calculating section is operable to calculate the remaining size per access unit by performing the computation.

6. The multiplexing device according to claim 4, wherein assuming that a point of time when the remaining size calculating section starts summing up the data size per access unit is a generation start timing, and a point of time delayed from the generation start timing by a startup delay time corresponding to a time required for filling a decoder buffer at a predetermined maximum bit rate is a decoding start timing, the packet generating section is operable to
generate a multiplex packet containing a packetized elementary stream header containing a decoding time stamp indicating the decoding start timing, and leading data of the access unit, depending on the generation start timing, and the multiplexing pattern corresponding to the multiplexing pattern signal, and generate a multiplex packet containing a packetized elementary stream header containing a decoding time stamp delayed from the decoding start timing with the interval of the access unit, and leading data of the access unit, each time the multiplex packet containing the leading data of the access unit is generated.

7. The multiplexing device according to claim 6, wherein the startup delay time is a time obtained by summing up the time required for filing the decoder buffer at the predetermined maximum bit rate, and a maximum delay time by the multiplexing operation.

8. The multiplexing device according to claim 6, wherein the remaining size calculating section is operable to sum up the data size per access unit and the remaining size at the generation start timing and at timings delayed from the generation start timing with the interval of the access unit.

9. The multiplexing device according to claim 1, further comprising:

a rate monitoring section for calculating a sum of sizes of the transmission data generated by the packet generating section, and notifying the packet generating section of a transmission suspending signal indicating a request to suspend generating a multiplex packet, if the sum is over a size of transmission data defined in a condition that the elementary stream is outputted at a required maximum bit rate, wherein the packet generating section is operable to generate the multiplex packet, if the data type indicated by the multiplexing pattern signal shows matching, the remaining size is equal to or larger than the transmission size, and the transmission suspending signal is not issued from the rate monitoring section.

10. The multiplexing device according to claim 9, wherein the rate monitoring section is operable to clear the sum, and the size of transmission data defined in the condition that the elementary stream is outputted at the required maximum bit rate, if the remaining size calculated by the remaining size calculating section is 0.

11. The multiplexing device according to claim 1, wherein the packet generating section is operable to generate a multiplex packet containing stuffing data for filling a data shortage area, if the remaining size calculated by the remaining size calculating section is smaller than the transmission size.

12. The multiplexing device according to claim 1, wherein the buffer section includes a video buffer for temporarily storing a video elementary stream, and an audio buffer for temporarily storing an audio elementary stream, the remaining size calculating section includes a video remaining size calculator for calculating, as a video remaining size, a size of multiplexable data of the video elementary stream stored in the video buffer to output video remaining size information indicating the video remaining size, and an audio remaining size calculator for calculating, as an audio remaining size, a size of multiplexable data of the audio elementary stream stored in the audio buffer to output audio remaining size information indicating the audio remaining size, and the packet generating section includes a video packet generator for reading out, as transmission data, data of a predetermined size from the video elementary stream stored in the video buffer, based on the multiplexing pattern signal generated by the multiplexing pattern generating section, and the video remaining size information outputted from the video remaining size calculator, to generate the multiplex packet containing the readout transmission data, and an audio packet generator for reading out, as transmission data, data of a predetermined size from the audio elementary stream stored in the audio buffer, based on the multiplexing pattern signal generated by the multiplexing pattern generating section, and the audio remaining size information outputted from the audio remaining size calculator, to generate the multiplex packet containing the readout transmission data.

13. The multiplexing device according to claim 12, wherein
the packet generating section further includes a system packet generator for generating the multiplex packet containing system data including information relating to the multiplexed stream to be generated, based on the multiplexing pattern signal generated by the multiplexing pattern generating section.

14. The multiplexing device according to claim 13, wherein
the multiplexing pattern is a pattern that a video period when the multiplex packet corresponding to the video elementary stream is generated, and an audio period when the multiplex packet corresponding to the audio elementary stream is generated, are cyclically repeated at a predetermined ratio, and
the audio period is constituted of an audio transmission period when the multiplex packet corresponding to the audio elementary stream is generated, and a system period when the multiplex packet corresponding to the system data is generated.

15. The multiplexing device according to claim 12, wherein
the video elementary stream is an elementary stream having a variable bit rate, the elementary stream being composed of variable length encoded data whose maximum bit rate is defined.

16. The multiplexing device according to claim 12, wherein
assuming that a point of time when the video remaining size calculator starts summing up the data size per video access unit is a video generation start timing, and a point of time delayed from the video generation start timing by a startup delay time including a video buffering verifier delay time corresponding to a time required for filling a video decoder buffer at a predetermined maximum bit rate is a video decoding start timing,
the video packet generator is operable to
generate a multiplex packet containing a video packetized elementary stream header containing a video decoding time stamp indicating the video decoding start timing, and leading data of a video access unit at the video generation start timing, and
generate a multiplex packet containing a video packetized elementary stream header containing a video decoding time stamp delayed from the video decoding start timing with an interval of the video access unit, and leading data of the video access unit, each time the multiplex packet containing the leading data of the video access unit is generated.

17. The multiplexing device according to claim 16, wherein
the startup delay time is a time obtained by summing up the video buffering verifier delay time, and a maximum delay time by a multiplexing operation.

18. The multiplexing device according to claim 16, wherein
the video remaining size calculator is operable to sum up the data size per video access unit and the video remaining size at the video generation start timing and at timings delayed from the video generation start timing with the interval of the video access unit.

19. The multiplexing device according to claim 16, wherein
the audio elementary stream is an elementary stream having a variable bit rate, the elementary stream being composed of variable length encoded data whose maximum bit rate is defined.

20. The multiplexing device according to claim 19, wherein
assuming that a point of time when the audio packet generator starts generating the multiplexed stream is an audio generation start timing, and a point of time delayed from the audio generation start timing by a startup delay time including an audio buffer delay time corresponding to a time required for filling an audio decoder buffer at a predetermined maximum bit rate is an audio presentation start timing,
the audio packet generator is operable to
generate a multiplex packet containing an audio packetized elementary stream header containing an audio presentation time stamp indicating the audio presentation start timing, and leading data of an audio access unit at the audio generation start timing, and
generate a multiplex packet containing an audio packetized elementary streamer header containing an audio presentation time stamp delayed from the audio presentation start timing with an interval of the audio access unit, and leading data of the audio access unit, each time the multiplex packet containing the leading data of the audio access unit is generated.

21. The multiplexing device according to claim 20, wherein
the startup delay time is a time obtained by summing up the audio buffer delay time, and a maximum delay time by a multiplexing operation.

22. The multiplexing device according to claim 20, wherein
the audio remaining size calculator is operable to sum up the data size per audio access unit and the audio remaining size at the audio generation start timing and at timings delayed from the audio generation start timing with the interval of the audio access unit.

23. The multiplexing device according to claim 16, wherein
assuming that a point of time delayed from the video decoding start timing by a period including the interval of the video access unit is an audio presentation start timing, and a point of time advanced from the audio presentation start timing with an interval of an audio access unit is an audio generation start timing,
the audio packet generator is operable to
generate a multiplex packet containing an audio packetized elementary stream header containing an audio presentation time stamp indicating the audio presentation start timing, and leading data of the audio access unit at the audio generation start timing, and generate a multiplex packet containing an audio packetized elementary stream header containing an audio presentation time stamp delayed from the audio presentation start timing with the interval of the audio access unit, and leading data of the audio access unit, each time the multiplex packet containing the leading data of the audio access unit is generated.

24. The multiplexing device according to claim 23, wherein
the audio presentation start timing is a point of time delayed from the video decoding start timing by a time obtained by summing up the interval of the video access unit, and a maximum delay time by a multiplexing operation.

25. The multiplexing device according to claim 1, wherein the multiplexed stream is a transport stream.

26. An integrated circuit operable to multiplex elementary streams, which have respective content types and are respectively composed of encoded data generated per access unit, in the unit of multiplex packets to generate a multiplexed stream composed of the multiplex packets, the integrated circuit comprising:
a multiplexing pattern generating section for generating a multiplexing pattern signal corresponding to a multiplexing pattern indicating an order of types of data to be multiplexed;
a remaining size calculating section for calculating, as a remaining size, a size of multiplexable data of the elementary stream stored in a buffer section for temporarily storing the elementary stream to output remaining size information indicating the remaining size;
a packet generating section for reading out, as transmission data, data of a predetermined size from the elementary stream stored in the buffer section, based on the multiplexing pattern signal generated by the multiplexing pattern generating section, and the remaining size information outputted from the remaining size calculating section, to generate the multiplex packet containing the readout transmission data; and
a multiplexing section for multiplexing the multiplex packets generated by the packet generating section in an order of generation to generate the multiplexed stream, wherein
the remaining size calculating section is operable to calculate the remaining size, based on a data size per access unit, and the size of the transmission data contained in the multiplex packet generated by the packet generating section, as a transmission size, and
the packet generating section is operable to generate the multiplex packet, if the data type indicated by the multiplexing pattern signal shows matching, and the remaining size is equal to or larger than the transmission size.

27. A multiplexing method for multiplexing elementary streams, which are temporarily stored, and have respective content types and are respectively composed of encoded data generated per access unit in respective buffers, in the unit of multiplex packets to generate a multiplexed stream composed of the multiplex packets, the multiplexing method comprising:
a multiplexing pattern generating step of generating a multiplexing pattern signal corresponding to a multiplexing pattern indicating an order of types of data to be multiplexed;
a remaining size calculating step of calculating, as a remaining size, a size of multiplexable data of the elementary stream stored in the buffer to output remaining size information indicating the remaining size;
a packet generating step of reading out, as transmission data, data of a predetermined size from the elementary stream stored in the buffer, based on the multiplexing pattern signal generated in the multiplexing pattern generating step, and the remaining size information outputted in the remaining size calculating step, to generate the multiplex packet containing the readout transmission data; and
a multiplexing step of multiplexing the multiplex packets generated in the packet generating step in an order of generation to generate the multiplexed stream, wherein
in the remaining size calculating step, the remaining size is calculated, based on a data size per access unit, and the size of the transmission data contained in the multiplex packet generated in the packet generating step, as a transmission size, and
in the packet generating step, the multiplex packet is generated, if the data type indicated by the multiplexing pattern signal shows matching, and the remaining size is equal to or larger than the transmission size.

28. A non-transitory computer-readable recording medium recorded with a multiplexing program operable to temporarily store elementary streams, which have respective content types and are respectively composed of encoded data generated per access unit, in respective buffers and multiplex the elementary streams temporarily stored in the buffers in the unit of multiplex packets so as to generate a multiplexed stream composed of the multiplex packets, the multiplexing program causing a computer to function as:
a multiplexing pattern generating section for generating a multiplexing pattern signal corresponding to a multiplexing pattern indicating an order of types of data to be multiplexed;
a remaining size calculating section for calculating, as a remaining size, a size of multiplexable data of the elementary stream stored in the buffer to output remaining size information indicating the remaining size;
a packet generating section for reading out, as transmission data, data of a predetermined size from the elementary stream stored in the buffer, based on the multiplexing pattern signal generated by the multiplexing pattern generating section, and the remaining size information outputted from the remaining size calculating section, to generate the multiplex packet containing the readout transmission data; and
a multiplexing section for multiplexing the multiplex packets generated by the packet generating section in an order of generation to generate the multiplexed stream, wherein
the remaining size calculating section is operable to calculate the remaining size, based on a data size per access unit, and the size of the transmission data contained in the multiplex packet generated by the packet generating section, as a transmission size, and
the packet generating section is operable to generate the multiplex packet, if the data type indicated by the multiplexing pattern signal shows matching, and the remaining size is equal to or larger than the transmission size.

* * * * *